United States Patent
Ohashi et al.

(10) Patent No.: US 6,996,130 B2
(45) Date of Patent: Feb. 7, 2006

(54) DISTRIBUTED CONTROL SYSTEM AND FILTERING METHOD USED IN THE DISTRIBUTED CONTROL SYSTEM

(75) Inventors: Masahiro Ohashi, Hitachinaka (JP); Takeiki Aizono, Kawasaki (JP); Dai Fujii, Hitachi (JP); Hiroyuki Tanaka, Mito (JP); Makoto Kogure, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 466 days.

(21) Appl. No.: 10/158,007

(22) Filed: May 31, 2002

(65) Prior Publication Data

US 2002/0188658 A1 Dec. 12, 2002

Related U.S. Application Data

(63) Continuation of application No. 09/353,552, filed on Jul. 14, 1999, now Pat. No. 6,681,139.

(30) Foreign Application Priority Data

Jul. 15, 1998 (JP) .......................................... 10-200063

(51) Int. Cl.
*H04J 1/02* (2006.01)

(52) U.S. Cl. ........................ 370/497; 709/201; 709/225; 709/226

(58) Field of Classification Search .................. 700/55; 370/497, 390, 400, 94, 825.52; 709/201, 709/221, 225–226; 187/247–248; 340/825.07, 340/825.52

See application file for complete search history.

(56) References Cited

U.S. PATENT DOCUMENTS

| | | | | |
|---|---|---|---|---|
| 4,760,572 A | * | 7/1988 | Tomikawa | 370/390 |
| 5,081,621 A | * | 1/1992 | Sugimoto | 370/401 |
| 5,387,769 A | | 2/1995 | Kupersmith et al. | 187/248 |
| 5,854,454 A | * | 12/1998 | Upender et al. | 187/247 |
| 6,389,475 B1 | * | 5/2002 | Speakman et al. | 709/232 |

FOREIGN PATENT DOCUMENTS

| | | |
|---|---|---|
| JP | 56111353 A | 9/1981 |
| JP | 1124050 A | 5/1989 |

* cited by examiner

*Primary Examiner*—Anthony Knight
*Assistant Examiner*—Ronald D. Hartman, Jr.
(74) *Attorney, Agent, or Firm*—Kenyon & Kenyon

(57) ABSTRACT

In a distributed control system in which a plurality of nodes are connected to a transmission line, each node controlling components connected to this node and transmitting a message to other nodes, a message sent by each node includes at least two message-sending condition-identifying portions, one of the condition-identifying portions including data indicating a message-receiving node or non-designation of a message-receiving node; and a comparison-selection circuit provided in each node includes registration parts for registering data of message-receiving conditions, at least two registration parts for comparing contents of the condition-identifying portion in the taken-in message with the data of message-receiving conditions registered in the registration parts, a received-message storing part for storing a message to be received in this node, a control part for determining whether or not the taken-in message is to be received in this node based on a result of comparison-processing performed in the comparison and selection means and for transferring the taken-in message to the received-message storing part if it is determined that the taken-in message is received in this node, otherwise, abandoning the taken-in message.

2 Claims, 35 Drawing Sheets

(DATA-SETTING FOR NODE B)

(DATA-SETTING FOR NODE C)

(DATA-SETTING FOR NODE B)

(DATA-SETTING FOR NODE C)

(DATA-SETTING FOR NODE B)

(DATA-SETTING FOR NODE B)

FORMAT OF MESSAGE

EXAMPLE OF MESSAGE FORAMT

FIG.24A
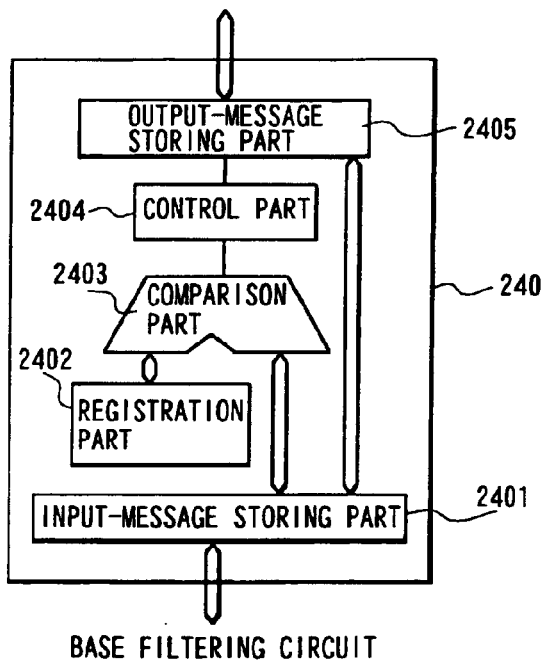
BASE FILTERING CIRCUIT
FIG.24C
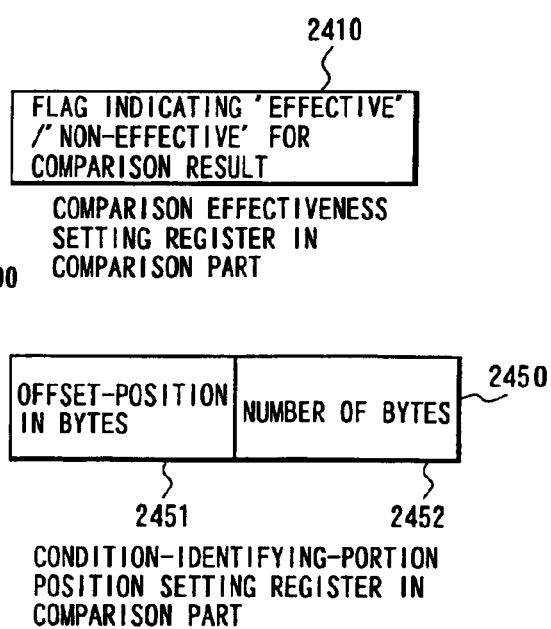
COMPARISON EFFECTIVENESS SETTING REGISTER IN COMPARISON PART
CONDITION-IDENTIFYING-PORTION POSITION SETTING REGISTER IN COMPARISON PART
FIG.24B
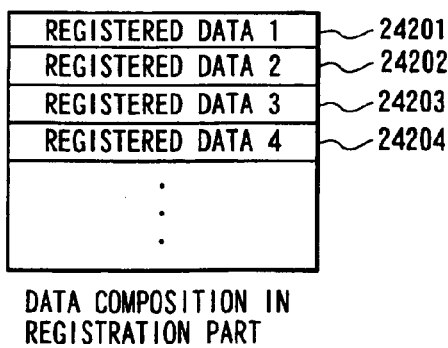
DATA COMPOSITION IN REGISTRATION PART
FIG.24D

FRAME STRUCTURE (OPEN-DRAIN METHOD)

(MESSAGE-PRIORITY CONTROL METHOD)

| CONTENT OF EACH FLAG | | COMPARISON RESULT 1:AGREEMENT 0:DISAGREEMENT | MESSAGE-STORING 1:PEFORMED 0:NOT-PEFORMED |
|---|---|---|---|
| FLAG INDTCATING 'EFFECTIVE'/'NON-EFFEFTIVE' FOR MESSAGE-RECEIVING | FLAG INDICATING 'EFFECTIVE'/'NON-EFFECTIVE' FOR COMPARISON-PROCESSING IN COMPARISON PART | | |
| 0 | 0 | 0 | 0 |
| 0 | 0 | 1 | 0 |
| 0 | 1 | 0 | 0 |
| 0 | 1 | 1 | 0 |
| 1 | 0 | 0 | 1 |
| 1 | 0 | 1 | 1 |
| 1 | 1 | 0 | 0 |
| 1 | 1 | 1 | 1 |

DISTRIBUTED CONTROL SYSTEM AND FILTERING METHOD USED IN THE DISTRIBUTED CONTROL SYSTEM

This is a continuation of application Ser. No. 09/353,552, filed Jul. 14, 1999, now U.S. Pat. No. 6,681,139.

BACKGROUND OF THE INVENTION

The present invention relates to a distributed control system in which a plurality of control apparatuses are connected to a common transmission line, and especially to a filtering method and a filtering circuit used in the distributed control system, for selecting and receiving messages transmitted on the common transmission line.

In a process automation system or a factory automation system, many apparatuses each of which includes a processor, what is called "field apparatus", are used for sensors to detect physical quantities such as pressure, temperature, or flow rate, motors to drive mechanical equipment, photo-sensors to detect positions. What is called a distributed control system controls an object system such as a plant by connecting the above field apparatuses, PCs (Programmable Controllers) for controlling the filed apparatuses, computers with input/output devices and display devices, and so on to a common transmission line so that those field apparatus, PCs, computers, etc., mutually send or receive messages via the transmission line.

In a distributed control system, for example, a physical quantity data from one sensor is simultaneously received by a plurality of motors, and each motor which has received the data independently executes processing by using the data from the sensor in real time. Therefore, data used for controlling of each field apparatus (referred to as a message) need to be transmitted in a very short time. Further, an extension or a change of a plant recently tends to be frequently carried out, which causes a frequent change in the composition of the control system for a plant. Accordingly, the easiness in extending or replacing field apparatuses or PCs has been strongly desired.

To satisfy the above requirements for a distributed control system, a conventional distributed control system uses a content-code transmission method in which each message with a content-code indicating the content of data to be transmitted is broadcasted on a common transmission line, and each node connected to the transmission line selects and receives the broadcasted message based on the content-code attached to the message. An example of the content-code using transmission method is disclosed in Japanese Patent Application Laid-Open Sho. 56-111353. Further, a distributed control system using the content-code transmission method is disclosed in Japanese Patent Application Laid-Open Hen. 1-124050. In this distributed control system, a received message includes an identifier of the kind of this message (message for on-line control or test) in addition to a code indicating the content of data to be transmitted and a node sending this message. Each node determines whether or not a received message is to be stored in the node, based on the above message-sending conditions included in the message.

According to recent development of a semiconductor technology, an intelligent function of a field apparatus has made further progress. Thus, although a conventional field apparatus simply detects or measures a physical quantity, a newer type of field apparatus performs complicated processing such as a self-diagnosis, a feed-back control, and so on. Consequently, it is required that results of a self-diagnosis performed in respective field apparatuses are collected by a computer which is a host apparatus of the field apparatuses, a plurality of parameters are set to each field apparatus, and similar net-work processing. Accordingly, in addition to the conventional data transmission in which messages of short data length such as data used to control an object system such as a plant, (referred to as control data), are transmitted on a common transmission line connecting a host computer and field apparatuses in a short transmission time, it has been required that messages with a long data length and of types different from those of the above control data, (referred to as information data), which need not be always transmitted in a short transmission time, are also transmitted along with control data on the transmission line in a recent distributed control system.

The above content-code transmission method is used to transmit control data to correspond to requirements of the easy extension and the synchronized data transmission of a distributed control system. On the other hand, since information data need not be simultaneously transmitted to a plurality of nodes, it is adequate to send information data by designating a message-receiving node, which is called a one-to-one transmission method. However, since the data length of information data is long, it takes much time for the node which has received the information data to process the information data, and the computing load of the node also increases.

In the content-code using transmission method in conventional techniques, data are broadcasted by attaching a content-code indicating the content of data to each data to be transmitted without designating a data-receiving node. Therefore, since data cannot be sent by designating the node receiving the data in the content-code transmission method, the content-code transmission method and the one-to-one transmission method cannot be used together.

Further, a distributed control system using the content-code transmission method has a problem in that since each control unit in the distributed control system receives all the message broadcasted on a transmission line, and determines whether or not each of the received messages is to be taken into the unit based on the attached content-code, the load for the transmission processing in each node is large. Especially, in a field apparatus performing component control and transmission processing with one CPU, if the load of the transmission processing to which the content-code transmission method is applied greatly increases, it affects processing of an application program to execute the component control. In the worst case, the timing or the period of the processing of an application program cannot be kept, which causes a failure in the normal control of a plant, etc. Furthermore, such a failure in the normal control frequently results in the serious deterioration in the safety of a plant or in the yield of a production line in a factory.

SUMMARY OF THE INVENTION

The first object of the present invention is to provide a method and an apparatus resolving the above problems, in which transmission methods of different types such as the content-code using transmission method, the one-to-one transmission method, etc., can be used together, and data of different types such as control data, information data, etc., can be transmitted on the same transmission line.

The second object of the present invention is to provide a method and an apparatus capable of preventing increase of the load of transmission processing from affecting other processing such as execution of an application program.

To attain the first object, the present invention provides a first distributed control system in which a plurality of nodes are connected to a transmission line, each node controlling components connected to this node and transmitting a message to other nodes, wherein each node sends a message including at least two message-sending condition-identifying portions, one of the condition-identifying portions including data indicating a message-receiving node or non-designation of a message-receiving node; takes in each of messages transmitted on the transmission line into a comparison and selection means provided in this node; and determines whether or not the taken-in message is to be received in this node.

In the first distributed control system, the determination of whether or not the taken-in message is to be received in this node is executed based on a corresponding situation between contents of the condition-identifying portions and data of message-receiving conditions registered in the comparison and selection means.

In the first distributed control system, by further providing a declaration region for describing a position of each condition-identifying portion and the length of data set to the condition-identifying portion in a message sent by each node, the number of the condition-identifying portions can be variably set.

Further, in the first distributed control system, the comparison-selection means includes registration parts for registering data of message-receiving conditions, at least tow registration parts for comparing contents of the condition-identifying portion in the taken-in message with the data of message-receiving conditions registered in the registration parts, a received-message storing part for storing a message to be received in this node, a control part for determining whether or not the taken-in message is to be received in this node based on the result of comparison-processing performed in the comparison and selection means and for transferring the taken-in message to the received-message storing part if it is determined that the taken-in message is received in this node, otherwise, abandoning the taken-in message.

Furthermore, in the first distributed control system, the comparison and selection means includes registration parts for registering data of message-receiving conditions, at least tow comparison parts for comparing contents of the condition-identifying portions in the taken message with the data of message-receiving conditions registered in the registration parts, received-message storing parts of the same number as that of the comparison parts, for storing a message to be received in this node, a control part for determining whether the taken-in message is to be received in this node based a result of comparison and processing performed in the comparison and selection means, and for transferring the taken-in message to a corresponding one of the received-message storing parts if it is determined that the taken-in message is received in this node, otherwise, abandoning the taken-in message.

Additionally, in the first distributed control system, the comparison and selection means includes a plurality of base filtering circuits, each base filtering circuit one of comparing message-sending conditions set to a taken-in message from the transmission line with one of message-receiving conditions registered in advance and outputting the taken-in message if agreement is established in the comparison, and the at least two base filtering circuits are serially connected to each other in each set composed of at least two base filtering circuits.

Also, in the above distributed control system, the base filtering circuit includes an input-message storing part for including a message input from an external circuit, a registration part for registering message-receiving conditions, a comparison part for comparing a content of one of condition-identifying portions in the take-in message with the registered message-receiving conditions, a control part for determining whether or not the taken-in message is to be received in this node based on a result of the comparison, and an output-message storing part for storing a message to be received and for outputting the stored message to an external circuit.

On top of that, in the first distributed control system, each message includes an arbitration region composed of a condition-identifying portion indicating a data-kind and a condition-identifying portion indicating a message-sending node, and a data region composed of a condition-identifying portion indicating a message-receiving node and data to be transmitted; and a processor provided in each node includes a message-storing part for storing a message taken-in from the transmission line, a first comparison part for performing comparison-processing for the arbitration region, a second comparison part for performing comparison-processing for the data region, and a control part for determining whether or not the message is to be received in this node based on results of the comparison-processing performed in the first and second comparison parts, and for transferring the taken-in message to be received in this node to the received-message storing part.

Also, in the above distributed control system, the arbitration region is arranged at top position of a message sent be each node, and the processor controls sending of a message to another node based on bit-configuration in the arbitration region of the taken-in message transmitted in a serial transmission manner.

Moreover, the present invention provides a second distributed control system, wherein a message sent by each node includes predetermined address data in each condition-identifying portion; a comparison and selection means provided in each node includes a message storing part for storing a message taken-in from the transmission line, a registration part registering a plurality of flags, a flag being attached to each address, a received-message storing part for storing a message to be stored in this node, and a control part for determining whether or not the taken-in message is to be received in this node; and the control part determines whether or not the taken-in message is to be received based on a flag attached to an address indicated by a content of each condition-identifying portion in the taken-in message, and the control part further transfers the taken-in message to the received-message storing part.

Also, the present invention provides a third distributed control system wherein each node sends a message including at least two message-sending condition-identifying portions, one of the condition-identifying portions including data indicating a message-receiving node or non-designation of a message-receiving node; and a controller provided in each node includes a processor for controlling circuits in the controller and message-transmission with other nodes, a plurality of transmission processors, each transmission processor determines whether or not the taken-in message is to be received in this node based on a corresponding situation between contents of the condition-identifying portions and data of message-receiving conditions registered in this transmission processor, and a transceiver connected to the transmission line, for taking in each of messages transmitted on the transmission line and for sending the taken-in message to the transmission processors.

Next, to attain the second object, the present invention provides a method of message transmission performed by each node in a distributed control system in which a plurality of nodes are connected to a transmission line, each node controlling components in this node and transmitting a message to other nodes, the method comprising the steps of:

sending a message including at least two message-sending conditions by setting data indicating a message-receiving node or non-designation of a message-receiving node in one of the at least two condition-identifying portions;

taking in a message from the transmission line; and filtering the taken-in message, this step comprising the steps of:

checking for a corresponding situation between contents of the condition-identifying portions and data of message-receiving conditions registered in this node; and determining whether or not the taken-in message is to be received in this node based on results of the checking.

BRIEF DESCRIPTION OF THE DRAWINGS

FIGS. 24A, 24B, 24C, and 24D are illustrations showing the composition of the base filtering circuit, and examples of the data compositions in the registration part, the comparison-result setting register, and the register for storing the position of condition-identifying portions in a message, respectively, in the fifth embodiment according to the present invention.

DETAILED DESCRIPTION OF THE EMBODIMENTS

Hereafter, details of the embodiments will be explained with reference to the drawings.

Figure 1:
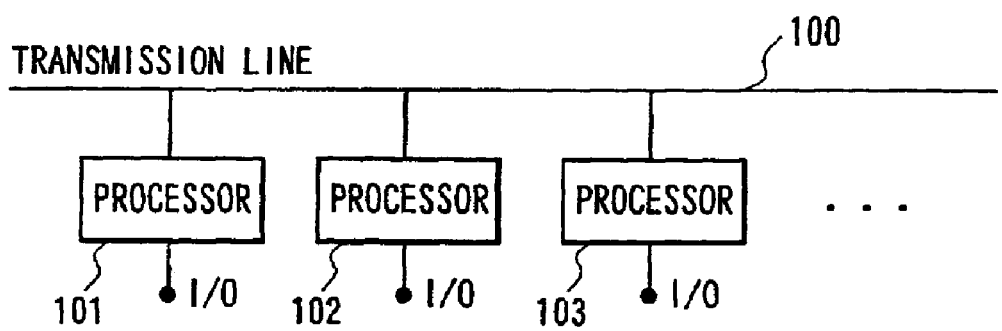
FIG. 1 is a schematic block diagram showing the composition of a distributed control system of the first embodiment according to the present invention.

The First Embodiment:

FIG. 1 is a schematic block diagram showing the composition of a distributed control system of the first embodiment according to the present invention. Each of Processors 101, 102, 103, . . . , is an element device of the distributed control system, which is connected to a transmission line 100, controls a component in this node, and processes transmission with other nodes. Further, each processor sends and receives messages via the transmission line 100. Although a bus-type transmission line is used as the transmission line 100 in this embodiment, any type transmission line such as a radio-transmission, an infrared ray transmission, etc., can be used.

The nodes including a processor, such as a general purpose computer, a field apparatus such as a process computer used for a process control, a work station, a personal computer, a PC (programmable controller), an intelligent I/O device, and so on can be connected to the transmission line 100. Further, this embodiment can be applied to a distributed control system composed of a plurality of nodes each of which includes a processor, such as a semiconductor production system, a home/building automation system, a medical system (for example, a blood automatic analyzer), etc., other than a process automation system and a factory automation system.

Figure 2:
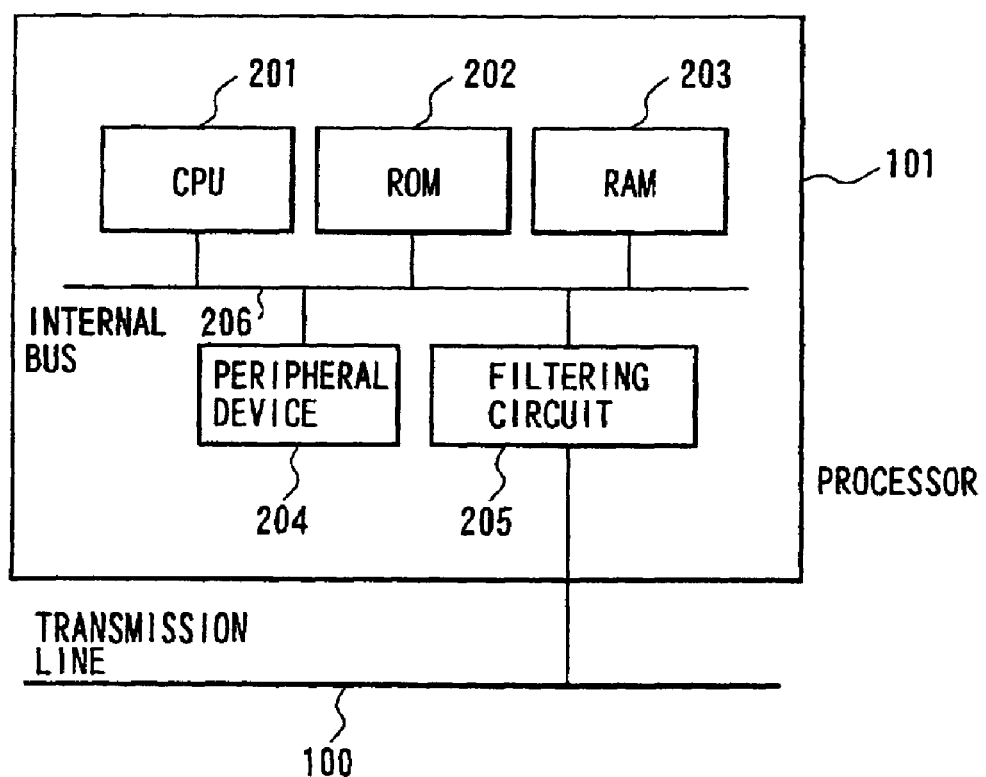
FIG. 2 is a schematic block diagram showing an example of the composition of each processor in the distributed control system shown in FIG. 1.

FIG. 2 shows a schematic block diagram of the composition of each processor in the distributed control system shown in FIG. 1. The composition of each processor is explained below by taking the processor 101 as an example. The processor 101 includes a CPU 201 which is a central processing unit to execute an application program for controlling a component in the self-node and performing transmission with other nodes, a ROM 202 which is a non-volatile memory storing programs executed by the CPU 201, a RAM 203 which is a volatile memory temporarily storing data, peripheral devices 204 such as a timer, a filtering circuit 205 for selecting and storing a message taken-in from the transmission line 100, and an internal bus 206 to which the above internal devices are connected, and is formed into an one-chip circuit. The internal devices in the processor 101 can transmit message to each other via the internal bus 206.

Figure 3:
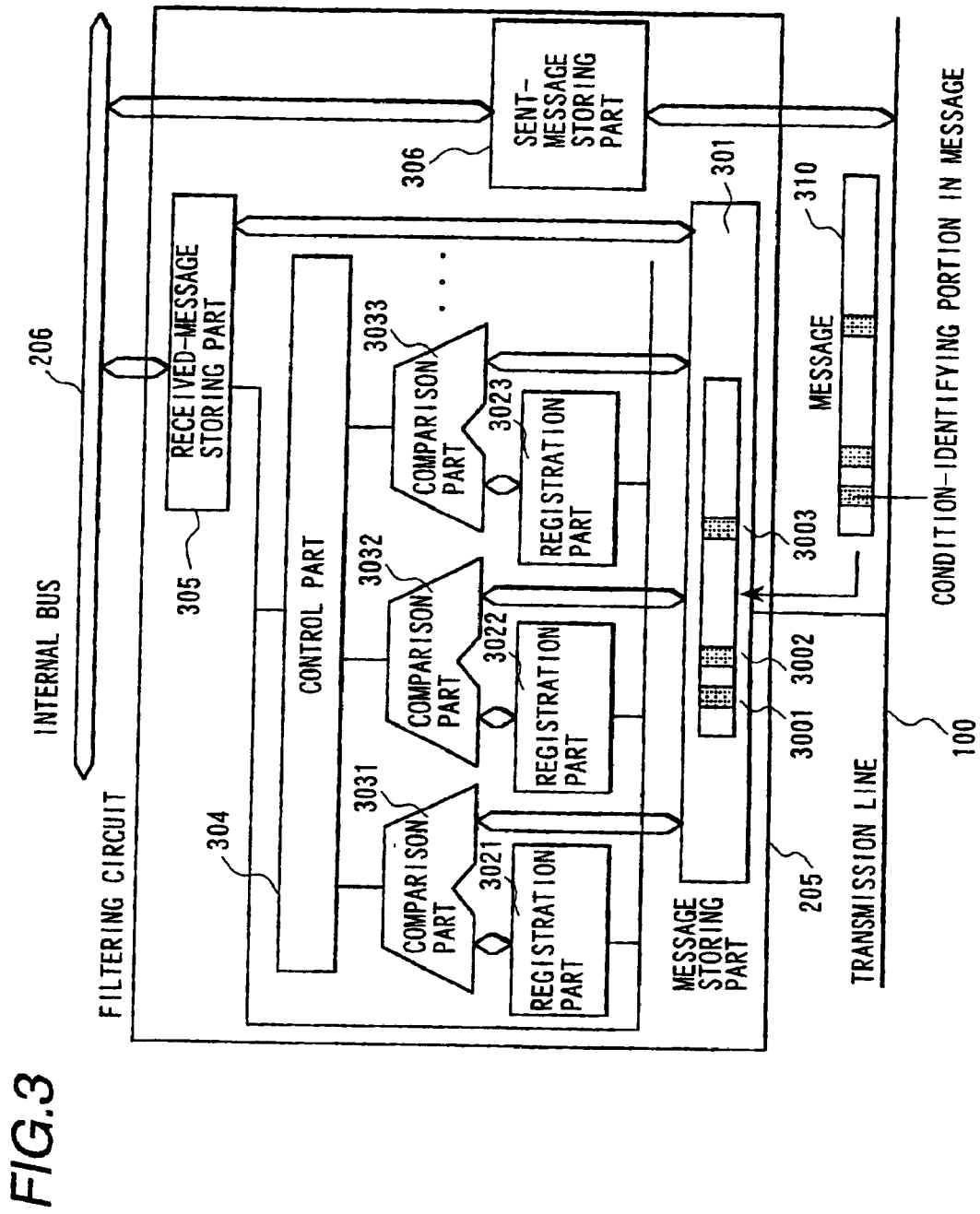
FIG. 3 is a schematic block diagram showing an example of the circuit composition of the filtering circuit shown in FIG. 2.

FIG. 3 shows a schematic block diagram of the circuit composition of the filtering circuit 205 shown in FIG. 2. The filtering circuit 205 takes in each of all messages transmitted on the transmission line 100. When the filtering circuit 205 takes in a message 310, the filtering circuit 205 converts the message 310 transmitted in a serial-type data to a parallel-type data, and stores the converted message 310 in the message storing part 301. The filtering circuit 205 determines whether or not the taken-in message 310 is to be stored by comparing message-sending condition-identifying portions (referred to merely as condition-identifying portions) 3001, 3002, and 3003 in the message with data registered in the registration parts 3021, 3022, and 3023 in the comparison parts 3031, 3032, and 3033, respectively.

Figure 4:
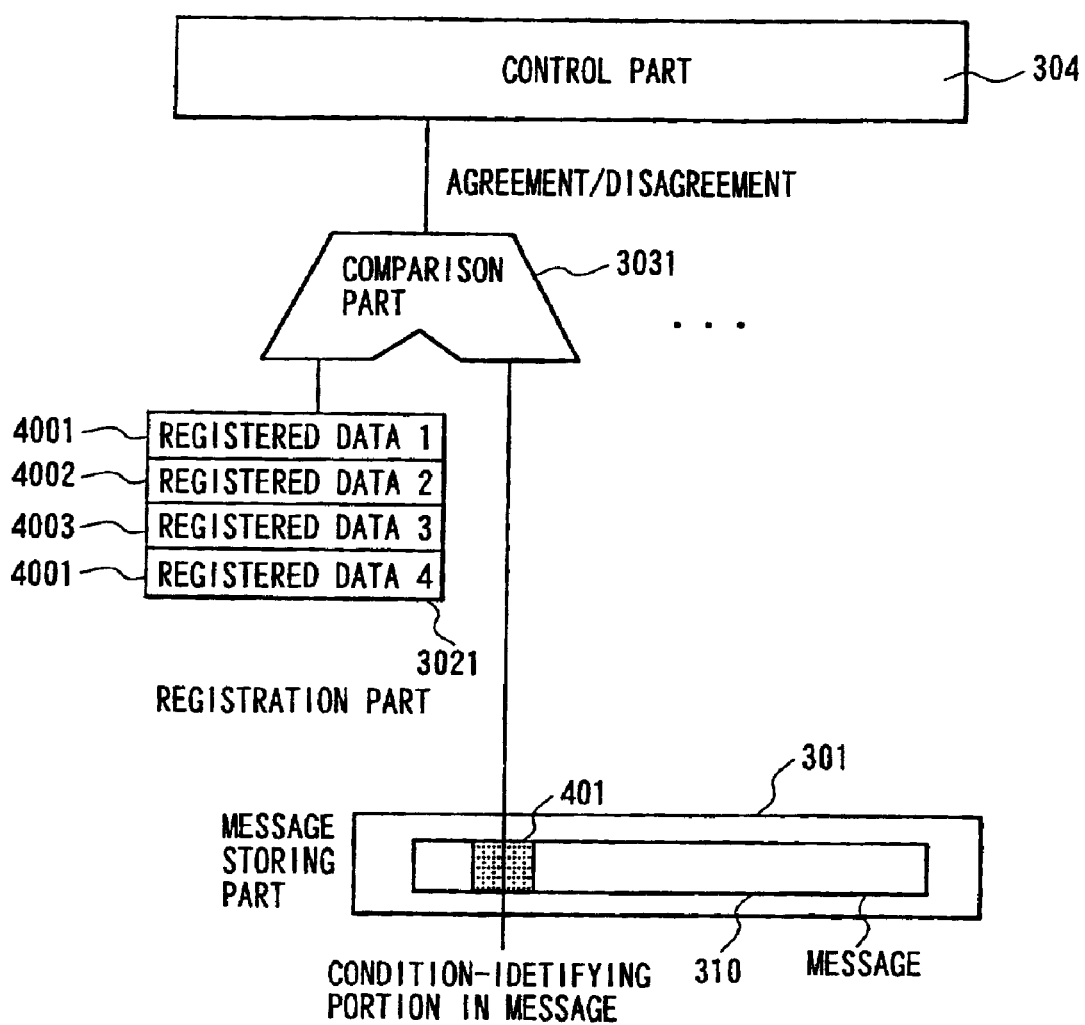
FIG. 4 is a schematic block diagram showing a part of the filtering circuit and an example of the data composition of the registration part shown in FIG. 3.

FIG. 4 shows a schematic block diagram of a part of the filtering circuit and an example of the data composition of the registration part shown in FIG. 3. In the registration part 3021, plural items of condition data (referred to as registered data) used to determine whether or not the taken-in message is to be received in this node. These registered data are stored, for example, by the CPU 201 via the internal bus 206. FIG. 4 shows an example in which the registered data 1 (4001), 2 (4002), 3 (4003), and 4 (4004) are stored in the registration part 3021. When the message 310 taken-in from the transmission 100 is stored in the message storing part 301, the comparison part 3031 compares the condition-identifying portion 401 (3001) in the message 310 with the registered data 4001–4004 in turn, and determines whether or not the agreement is established. The position of the condition-identifying portion 401 (offset-position: the number of bits or bytes counted from the top of the message data to the position of the portion 401) and the size of the portion 401 (the number of bits or bytes composing the portion) are set in advance. Further, one comparison part performs the comparison-processing for one condition-identifying portion.

The result of the comparison performed by the comparison part 3031 is sent to the control part 304. In the case shown by FIG. 4, the comparison part 3031 compares the condition-identifying portion 401 with the registered data 4001–4004 in turn, and if the agreement is established for one of the registered data 4001–4004, it is determined that the message-sending condition set to the portion 401 agrees with one of message-receiving conditions stored in the registration part 3021, and the control part 304 is informed of the establishment of the agreement in the comparison part 3031.

In the explanation for operations of the filtering circuit 205, it is assumed that the message 310 includes at least two condition-identifying portions. The message 310 includes the three condition-identifying portions 3001–3003, and the three comparison parts 3031–3033 are provided in the filtering circuit 205 in order to compare the three portions 3001–3003. One registration part is provide in each comparison part. The comparison part 3031 compares the contents of the condition-identifying portion 3001 in the message 310 with the registered data in the registration part 3021. In the same manner, the comparison part 3032 compares the contents of the condition-identifying portion 3002 in the message 310 with the registered data in the registration part 3022, and the comparison part 3033 compares the contents of the condition-identifying portion 3003 in the message 310 with the registered data in the registration part 3023. Each of the comparison parts 3031–3033 informs the control part 304 of whether or not the agreement is established for one of the registered data in its registration part.

Figure 5:
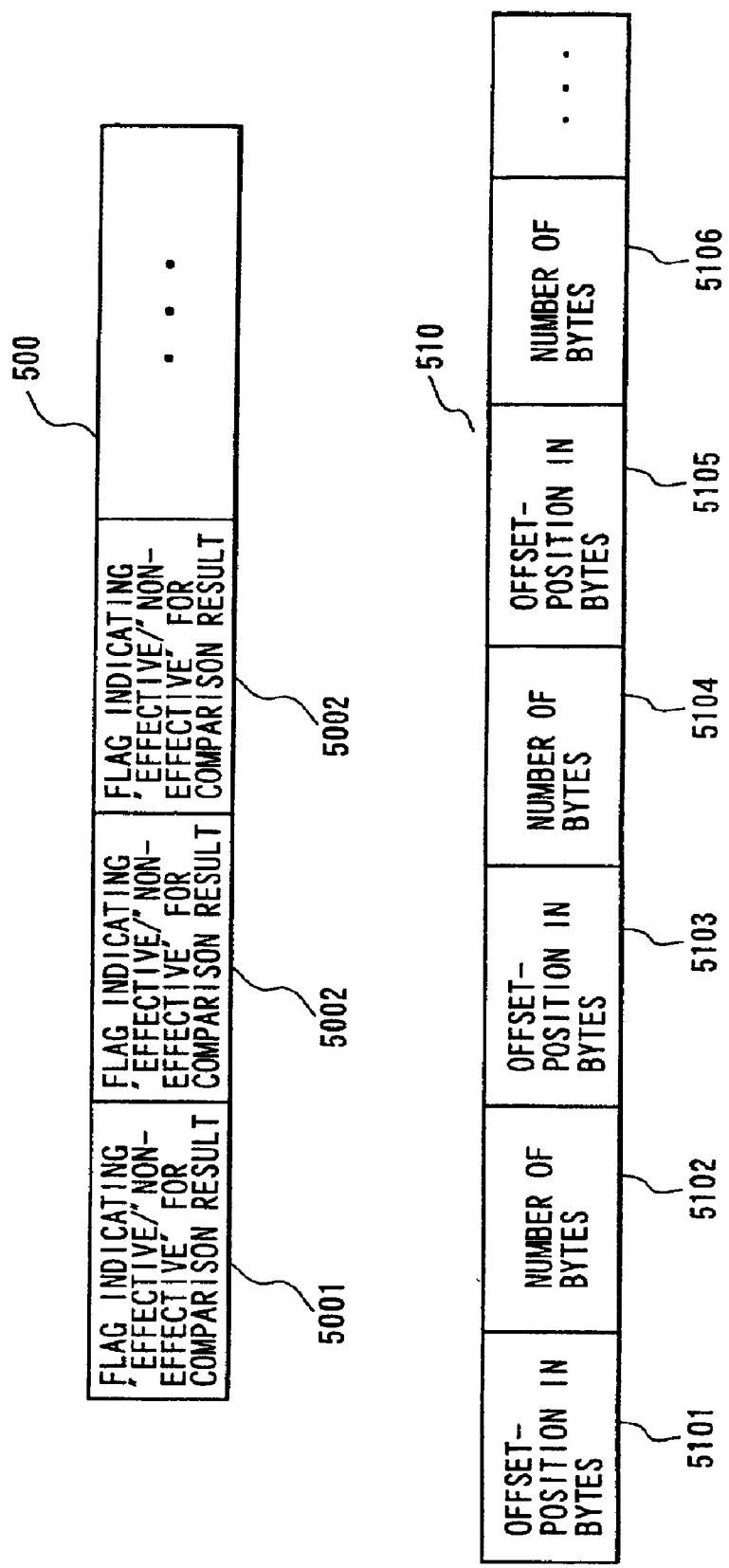
FIG. 5 shows examples of the contents of the comparison effectiveness setting register and the condition-identifying-portion information setting register provided in the control part shown in FIG. 4.

The control part 304 includes the comparison-effectiveness setting register 500 and the condition-identifying-portion position setting register 510 which are shown in FIG. 5. The comparison-effectiveness setting register 500 is used to preset a flag for dealing with the result obtained in each comparison part as "effective" or "non-effective". In the register 500, flags of the same number as that of the comparison parts are preset, each of which indicates "effective"/"non-effective" for the result obtained in a corresponding comparison part. Each of the flags 5001–5003 indicating "effective"/"non-effective" for respective comparison results is set for a correspond one of the comparison parts 3031–3033. If a flag indicating "effective"/"non-effective" for a comparison result is "non-effective", it is regarded that the agreement for a corresponding condition-identifying portion is always established regardless of the comparison-result actually obtained in a corresponding comparison part.

Further, the register 510 for setting the condition-identifying portion positions in a message is provided for registering the position and size of each condition-identifying portion in a message. Contents of the register 510 for setting the condition-identifying portion positions in a message are composed of the offset-positions in bytes, 5101, 5103, and 5105, and the number of bytes, 5102, 5104, and 5106. A pair of the offset-position in bytes and number of bytes of each portion corresponds to each comparison part by one-to-one. That is, the offset-positions in bytes, 5101, 5103, and 5105 and the number of bytes, 5102, 5104, and 5106, correspond to the comparison parts 3031, 3032, and 3033, respectively. The offset-position in bytes indicates the position of the first byte in each condition-identifying portion counted from the top of a message in bytes. Also, the number of bytes indicates the size of each condition-identifying portion counted in bytes. Although the position and the size of each condition-identifying portion in a message is indicated in bytes in this embodiment, they can be indicated in bits if they cannot be expressed in bytes. The offset-position in bytes and the number of bytes of each portion is set to the register 510 for setting the condition-identifying portion positions in a message, for example, by the CPU 201.

The control part 304 stores the input message 310 in the received-message storing part 305 if comparison-results in all the comparison parts indicate "agreement". Here, although the received-message storing part 305 is a FIFO-type memory which can store a plurality of messages, and the stored message can be read out in turn by the CPU 201 via the internal bus 206, an overwrite-type memory in which a message is over-written, and only the latest message is stored, can be used for the received-message storing part 305. The message stored in the received-message storing part 305 is read out by the CPU 205 via the internal bus 206, and is processed by a program executed in the CPU 201. If any one of the comparison parts outputs the comparison result of "disagreement", the message 310 stored in the message storing part 301 is abandoned.

Moreover, a message can be transmitted by the filtering circuit 205. When a message is transmitted from each processor, the CPU 201 stores the message to be sent in the sent-message storing part 306 via the internal bus 206. If a message is stored in the sent-message storing part 306, the filtering circuit 205 sends the message to the transmission line 100.

Figure 6:
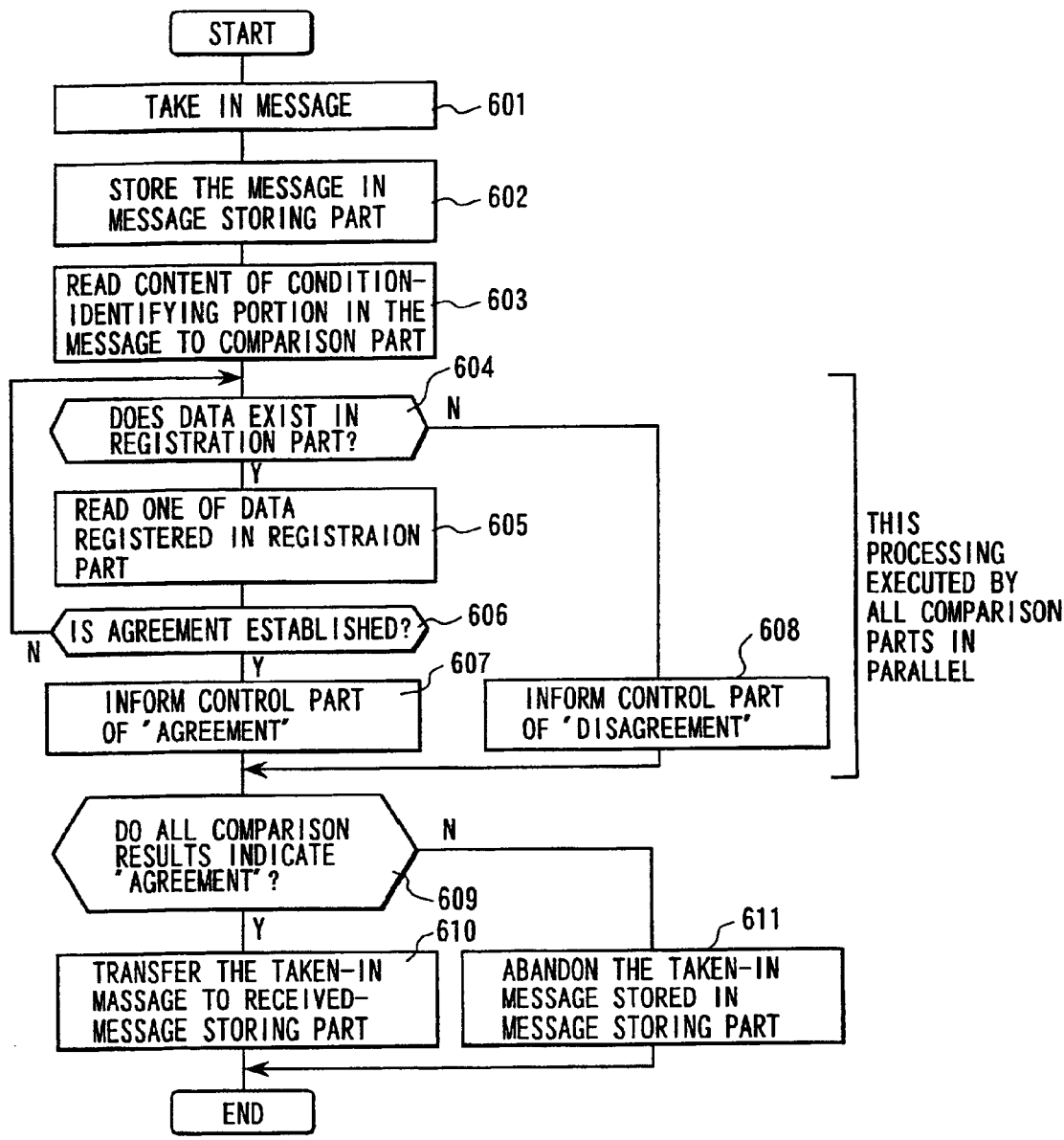
FIG. 6 is a flow chart showing operations of the filtering circuit of the first embodiment.

FIG. 6 is a flow chart showing operations executed the filtering circuit when a message is taken into the message storing part. If a message is taken-in from the transmission line 100 (step 601), in step 602, the filtering circuit 205 stores the message in the message storing part 301. In step 603, each comparison part in the filtering circuit 205 reads the content of a condition-identifying portion in the taken-in message, the portion being allocated to this comparison part. If at least one registered data exists in the registration part corresponding to the comparison part (step 604), in step 605, the comparison part reads one item of data in the registration part, and in step 606, compares the read item of data with the content of condition-identifying portion. If the agreement is not established in the comparison (step 606), in step 604, the comparison part checks whether or not any further item of data exists in the registration part. On the other hand, if the agreement is established (step 606), in step 607, the comparison part informs the control part 304 of the agreement. If any item of data does not remain in the registration (604), in step 608, the comparison part informs the control part 304 of the disagreement in the comparison for the present condition-identifying portion in the message. The processing of steps 603–608 is executed in parallel by all the comparison parts 3031–3033. When the control part 304 receives the comparison results from all the comparison parts 3031–3033, in step 609, the control part 304 checks whether or not each of the comparison results in the comparison parts corresponding to flags which are set as "effective" in the comparison effectiveness setting register 500 indicates the agreement. If all the above-checked comparison results indicate the agreement, in step 610, the message stored in the message storing part 301 is transferred to the received-message storing part 305. Conversely, if any one of the comparison results indicates the disagreement, in step 611, the message stored in the message storing part 301 is abandoned.

Figure 7A:
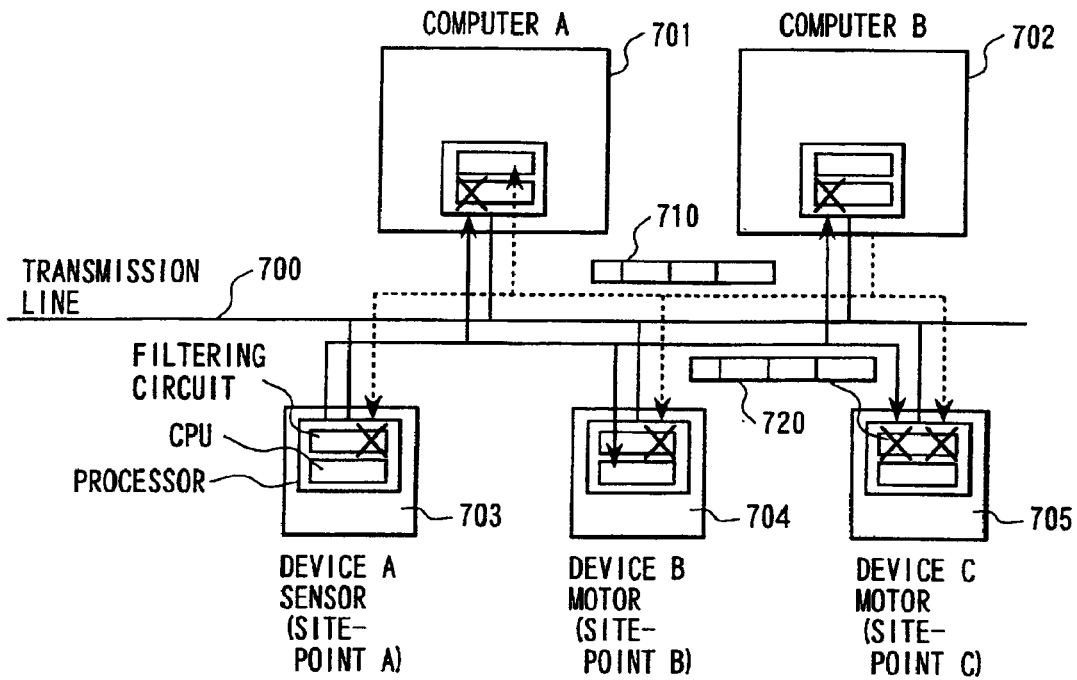
FIGS. 7A and 7B are an illustrations showing an example of the composition of the first embodiment and an example a format of a message used in this embodiment.
Figure 7B:
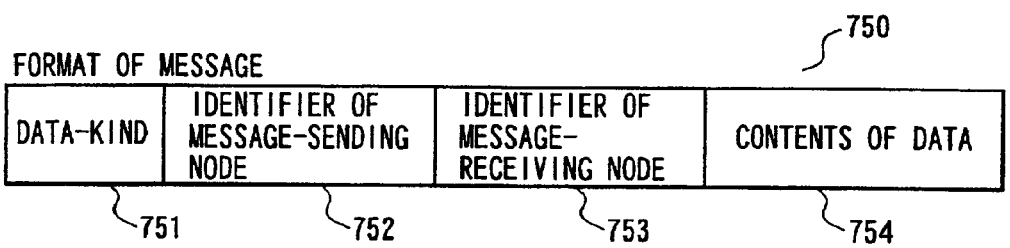

FIGS. 7A and 7B shows an example of the system composition of the first embodiment and an example of a message format used in this embodiment. A computer A 701, a computer B 702, and devices A 703, B 704, and C 705 provided at site-points A, B, and C, respectively, are connected to the transmission line 700. The devices A, B and C are a sensor, a motor, and so on, each device including an input/output (I/O) circuit and controlling a plant. In FIG. 7A, the device A 703 is a sensor for detecting the position of an object, and the devices B 704 and C 705 are motors.

The device in each node sends a message 750 with the same format to the transmission line 700. The message 750 is composed of a data-kind identifier 751, an identifier 752 of a message-sending node, an identifier 753 of a message-receiving node, and data 754 to be transmitted. As data 754 to be transmitted, information data such as a sentence are mainly transmitted among computers, and control data such as a sensor-data are mainly transmitted among devices.

Figure 8A:
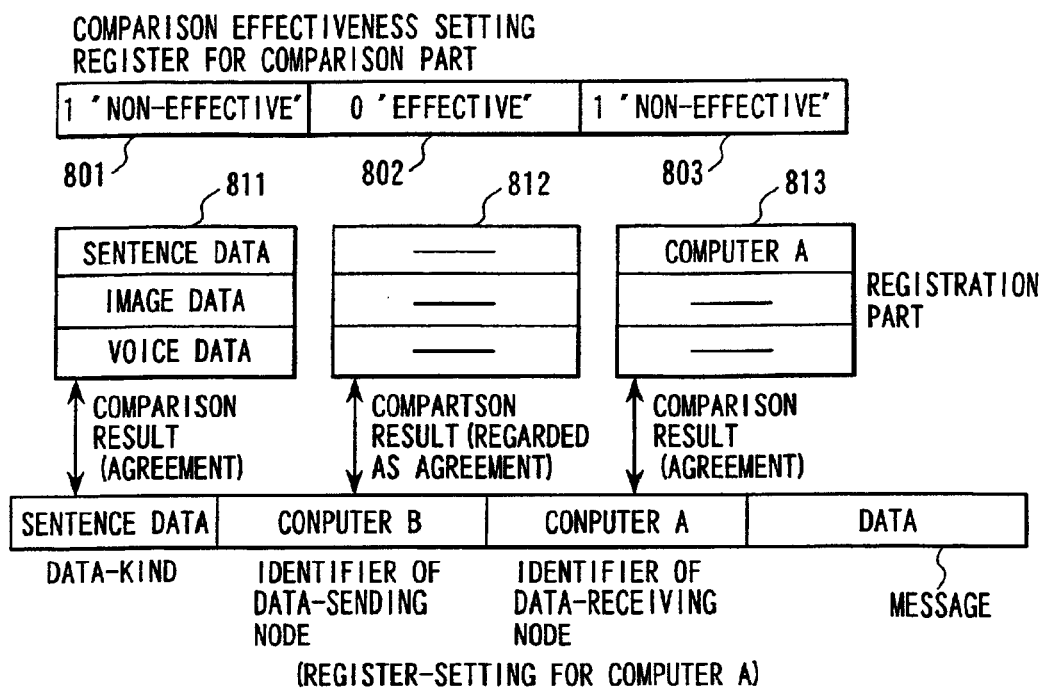
FIGS. 8A and 8B are illustrations showing data-setting examples in the registration parts and the sent message, and data-setting examples of the comparison effectiveness setting register in each node in the first embodiment.
Figure 8B:
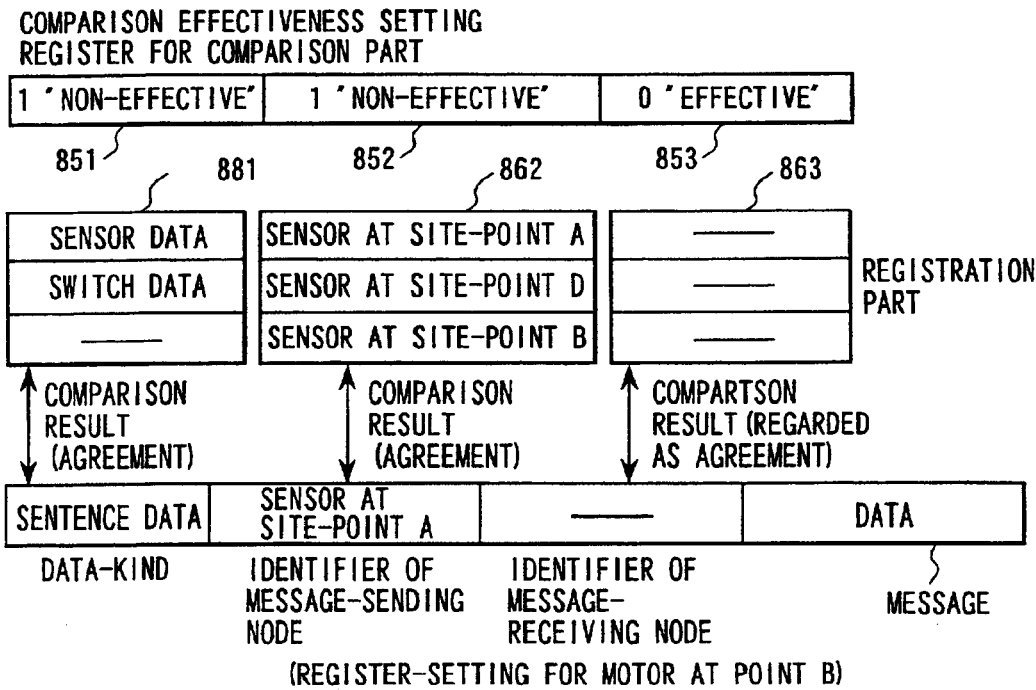

Here, it is assumed that the computer A 701 receives and processes information data such as sentence data, image data, voice data, etc., the device B 704 receives control data such as a sensor-data sent from the device A 703, and drives a motor in this device, and that although the device C 705 receives control data such as a sensor-data, and controls a motor in this device, the device C 705 does not receive a sensor-data sent from the device A 703. FIGS. 8A and 8B shows examples of data set to the comparison effectiveness setting registers and examples of data stored in the registration parts in the computer A 701 and the device B 704 in the case that the computer B 702 sends a message 710 including sentence data, the device A 703 transmits a message 720 without designating a message-receiving node.

In the computer A 701, since specified kind of data are received, "effective (=1)" is set to a flag 801 indicating "effective"/"non-effective" for a comparison result corresponding to the data-kind identifier. Moreover, since the computer A 701 receives sentence data, image data, and voice data, the computer A 701 registers data designating these kinds of data in the registration part 811. Further, since the computer A 701 receives only a message addressed to the computer A, "effective (=1)" is set to a flag 803 indicating "effective"/"non-effective" for a comparison result corresponding to the identifier of a message-receiving node. Also, the computer A 701 registers "computer A" indicating the self-node in the registration part 813. Furthermore, in order to receive a message sent from any node regardless of a message-sending node, "non-effective (=0)" is set to a flag 802 indicating "effective"/"non-effective" for a comparison result corresponding to the identifier of a message-sending node. Accordingly, even if any data is registered in the registration part 812, since a flag 802 indicating "effective"/"non-effective" for a comparison result corresponding to the identifier of a message-sending node is "non-effective (=0)", the comparison result of this comparison part is always regarded as "agreement". By the above setting for the register 500 and the registration parts 811–813, the computer A 701 can select and receive only sentence data, image data, and voice data. Although a series of letters is used as the registered data and the data of the condition-identifying portions in this embodiment, symbols or numerals representing the kinds of data, for example, 1: sentence data, 2: image data, and 3: voice data, can be used as the kind of data.

Next, the device B 704 receives sensor-data and switch-data. Moreover, the device B 704 receives only data sent from the sensor (device A) at the site-point A, a sensor at the site-point D, and a switch at the site-point B, and drives the motor. Meanwhile, the sensor at the site-point D and the switch at the site-point B are not shown in FIG. 7A. In the device B 704, since specified kinds of data are received, "effective (=1)" is set to a flag 851 indicating "effective"/"non-effective" for a comparison result corresponding to the data-kind identifier. In this example, since the device B 704 receives only sensor-data and switch-data, the device B 704 registers data designating these kinds of data in the registration part 861. Further, since only data sent from a specified message-sending node is received, "effective (=1)" is set to a flag 852 indicating "effective"/"non-effective" for a comparison result corresponding to the identifier of a message-sending node. Also, in order to receive only data sent from the sensors at the site-points A and D, and the switch at the site-point B, the device B 704 registers the data designating these message-sending nodes in the registration 862. Since control data are received by a plurality of nodes, control data are broadcasted without designating a message-receiving node. Therefore, the identifier of a message-receiving node is not designated. Accordingly, a message-receiving node is arbitrary, and "non-effective (=0)" is set to a flag 853 indicating "effective"/"non-effective" for a comparison result corresponding to the identifier of a message-sending node. By the above setting of the register 500 and the registration parts 861–863, the device B 704 can select and receive only sensor-data and switch-data sent from the sensors at the site-point A and D, and the switch at the site-point B. Thus, data other than these data are abandoned by the filtering circuit.

According to this embodiment, when each processor taken in a message, the filtering circuit in the processor compares the data registered in advance with the condition-identifying data designated in the taken-in message, and determines whether or not the taken-in message is to be stored. Therefore, if a user registers conditions of messages which he wants, he can receive only messages satisfying the conditions, and does not receive messages unnecessary to him. Since only sentence data addressed to a user itself can be received with a computer, and a device can receive only a sensor-data sent from a specified device, it is possible to compose a distributed control system in which control data and information data are transmitted together in a common transmission line. Moreover, since the determination of whether or not a transmitted message is received in a node is carried out by the filtering circuit of this node, the speed of this determination is high, which can prevent a failure in data-receiving. Since a CPU need not perform the determination of whether or not a transmitted message is received in a node, different from a conventional system, this determination does not affect processing of programs executed by the CPU, and it does not naturally increase the computing load of the CPU. Thus, a programmer can efficiently develop an application program executed in a CPU without being conscious of the processing of data-receiving and sending.

The Second Embodiment 2:

In the first embodiment 1, the effectiveness of a comparison for each condition-identifying portion in a message is set to a register. In the second embodiment, this effectiveness of a comparison for each condition-identifying portion in a message is set along with condition data in each registered data. Although the compositions of the system, the processor, and the filtering circuit are the same as those shown in FIGS. 1, 2, and 3, respectively, in the first embodiment, the data composition in the registration part and the processing performed by the control part are different from those in the first embodiment.

In this embodiment, the control part 304 does not include the comparison effectiveness setting register 500 shown in FIG. 5, but only the condition-identifying-portion position setting register 510.

Figure 9:
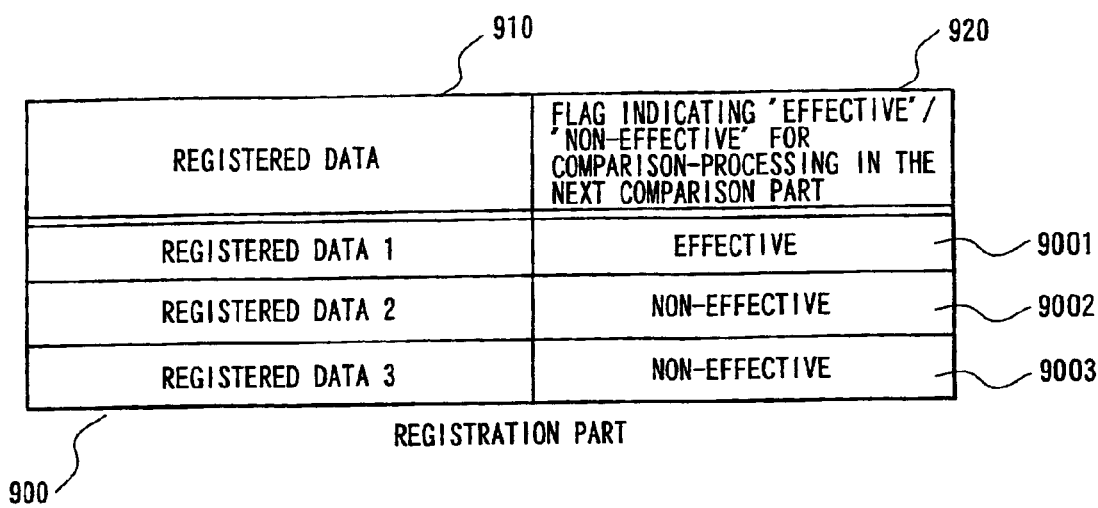
FIG. 9 is an example of the data composition of the registration part of the second embodiment according to the present invention.

FIG. 9 is an example of the data composition in the registration part of the second embodiment according to the present invention. The registration part 900 stores the registered data 910 and flags 920, each of the flags 920 indicating "effective"/"non-effective" for comparison-processing in the next comparison part, which corresponds to each of the registered data. These data and flags are registered in the registration part 900, for example, by the CPU 201 via the internal but 206. In the example shown in FIG. 9, the registered data 1 is registered as the registered 910, and a flag 9001 of "effective" is registered as one of the flags 920, corresponding to the registered data 1. In a similar manner, a pair of a registered data 2 and a flag 9002 of "non-effective and a pair of a registered data 3 and a flag 9003 of "non-effective are registered. In this embodiment, the comparison part 3031 shown in FIG. 3 compares the condition-identifying portion 3001 in the taken-in message 310 with the registered data 910 registered in the registration part 3021. If the condition-identifying portion 3001 in the message 310 agrees with one of the registered data 910, the comparison part 3031 informs the control part 304 of the agreement, and sends the flag 9001 indicating "effective" for comparison-processing in the next comparison part to the control part 304.# Since the flag 9001 indicating "effective", a similar processing is executed for the next registered data and the flag 9002 indicating "effective"/"non-effective" for comparison-processing in the next comparison part informed by the comparison part 3032. If a flag indicating "effective"/"non-effective" for comparison-processing in the next comparison part indicates "non-effective", the message 310 stored in the message storing part 301 is stored in the received-message storing part 305 regardless of results in comparison processing executed by the remaining comparison parts.

Figure 10:
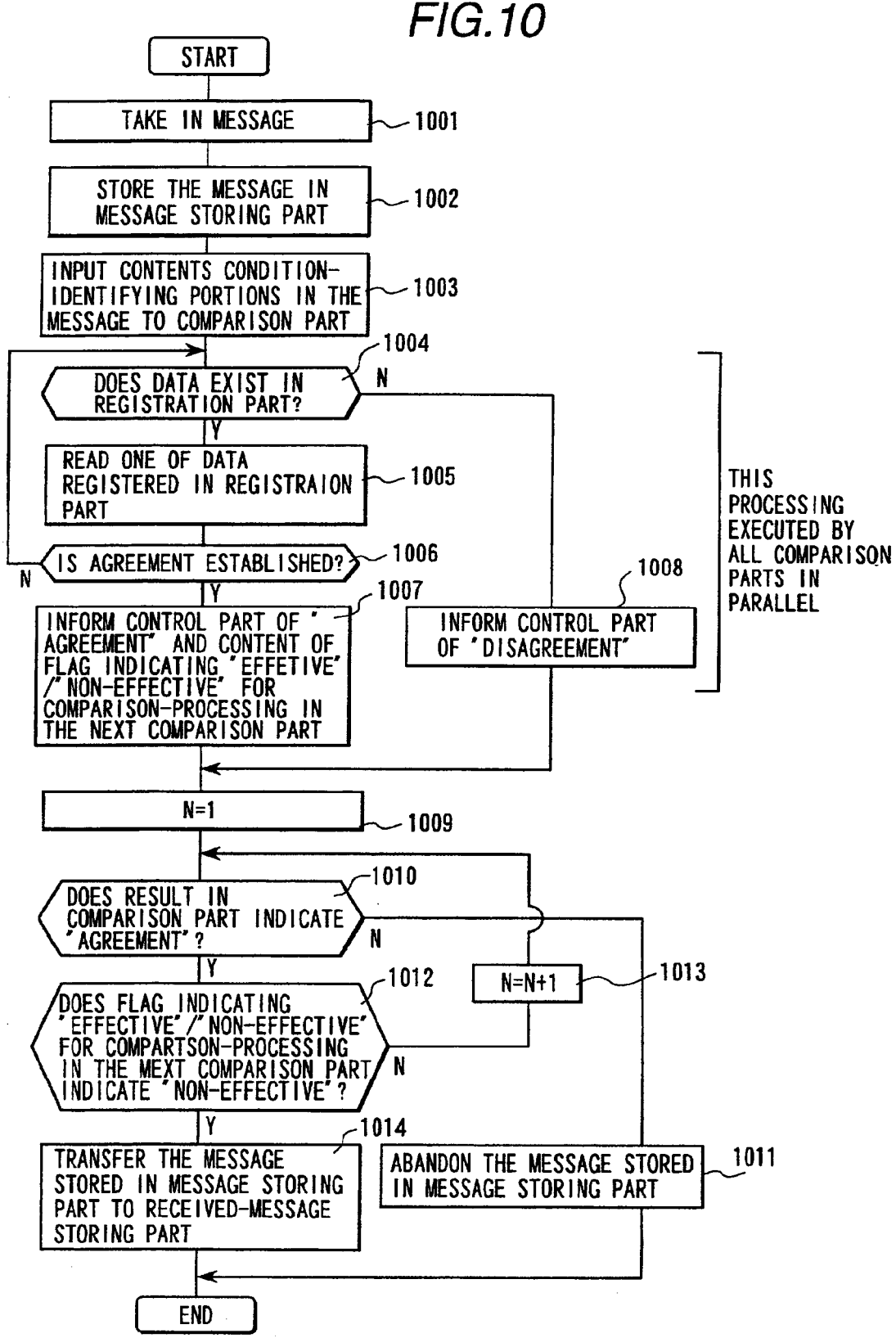
FIG. 10 is a flow chart showing operations of each filtering circuit of the second embodiment.

FIG. 10 is a flow chart showing operations of each filtering circuit of the second embodiment. When the filtering circuit 205 takes in the message 310 from the transmission line 100 (step 1001), in step 1002, the filtering circuit 205 stores the message 310 in the message storing part. In step 1003, each comparison part in the filtering circuit 205 reads the content of a condition-identifying portion in the taken-in message, the portion being allocated to this comparison part. If at least one item of data exists in the registration part (step 1004), in step 1005, the comparison part reads the item of the registered data and the corresponding flag indicating "effective"/"non-effective" for comparison-processing in the next comparison part, and in step 1006, compares the read condition-identifying portion with the read item of the registered data. If the agreement is not established in the comparison (step 1006), in step 1004, the comparison part checks whether or not a further item of data exists in the registration part. On the other hand, if the agreement is established (step 1006), in step 1007, the comparison part informs the control part 304 of the agreement and the content of a corresponding flag indicating "effective"/"non-effective" for comparison-processing in the next comparison part. If any item of data does not remain in the registration part (step 1004), in step 1008, the comparison part informs the control part 304 of the disagreement in the comparison for the present condition-identifying portion in the message. The processing of steps 1003–1008 is executed in parallel by all the comparison parts 3031–3033. When the control part 304 receives the comparison results from all the comparison parts 3031–3033, the processing of step 1009–step 1014 is performed for the comparison results and the flag sent from the comparison parts 3031–3033 in the order. Here, the comparison part N shown in this flow chart is a comparison part to perform the comparison for the N-th portion counted from the top of the condition-identifying portion potions in the message. Since the above processing is executed for the portions in the message in the order of 1 to N, in step 1009, the value "1" is set to N. In step 1010, it is checked whether or not the comparison result informed by the comparison part N indicates "agreement". If the checked comparison result does not indicate "agreement" (1010), in step 1011, the message stored in the message storing part 301 is abandoned, and the processing goes to END. If the checked comparison result does not indicate "agreement" (1010), in step 1012, it is further checked whether or not the flag sent from the comparison part N indicates "effective". If the checked flag indicates "effective", in step 1013, the number N is increased by one, and the processing of step 1010–step 1012 is repeated for the comparison result sent from the comparison part N+1. Conversely, if the checked flag indicates "non-effective" (step 1012), the message stored in the message storing part 301 is transferred to the received-message storing part 306, and the processing goes to END.

Figure 11A:
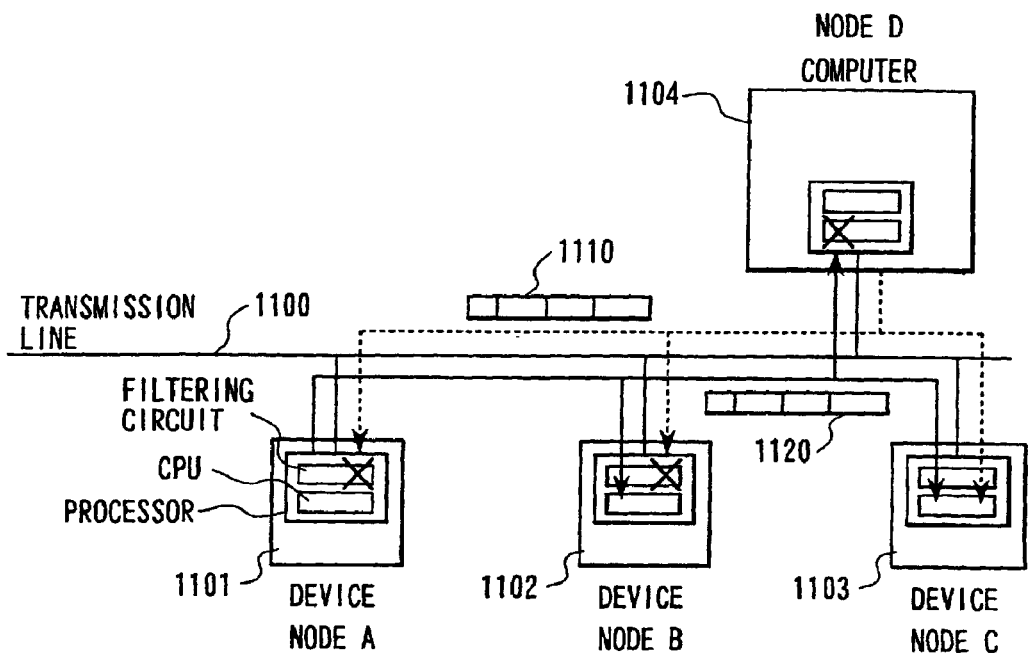
FIGS. 11A and 11B are illustrations showing an example of the distributed control system of this embodiment and a format of a message used in the second embodiment.
Figure 11B:
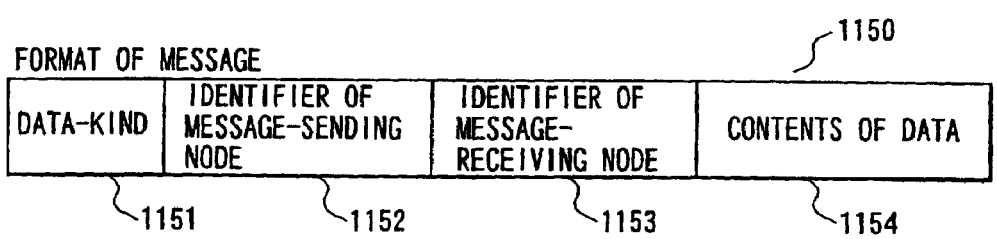

The system composition of this embodiment data-setting examples, and comparison-processing examples which are carried out for examples of data-setting in the registration parts and the sent message in this embodiment are shown in FIGS. 11A and 11B, FIGS. 12A and 12B, and FIGS. 13A and 13B. FIGS. 11A and 11B shows the composition of the distributed control system of this embodiment and a format of a message used in this embodiment, respectively. In this composition, nodes A 1101, B 1102, C 1103, and D 1104 are connected to a transmission line 110. The nodes A, B, and C are devices, which sends and receives control data, for controlling a plant, and the node D is a computer with a display unit provided for an operator, for setting control parameters to the devices A 1101, B 1102, and C 1103, and for monitoring operational states of the plant. Each node connected to the transmission line 1100 sends a message 1150 with the same format. The message 1150 is also composed of a data-kind identifier 1151, an identifier 1152 of message-sending node, an identifier 1153 of message-receiving node, and data 1154 to be transmitted, similar to the message 750.

The node A sends a message 1120 including control data under the broadcasting condition without designating a message-receiving node. the message 1120 is received and processed by the nodes B and C which control a plant. Further, the computer D sends a message 1110 including data set to a device in order to change the data set to the node C. since data set to a device are sent to a specified node, the computer D sends the message 1110 by designating the node C 1103 as a message-receiving node. Accordingly, the message 1110 is received only by the node C. Since the data length of information on data set to a device is longer than that of control data, the data set to a device affects the performance of a control program executed by a node which receives the data set to a device. Therefore, in the nodes A and B in which data set to these nodes are not changed, each filtering circuit abandons the message 1110.

Figure 12A:
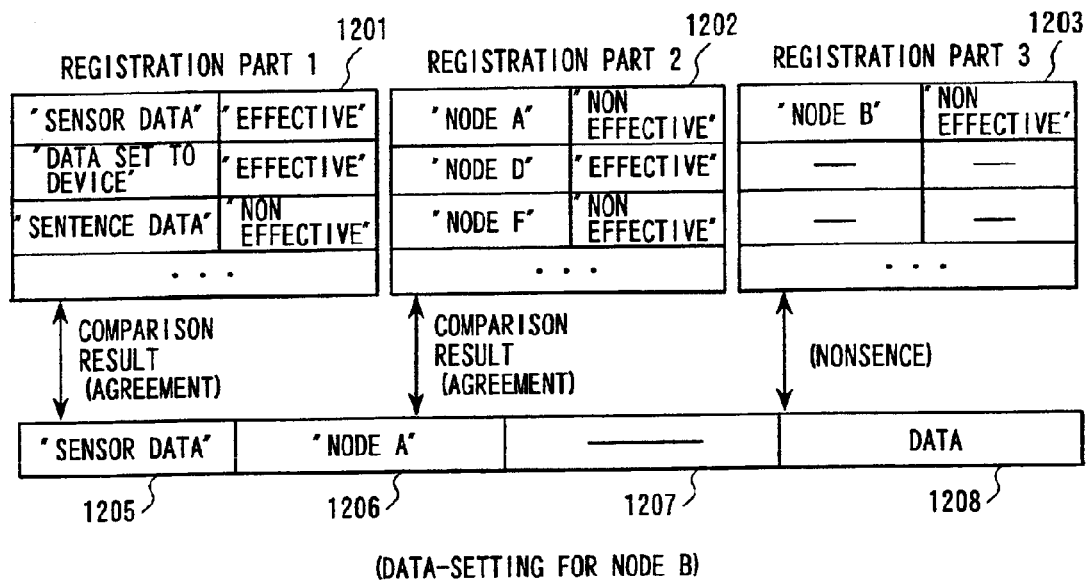
FIGS. 12A and 12B are illustrations showing data-setting examples, and comparison-processing examples which are carried out for examples of data-setting in the registration parts and the sent message in the second embodiment.
Figure 12B:
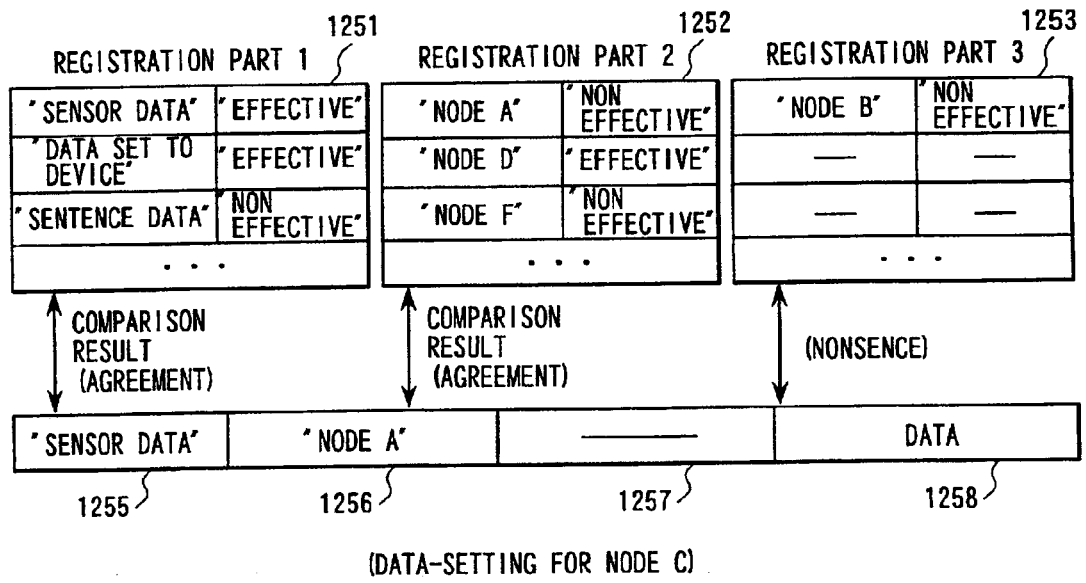
Figure 13A:
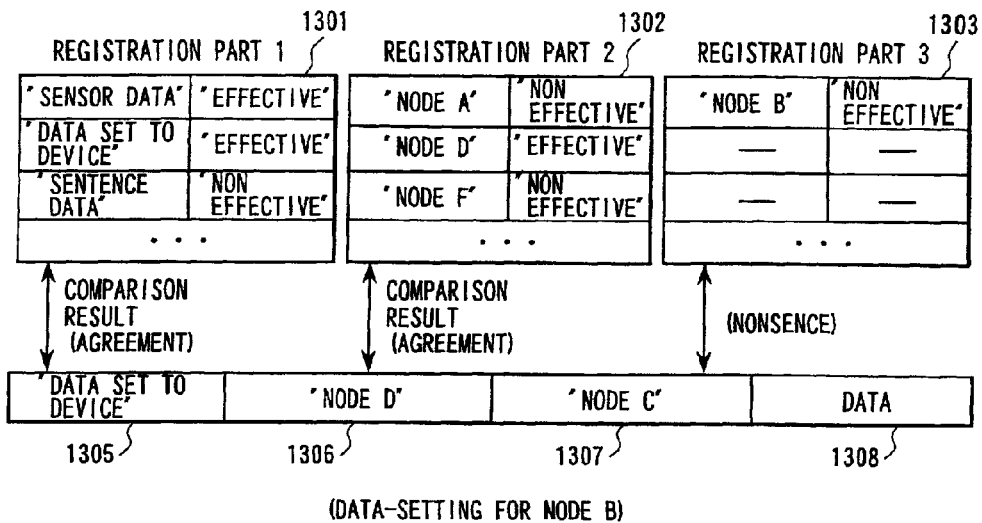
FIGS. 13A and 13B are illustrations showing other data-setting examples of the registration parts and the sent message, and comparison-processing examples which are carried out for examples of data-setting in registration parts and the sent message in the second embodiment.
Figure 13B:
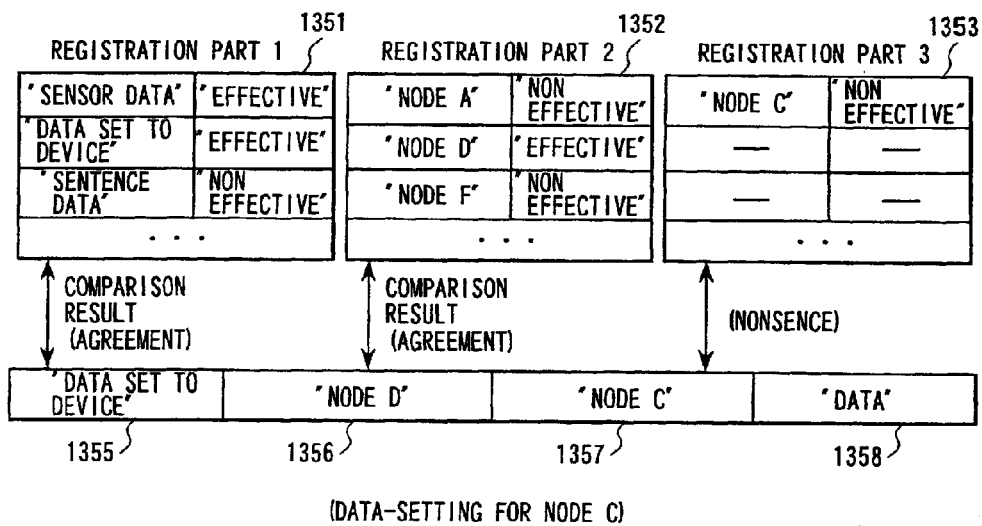

FIGS. 12A and 12B, and FIGS. 13A and 13B show data-setting examples in the registration parts and the sent message, and comparison-processing examples carried out for these date-setting examples by the filtering circuit in each node, respectively. In the examples shown in FIGS. 12A and 12B, control data (the message 1120) sent from the node A is processed by the filtering circuit, and in the examples shown in FIGS. 13A and 13B, the data set to a device, which is sent from the node D, is processed by the filtering circuit. Moreover, FIGS. 12A and 13A shows the data-setting examples in the registration parts and the sent message in the node B, and the comparison-processing examples which are carried out for the date-setting examples by the filtering circuit in the node B. On the other hand, FIGS. 12B and 13B shows the data-setting examples in the node C, and the comparison-processing examples carried out by the filtering circuit in the node C.

As shown in FIGS. 12A, the node A sets "sensor data (1205)" and "node A (1206)" to the data-kind identifier and the identifier of a message-sending node to the message sent by the node A, respectively. As to the identifier of a message-receiving node, sine the message is broadcasted, and a message-receiving node is arbitrary, any data is not set as the identifier of a message-receiving node. Moreover, control data such as sensor data (for example, a control signal for turning on/off a sensor) are set as data 1208. On the other hand, the node B 1102 registers "sensor data" and "data set to a node" in the registration part 1 (1201) as the registered data in order to receive a message for changing control parameters set to the node B, and sets the two flags indicating "effective"/"non-effective" for comparison-processing in the next comparison part, which correspond to the above items of the registered data, as "effective". Since the node B receives messages sent from the nodes A, D, and F, the node B registers names of these nodes in the registration part 2 (1202) as the registered data. However, since the nodes A and F are devices, and send control data, it is not necessary to determine whether or not the message of control data is to be received by the node B by performing the comparison-processing for the identifier of a message-receiving node. Therefore, the flags indicating "effective"/"non-effective" for comparison-processing in the next comparison part, which correspond to the registered data for the nodes A and F, are set as "non-effective". The node D is a computer to set data such as control parameters to a device, and sends a message by designating a node which should receive the message. Further, since the node B receives only a message sent from the node D to the node B, it is necessary to determine whether or not the message is to be received by the node B by performing the comparison-processing for the identifier of a message-receiving node. Accordingly, the flags indicating "effective"/"non-effective" for comparison-processing in the next comparison part, which correspond to the registered data for the nodes A and F, are set as "non-effective". Thus, the node B registers "node B" in the registration part 3 (1203) for the identifier of a message-receiving node. and receive only sentence data, image data, and voice data. Although a series of letters is used as the registered data and the data set to the identifies in a message in this embodiment, symbols or numerals representing the kind of data, a message-sending node, and a message-receiving node, can be also used.

When the filtering circuit in the node B takes in a message sent from the node A, the comparison part 3031 compares the content of the data-kind identifier(1205) with the registered data in the registration part 1 (1201). If the agreement is established in the comparison-processing, the comparison part 3031 informs the control part 304 of the comparison result of "agreement" and the content of the flag indicating "effective"/"non-effective" for comparison-processing in the next comparison part, which corresponds to the compared item of the registered data. In this example, the comparison part 3031 informs the control part 304 of "agreement" and the content "effective" of the flag. Similar to the above comparison-processing, the comparison part 3032 compares the content "node A" of the second identifier (1206) of a message-sending node with the registered data in the registration part 2 (1202), and informs the control part 304 of "agreement" and the content "non-effective" of the flag corresponding to the compared item of the registered data. Since the content of this flag is "non-effective", whether or not the message is to be received is determined regardless of the result of the comparison-processing performed for the third identifier of a message-receiving node performed in the next comparison part 3033. Since "agreement" and "non-effective" are sent from the comparison part 1, the control part 304 refers to the comparison result in the comparison part 2. Since the comparison result indicates "agreement" and "non-effective", the message taken-in from the transmission line 1110 is stored in the received-message storing part 306.

Next, a data-setting example in the registration parts and the sent message, and a comparison-processing example which are carried out in the node C are explained below with reference to FIG. 12B. The node C is also a device, and receives and processes the same sensor data as well as the node B. Therefore, the node C registers the same data-kind identifier and identifier of a message-sending node as those registered in the registration part 1 (1251) and 2 (1252) by the node B. Further, the node C registers "node C" designating the self-node in the registration part 3 (1253). Thus, similar to the results of the comparison-processing performed in the node B, the content "sensor data" of the data-kind identifier 1255 and the content "node A of the identifier of a message-sending node 1256 agree with the registered data in the registration parts 1 (1251) and 2 (1252), and the comparison parts 3031 and 3032 inform the control part 304 of ("agreement" and "effective") and ("agreement" and "non-effective"), respectively. Further, the taken-in message is stored in the received-message storing part 306.

FIG. 13A shows a data-setting example in the registration parts and the sent message, and a comparison-processing example which is carried out by the node B. In this example, the node D (a computer) sends data set to a device, such as control parameters, by designating the node C as a message-receiving node. The data-setting in the registration parts 1301–1303 of the node B and the registration parts 1351–1353 of the node C is the same as that shown in FIGS. 12A and 12B. Since "data set to a device" is registered in the registration part 1 (1301) of the node B, and this item of the registered data agrees with the content "data set to a device" of the data-kind identifier 1305 in the message sent from the node D, the first comparison part 3031 informs the control part 304 of "agreement" and "effective". Further, since "node D" is registered in the registration part 2 (1302) of the node B, and this item of the registered data agrees with the content "node D" of the identifier 1306 of a message-sending node in the message sent from the node D, the second comparison part 3032 informs the control part 304 of "agreement" and "effective". Furthermore, since "node B" is registered in the registration part 3 (1303) of the node B, and this item of the registered data does not agree with the content "node C" of the identifier 1307 of a message-receiving node in the message sent from the node D, the third comparison part 3033 informs the control part 304 of "disagreement". Thus, since the comparison result in the third comparison part 3033 is "disagreement", the taken-in message is abandoned in the node B. In the example shown in FIG. 13B, since "data set to a device" is registered in the registration part 1 (1351) of the node C, and this item of the registered data agrees with the content "data set to a device" of the data-kind identifier 1355 in the message sent from the node D, the first comparison part 3031 informs the control part 304 of "agreement" and "effective". Further, since "node D" is registered in the registration part 2 (1352) of the node C, and this item of the registered data agrees with the content "node D" of the identifier 1356 of a message-sending node in the message sent from the node D, the second comparison part 3032 informs the control part 304 of "agreement" and "effective". Furthermore, since "node C" is registered in the registration part 3 (1353) of the node C, and this item of the registered data agrees with the content "node C" of the identifier 1357 of a message-receiving node in the message sent from the node D, the third comparison part 3033 informs the control part 304 of "agreement" and "effective". As a result, the results of the comparison-processing in the first and second comparison parts indicate "agreement" and "effective", and the result in the third comparison part indicates "agreement" and "non-effective". Thus, since all the comparison parts indicate the comparison result of "agreement", the taken-in message is stored in the received-message storing part 306 in the node C.

According to this embodiment, when each processor takes in a message from a transmission line, the filtering circuit in each processor compares the data registered in advance with contents of the condition-identifying portions in the taken-in message, and determines whether or not the taken-in message is to be stored in this processor. For each kind of a message, it can be optionally set for which condition-identifying portions in the message the comparison results are dealt with as "non-effective". In this embodiment, control data which are transmitted by a broadcasting way (1 to N transmission) are received based on comparison results obtained by the comparison-processing for two condition-identifying portions in a message. On the other hand, information data which are transmitted by designating a message-receiving node (1 to 1 transmission) are received based on comparison results obtained by the comparison-processing for two condition-identifying portions in a message. Thus, any node can select and receive data which should be received by a plurality of nodes, such as control data, by broadcasting the data. Also, only a designated node can select and receive a message of information data, which is transmitted to a specified node from a computer, a handy terminal, and so on, such as data set to a node, data used for monitoring a device, instruction data for changing an operational state of a node, etc. That is, each node can select and receive only a message which the node needs in broadcasted messages, and only a message which is addressed to the self-node in messages each of which is transmitted to a specified node. Therefore, each node can select and receive only a message which the node needs even if different kinds of messages are transmitted together on a transmission line, and an application programs executed by each node is not affected by the message-receiving processing. Thus, an engineer developing an application program can design the application program without considering effects of an increase of the computing load caused by data-transmission processing, which improves the efficiency of program development. Further, since an increase of the computing load caused by data-transmission processing does not affect execution of an application program executed by each node, the execution timing or period of the application program is secured, a real-time control such as a plant control can be safely performed. Since the filtering circuit in each node carries out the data-receiving processing of a message sent from another node, the data-receiving processing does not affect execution of an application node performed by the node which has received the message, which makes it easy to design a distributed control system for which interactions between nodes transmitting a message to each other should be considered.

The Third Embodiment:

In the first and second embodiments, a plurality of comparison parts in each filtering circuit perform the comparison-processing for the condition-identifying portion in a received message, and if all results of the comparison-processing indicate "agreement", the taken-in message is stored in the received-message storing part in the filtering circuit. In the third embodiment, a received-message storing part is provided for each comparison part, and if the result of the comparison-processing performed by each comparison part indicates "agreement", the taken-in message is stored in the received-message storing part provided for the comparison part.

The compositions of the system and the processor, and the data compositions of the registers provided in the control part are the same as those shown in FIGS. 1, 2, and 5, respectively, in the first embodiment.

Figure 14:
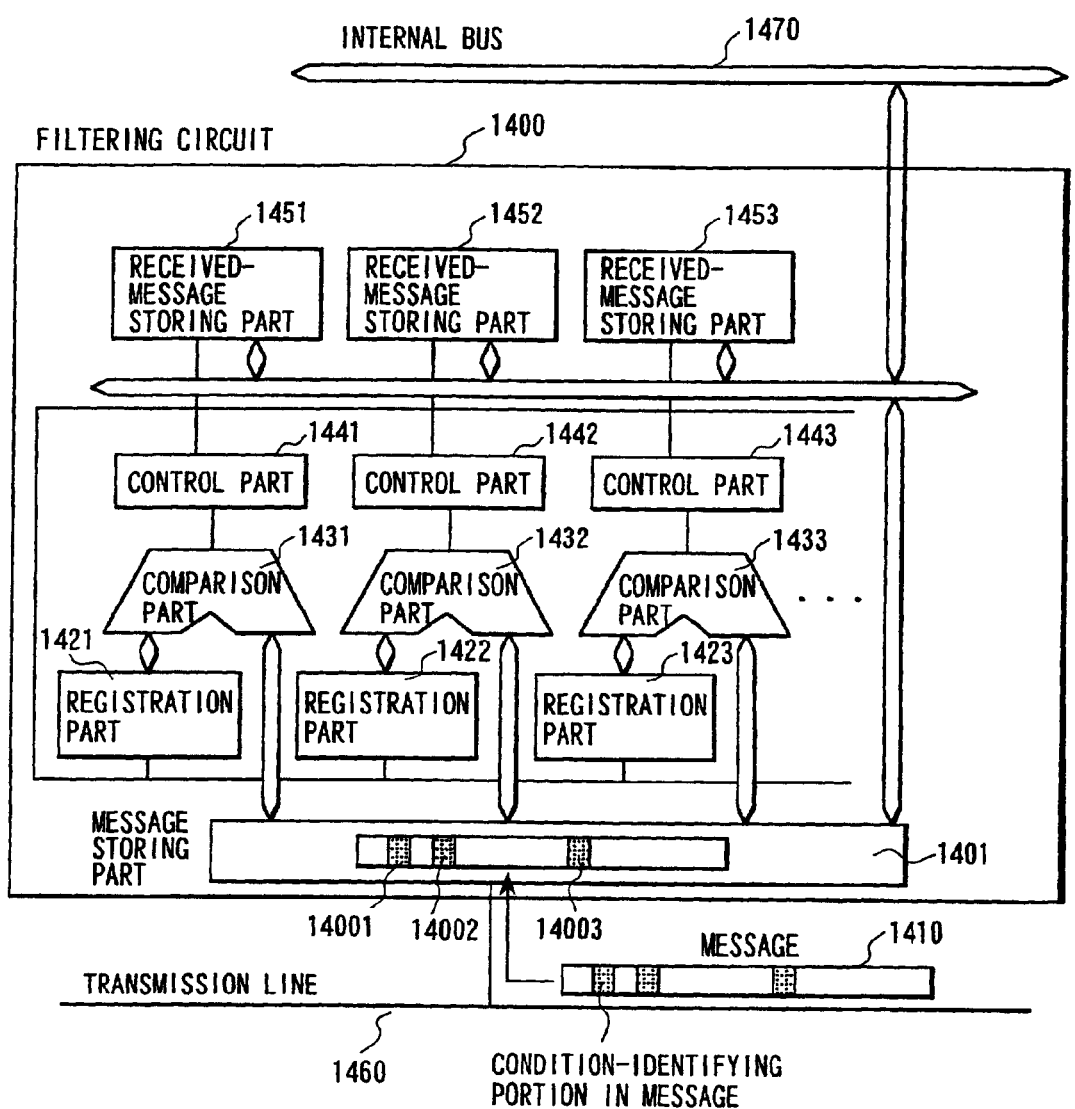
FIG. 14 is a schematic block diagram showing an example of the circuit composition of each filtering circuit of the third embodiment according to the present invention.

FIG. 14 is a schematic block diagram showing an example of the circuit composition of each filtering circuit of the third embodiment according to the present invention. The message 1410 taken-in from the transmission line 1460 is stored in the message storing part 1401. The message 1410 includes the condition-identifying portions 14001, 13002, and 14003, and the filtering circuit 1400 determines whether or not the received message 1410 is to be stored each of the received-message storing parts 1451, 1452, and 1453, on the basis of the comparison-processing performed for each of these condition-identifying portions.

For example, the comparison part 1431 compares the condition-identifying portion 14001 with the registered data in the registration part 1421, and if the agreement is established, the received message 1410 is stored in the received-message storing part 1451. The composition of the registration part 1431 is the same as that shown in FIG. 4, and a plurality of registered data can be registered in the registration part 1431. Similar to the above comparison-processing in the comparison part 1431, the comparison part 1432 compares the condition-identifying portion 14002 with the registered data in the registration part 1422, and if the agreement is established, the received message 1410 is stored in the received-message storing part 1452. Also, the comparison part 1433 compares the condition-identifying portion 14003 with the registered data in the registration part 1423, and if the agreement is established, the received message 1410 is stored in the received-message storing part 1453.

That is, if a plurality of the condition-identifying portions in the message 1410 agree with the registered data in a plurality of the registration parts, respectively, the message 1410 stored in the message storing part 1401 is stored in the plurality of the corresponding received-message storing parts. For example, if the condition-identifying portions 14001 and 14002 agree with the registered data in the registration parts 1421 and 1422, respectively, the message 1410 is stored in the received-message storing parts 1451 and 1452. Afterward, the message 1410 which has been stored in the message storing part 1401 is deleted. Each of the received-message storing parts 1451–1453 is a FIFO-type memory capable of storing a plurality of messages. However, an overwrite-type memory in which a new message is overwritten on the already stored message, and only the latest message is held, can be used for Each of the received-message storing parts 1451–1453. The messages stored in the received-message storing parts 1451–1453 are sent to the CPU via the internal bus 1470, and are processed by the CPU.

Figure 15A:
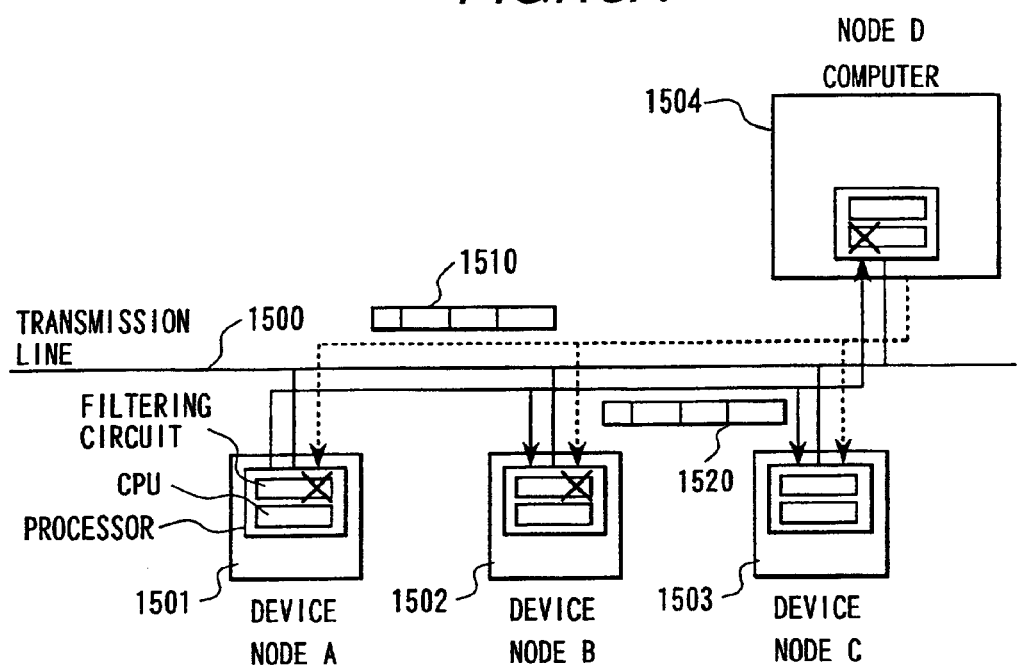
FIGS. 15A and 15B are an illustrations showing an example of a distributed control system of the third embodiment, and a format of a message used in this embodiment.
Figure 15B:
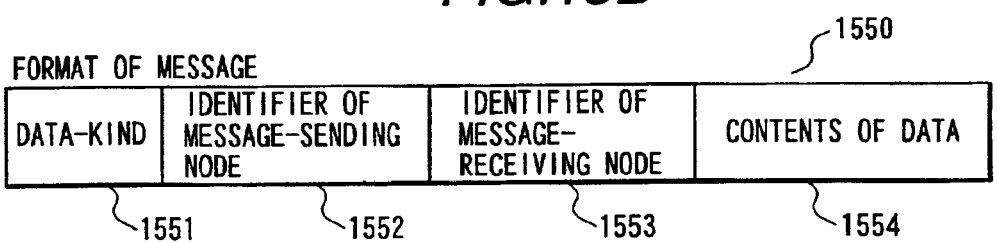

FIGS. 15A and 15B show the composition of a distributed control system of the third embodiment, and a format of a message used in this embodiment, respectively. The nodes A 1501, B 1502, C 1503, and D 1504 are connected to a transmission line 1500, and transmit messages to each other. In the format 1550, a message is composed of a data-kind identifier 1551, an identifier 1552 of a message-sending node, an identifier 1553 of a message-receiving node, and data 1554 to be transmitted. The nodes A, B, C, and D are devices for controlling an object system such as a plant, and the node D is a computer with a display unit, for setting control parameters to those devices, and monitoring operational states of the devices. Further, the node D sends a message 1510 including data 1554 such as control parameters to be set to a device, and the node A send a message 1520 including data 1554 such as a control signal for the plant. The node B selects and receives the message 1510 sent from the node D and the message 1520 sent from the node A. Further, the node B stores the message 1510 and the message 1520 to two corresponding received-message storing parts, respectively.

Figure 16A:
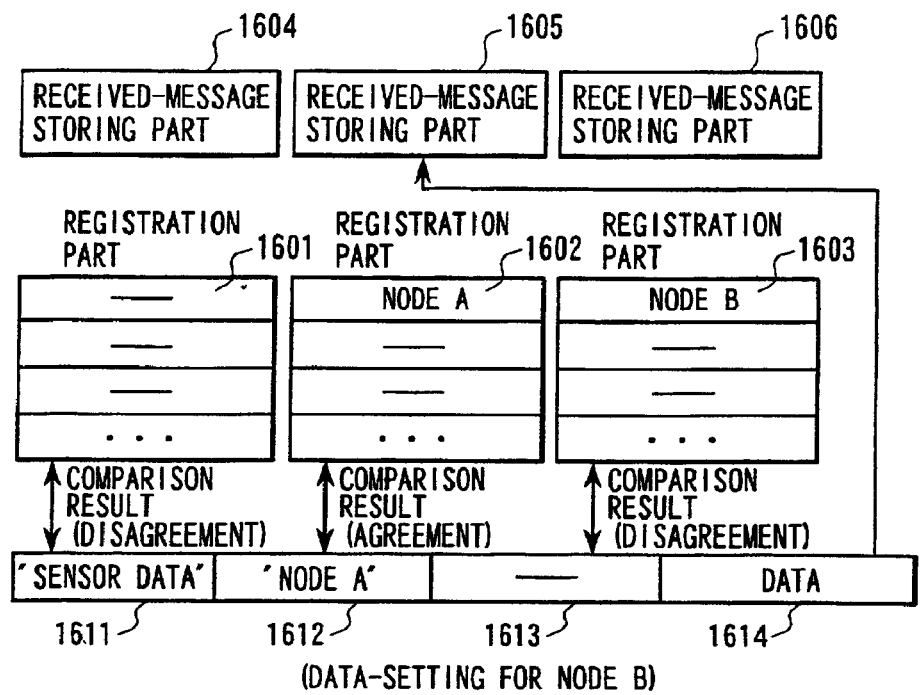
FIGS. 16A and 16B are illustrations showing data-setting examples in the registration parts and the sent message, and comparison-processing examples which are carried out for examples of data-setting in the registration part of the third embodiment.
Figure 16B:
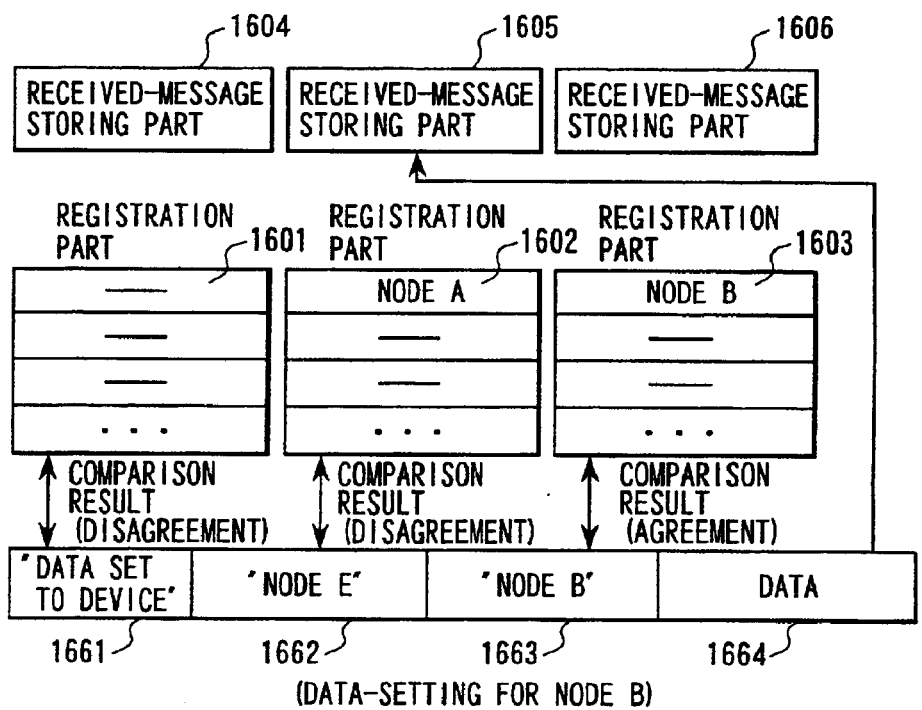

FIGS. 16A and 16B show data-setting examples in the registration parts and the sent message, and comparison-processing examples which are carried out for the data-setting examples in the third embodiment. FIG. 16A shows the example in which the node B selects and receives the message 1520 sent from the node A, and FIG. 16B shows the example in which the node B selects and receives the message 1510 sent from the node D.

In FIG. 16A, "sensor data", "node A", and a value of data measured by a sensor are set to the data-kind identifier 1611, the identifier 1612 of a message-sending node, and the data 1614 to be transmitted, respectively. However, since the message 1520 is broadcasted, any data is not set to the identifier 1613 of a message-receiving node. In the node B, any data is not registered in the registration part 1601 of the first comparison part 1431 for performing the comparison-processing for the first identifier 1611 in the message 1520. Accordingly, the first comparison part 1431 informs the control part 1441 of the comparison-result "disagreement", and the message 1520 is not stored in the received-message storing part 1604 connected to the first comparison part 1431. Next, "node A" is registered in the registration part 1602 connected to the second comparison part 1432 for performing the comparison-processing for the second identifier 1612. Accordingly, the second comparison part 1432 informs the control part 1442 of "agreement", and the message 1520 is stored in the received-message storing part 1605 connected to the first comparison part 1432. Last, "node B" designating the self-node B is registered in the registration part 1603 connected to the third comparison part 1433 for performing the comparison-processing for the third identifier 1613. Accordingly, since this registered data does not agree with the content of the identifier 1613 of a message-receiving node, the third comparison part 1433 informs the control part 1443 of the comparison-result "disagreement", and the message 1520 is not stored in the received-message storing part 1606 connected to the third comparison part 1433.

Meanwhile, when any data is not set to some one of the identifiers in a message that is—in the case of "no-data-setting", "0" is usually set to the identifier. Here, if "0" is also set to a registration part connected to a corresponding comparison part when any data is not registered in the registration part—that is—in the case of "no-data-registering", the comparison part determines that the identifier agrees with the data registered in the registration part. Therefore, when some one of the identifiers is in the sate of "no-data-setting", a value other than "0" is set to the identifier so that the comparison result is not set as false agreement when a corresponding registration part is also in the sate of "non-data-registering" (the above setting of an identifier in the state of "no-data-setting" is common in all embodiments of the present invention.)

In FIG. 16B, "data set to a device", "node D", "node B", and data of control parameters for a device are set to the data-kind identifier 1661, the identifier 1662 of a message-sending node, the identifier 1663 of a message-sending node, and the data 1664 to be transmitted, respectively. In the node B, any data is not registered in the registration part 1601 of the first comparison part 1431 for performing the comparison-processing for the first identifier 1661 in the message 1510. Accordingly, the first comparison part 1431 informs the control part 1441 of "disagreement", and the taken-in message 1520 is not stored in the received-message storing part 1604 connected to the first comparison part 1431. Next, "node A" is registered in the registration part 1602 connected to the second comparison part 1432 for performing the comparison-processing for the second identifier 1662. Accordingly, the second comparison part 1432 informs the control part 1442 of "disagreement", and the taken-in message 1510 is not stored in the received-message storing part 1605 connected to the first comparison part 1432. Last, "node B" designating the self-node B is registered in the registration part 1603 connected to the third comparison part 1433 for performing the comparison-processing for the third identifier 1613. Accordingly, since this registered data agrees with the content of the identifier 1663 of a message-receiving node, the third comparison part 1433 informs the control part 1443 of "agreement", and the taken-in message 1510 is stored in the received-message storing part 1606 connected to the third comparison part 1433.

According to this embodiment, when each processor receives a message, each comparison part of the filtering circuit in the processor compares the data registered in advance in a registration part connected to the comparison part with the content of a corresponding condition-identifying portion designated in the message, and if the registered data agrees with the condition-identifying data, the taken-in message is stored in a corresponding received-message storing part provided for each comparison part. Thus, a message sent from a specified node, a specified kind of message, a message sent to the self-node, and so on can be selected on the basis of the content of each condition-identifying portion in the message and the data registered in the corresponding registration part, and each selected message can be separately stored in the corresponding received-message storing part provided for each comparison part. In the example shown in FIGS. 15A and 15B, information data sent from the node D (a computer) and control data sent from the node A (a device) are separately stored in the respective corresponding received-message storing parts of the node B. Generally, since control data need to be processed in a short time, the control data must be processed prior to processing of data set to a device, such as control parameters, data used for monitoring a device, and so on. By separately storing different kinds of messages in the respective corresponding received-message storing parts, the CPU can read messages from the received-message storing parts, and process the read messages in the priority order of the message (for example, the CPU first processes a message including control data with the highest priority.) Therefore, according to this embodiment, only messages necessary to each node can be selected and received by the node, and the stored messages are processed in the order of the priority allocated to each of the messages. Thus, this embodiment can be effectively applied to a distributed control system in which messages with the different priority are together transmitted.

In the above first to third embodiments, the format of a message is fixed, and each comparison part in the filtering circuit performs the comparison-processing for a condition-identifying portion at the position preset to the comparison part. However, by using a format of a message, shown in FIG. 17, it is possible to make it variable the position of a condition-identifying portion for which each comparison part performs the comparison-processing. An example in that the position of a condition-identifying portion for which each comparison part performs the comparison-processing can be optionally changed is explained below.

Figure 17A:
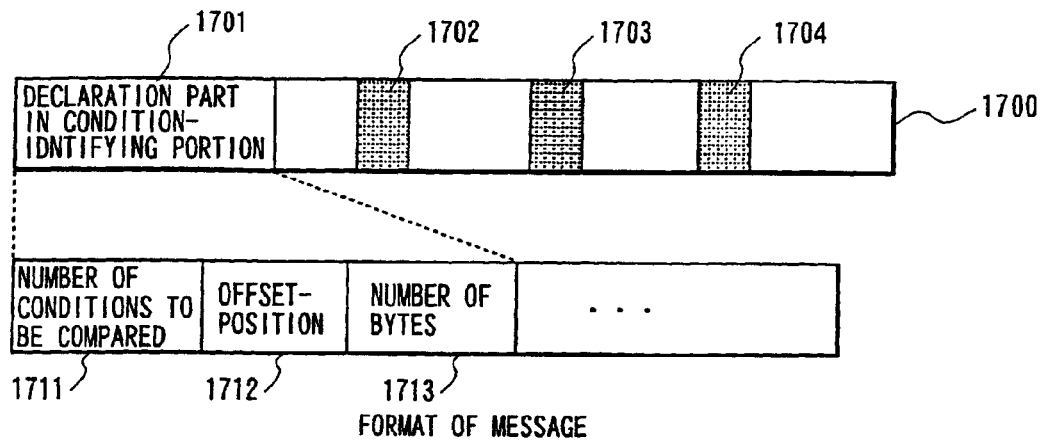
FIGS. 17A and 17B are illustrations showing an example of another message format used in the third embodiment.
Figure 17B:
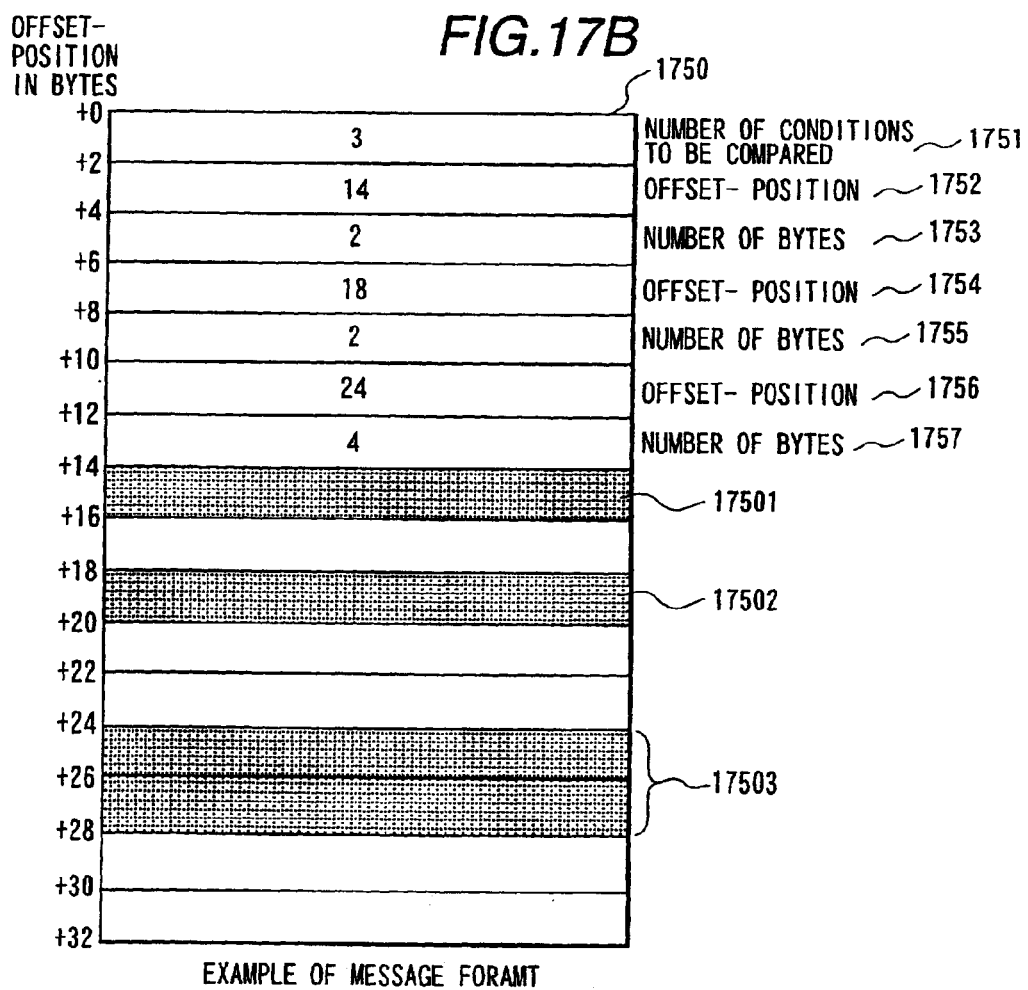

FIG. 17A shows a format of a message, capable of making it variable the position of a condition-identifying portion for which each comparison part performs the comparison-processing, and FIG. 17B shows an example of this format of a message. A declaration region 1701 prescribing the arrangement of condition-identifying portions in a message is added to each message 1700 transmitted on a transmission line. The message 1700 includes the condition-identifying portions 1702, 1703, and 1704. The declaration region 1701 is composed of the number 1711 of conditions to be compared, a plurality of pairs of the offset-position 1712 and the number 1713 of bytes of each portion data. The number 1711 of conditions to be compared is equal to the number of the condition-identifying portions, and the offset-position 1712 and the number 1713 of bytes of each portion data indicate the top position and the size of each portion. Further, the number of pairs of the offset-position 1712 and the number 1713 of bytes is equal to the number 1711 of conditions to be compared.

The example 1750 of this message format includes three condition-identifying portions in a message. Since the number of the condition-identifying portions is three, three is set to the number 1751 of conditions to be compared. Further, since the top position of the first condition-identifying portion 17501 is at the position of 14 bytes counted from the top of this message, and the size of this portion 17501 is 2 bytes, "14" and "2" are set to the offset-position 1752 and the number 1753 of bytes, respectively. Similar to the setting for the first portion 1705, since the top position of the second condition-identifying portion 17502 is at the position of 18 bytes counted from the top of this message, and the size of this portion 17502 is 3 bytes, "18" and "3" are set to the offset-position 1754 and the number 1755 of bytes, respectively. Furthermore, since the top position of the third condition-identifying portion 17503 is at the position of 24 bytes counted from the top of this message, and the size of this portion 17503 is 4 bytes, "24" and "4" are set to the offset-position 1756 and the number 1757 of bytes, respectively.

According to the above-described message format, the CPU first refers to the declaration region prescribing the arrangement of condition-identifying portions providing in a message, and allocates each of the indicated condition-identifying portions to one of the comparison parts in the filtering circuit. Each comparison part performs the comparison-processing for the comparison-processing portion allocated to the comparison part. Thus, each node can process a message in which the position of a condition-identifying portion for which each comparison part performs the comparison-processing is variable, which can realize transmission of a message with a more flexible format.

The Fourth Embodiment:

In the above first to third embodiments, a filtering circuit in one processor compares each of a plurality of the condition-identifying portions in a message with the registered data, and selects and receives the message based on the comparison result. On the other hand, in the fourth embodiment, a plurality of transmission processors performs the comparison-processing for a plurality of the condition-identifying portions in a message.

Figure 18:
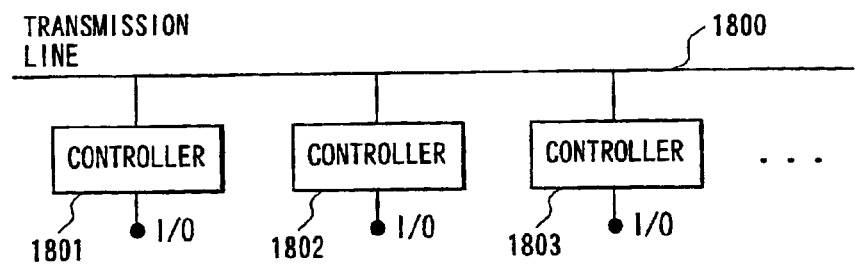
FIG. 18 is a schematic block diagram showing the composition of a distributed control system of the fourth embodiment according to the present invention.

FIG. 18 shows a schematic block diagram of the composition of a distributed control system of the fourth embodiment according to the present invention. Controllers 1801–1803 are connected to a transmission line 1800, and transmit messages to each other. These controllers are an intelligent device such as a sensor or motor with a transmission function, a programmable controller (PC), a computer, and so on. Although a bus-type transmission line is used in this embodiment, any type transmission line such as a radio-transmission, an infrared ray transmission, etc., can be used.

Figure 19:
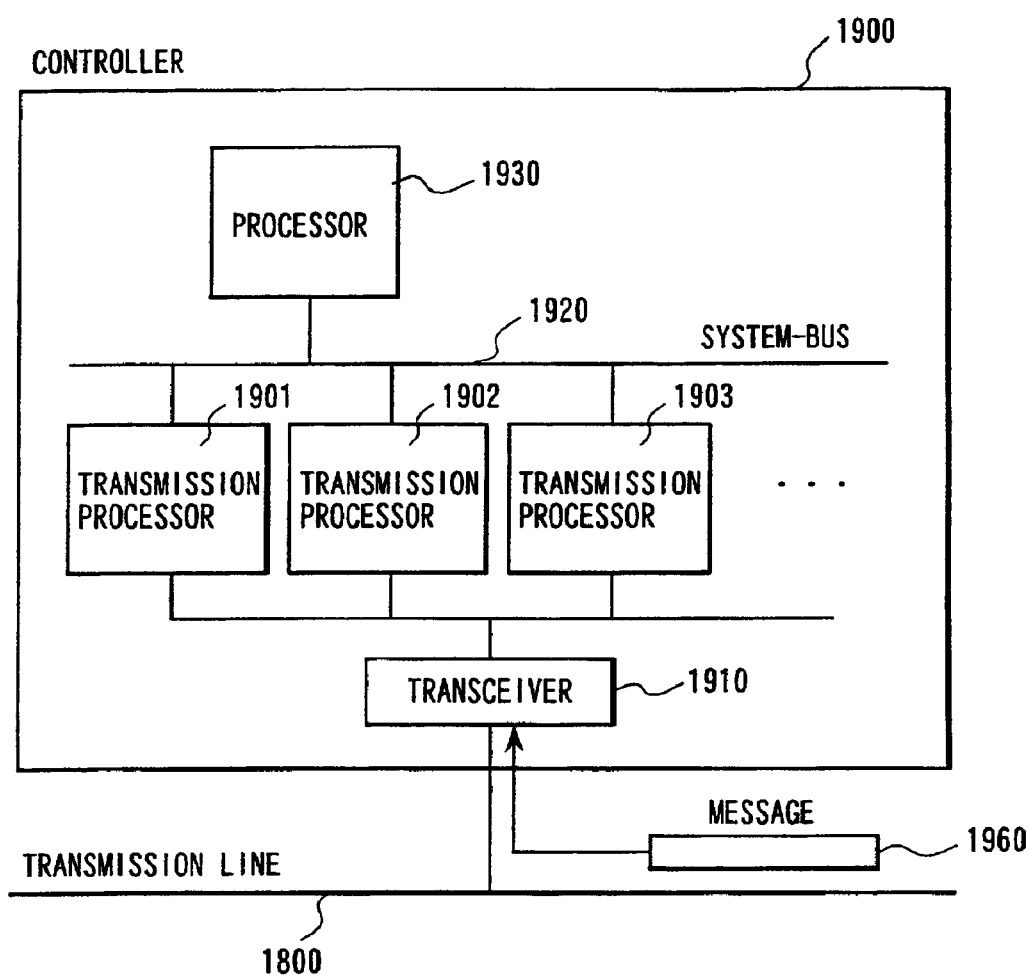
FIG. 19 is a schematic block diagram showing the composition of each controller in the fourth embodiment.

FIG. 19 shows a schematic block diagram of the composition of each controller in this embodiment. Each controller 1900 takes in each of all messages 1960 transmitted on the transmission line 1950. Each message 1960 is taken in the controller 1900 via a transceiver 1910, and is distributed to a plurality of transmission processors 1901–1903 provided in the controller 1900. A processor 1930 and the transmission processors 1901–1903 are connected to a system bus 1920, and transmit data to each other via the system bus 1920. The processor 1930 executes an application program, and operates a transmission driver (not shown in figures). Further, the processor 1930 reads out messages from the transmission processor 1901–1903, and processes the read-out messages.

Figure 20:
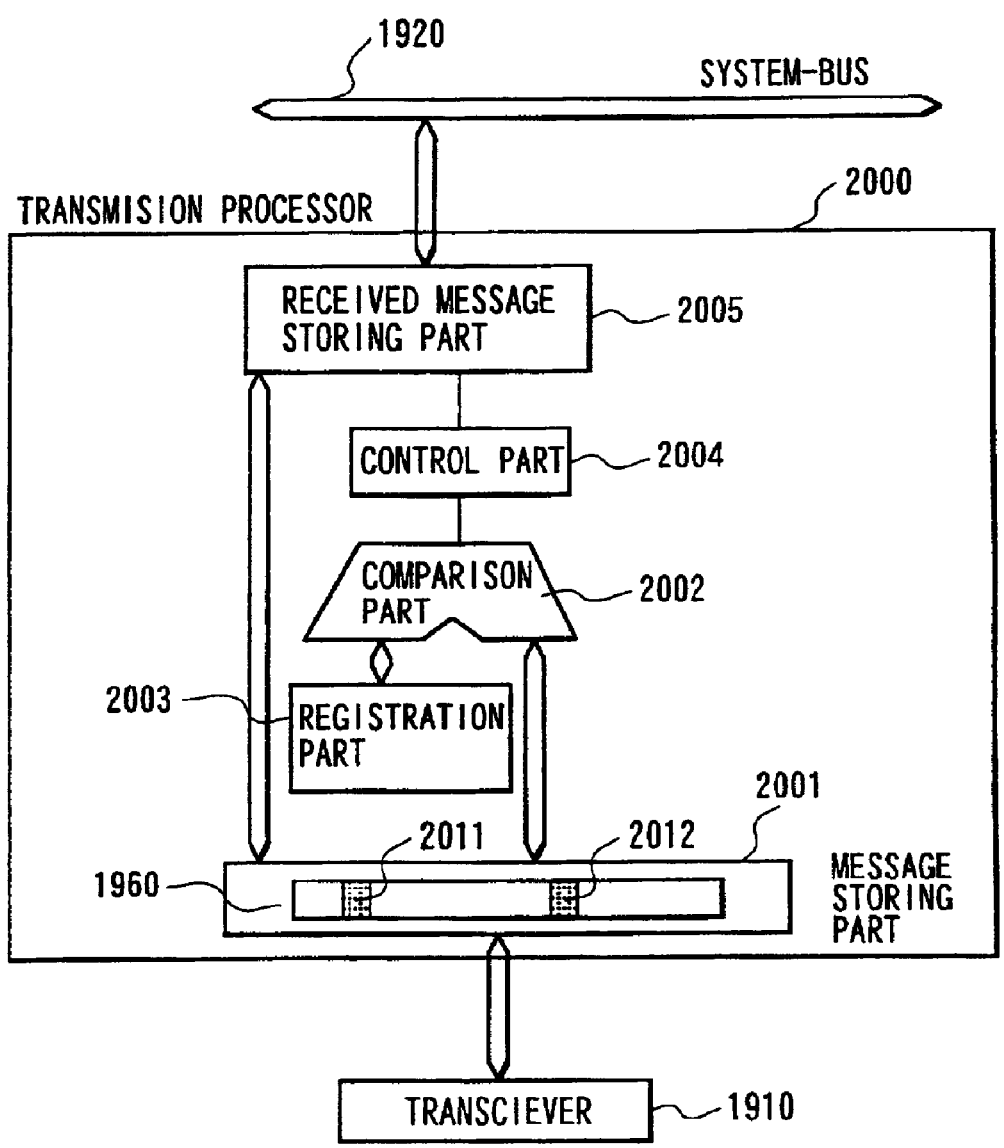
FIG. 20 is a schematic block diagram showing an example the composition of each transmission processor in the controller shown in FIG. 19.

FIG. 20 shows a schematic block diagram of an example the composition of each transmission processor in the controller shown in FIG. 19. When each transmission processor 2000 takes in a message 1960 via the transceiver 1910 from the transmission line 1800, the transmission processor 2000 stores the taken-in message in the received-message storing part 2005. The message 1960 includes a plurality of the condition-identifying portions. The transmission processor 2000 reads the content of the condition-identifying portions 2011 and 2012, the portions 2011 being allocated to the transmission processor 2000, and the comparison part 2002 in the transmission processor 2000 compares the read content of the allocated condition-identifying portion 2011 in the message 1960 with the data registered in the registration part 2003. The composition of the registration part 2003 is the same as that of the registration part shown in FIG. 4, and the registration part 2003 can store plural items of data. The result of the comparison between the condition-identifying portion 2011 and the registered data in the registration part 2003 is sent to the control part 2004, if the comparison result indicates "agreement", the taken-in message 1960 is stored in the received-message storing part 2005. The message 1960 stored in the received-message storing part 2005 is read out and processed by the processor 1930.

Figure 21:
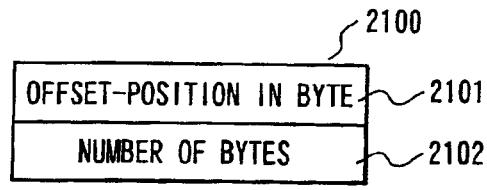
FIG. 21 is an illustration showing an example of the data composition in a register for storing the position of each condition-identifying portion in a message.

The position of a condition-identifying portion allocated to each transmission processor is registered in a register in a control part provided in the transmission processor. FIG. 21 shows an example of the data composition in the register 2100 for storing the position of each condition-identifying portion in the message 1960. The contents of the register 2100 are composed of an offset-position in bytes 2101 and the number of bytes 2102. the offset-position in bytes 2101 indicates the top position of each condition-identifying portion in the message 1960, and the number of bytes 2102 indicates the size of each condition-identifying portion in the message 1960. Although the position and the size of each condition-identifying portion in a message is indicated in bytes in this embodiment, the position 2101 and the size 2102 can be expressed with a offset-position in bits and the number of bits if they cannot be expressed in bytes. the offset-position in bytes 2101 and number of bytes 2102 of each portion are set to the register 2100, for example, by each processor via the system-bus 1920.

Figure 22:
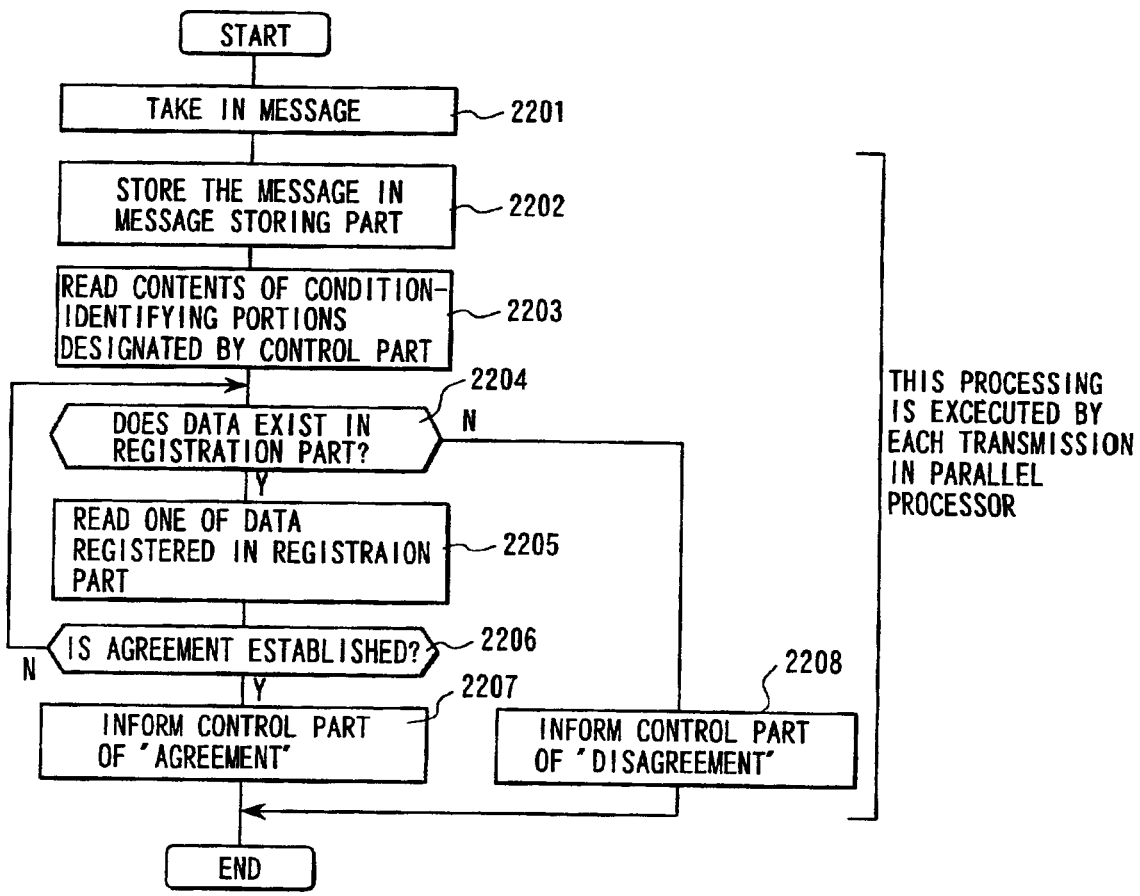
FIG. 22 is a flow chart showing operations of each filtering circuit in the fourth embodiment.

FIG. 22 shows a flow chart of operations of each filtering circuit in this embodiment. When each controller takes in a message from the transmission line (step 2201), in step 202, each transmission processor in the controller stores the taken-in message in the message storing part of the transmission processor. In step 2203, the transmission processor reads the content of the allocated condition-identifying portion in the taken-in message based on the offset-position and the number of bytes registered in the registered. Further, If at least one item of the registered data exists in the registration part (step 2204), in step 2205, the transmission processor reads out one item of the registered data, and in step 2206, compares the read content of a corresponding condition-identifying portion with the read-out item of the registered data. If the agreement is established in the comparison (step 2206), the message stored in the message storing part is stored in the received-message storing part in step 2207. Conversely, if any item of the registered data does not exist in the registration part (step 2204), in step 2208, the message stored in the message storing part is abandoned.

Figure 23:
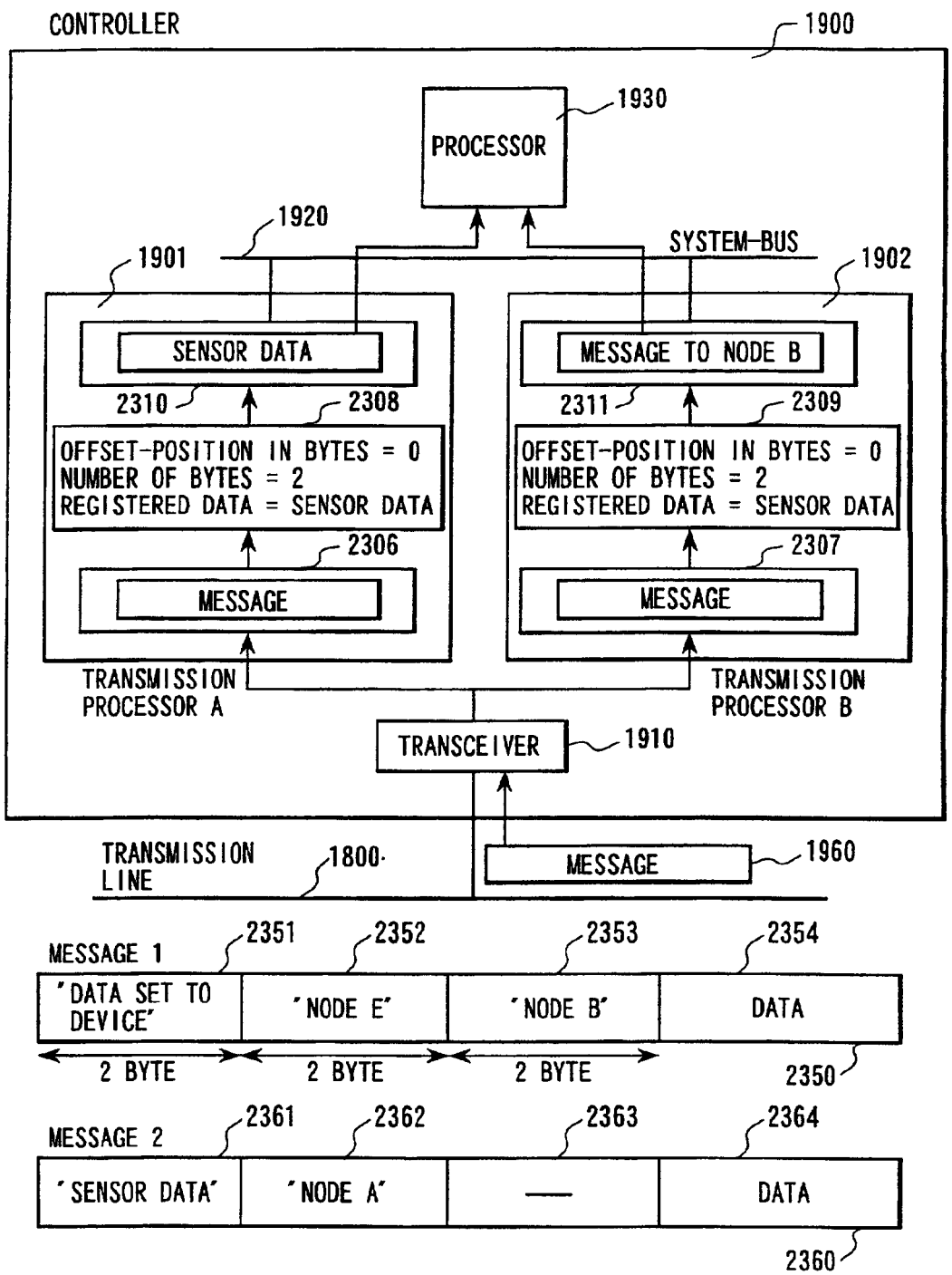
FIG. 23 is an illustration showing an example of the composition of the controller, and data-setting examples in the transmission processors of the controller and the received message in the fourth embodiment.

FIG. 23 shows the composition of the controller, and data-setting examples in the transmission processors of the controller and the taken-in message in this embodiment. The controller 1900 takes in each of all messages transmitted on the transmission line 1800. In the example shown in FIG. 23, two transmission processors A 1901 and B 1902 are provided in the controller 1900. The taken-in message 1960 is stored in the message storing part 2306 of the transmission processor A and the message storing part 2307 of the transmission processor B via the transceiver 1910. The message 1960 taken-in from the transmission line 1800 is sent in the format shown by the message 1 (2350) in which the data-kind identifier, the identifier of a message-sending node, and the identifier of a message-receiving node are allocated to the first two bytes, the second two bytes, and the third two bytes, respectively. In the examples shown in FIG. 23, for filtering the taken-in message, the received messages to be filtered are the message 1 (2350) and the message 2 (2360) with the contents shown in FIG. 23.

Numeral 2308 in the transmission processor A indicates a filtering means including the control part and the registration part, in which the data shown in FIG. 23 are preset or registered. Also, in the filtering means 2309 of the transmission processor B, the data shown in FIG. 23 are preset or registered. That is, "0" and "2" are set to the offset-position in bytes and the number of bytes of the register in the control part in the filtering means 2308, respectively. Further, "sensor data" is registered as the registered data in the registration part in the filtering means 2308. Accordingly, in the transmission processor A, the registered data is registered in the registration part so that a message of which the data-kind identifier is "sensor data" is selected. On the other hand, in the transmission processor B, "4" and "2" are set to the offset-position in bytes and the number of bytes of the register in the control part, respectively, and "node B" is registered as the registered data in the registration part. Accordingly, the registered data is registered in the registration part so that a message of which the d identifier of a message-sending node is "node B" is selected.

When the controller receives the message 1, the transmission processor A compares the registered data "sensor data" with the content of the data-kind identifier in the message 1 based on the data (the offset-position in bytes=0, the number of bytes=2, and the registered data=sensor data) which are preset or registered in the control part and the registration part of the filtering means 2308. Since the content of the data-kind identifier in the message 1 is not "sensor data", and the agreement is not established in the comparison-processing, the taken-in message 1 is not stored in the received-message storing part 2310, but is abandoned. In the transmission processor B, the registered data "node B" is compared with the content of the identifier of a message-sending node in the message 1 based on the data (the offset-position in bytes=4, the number of bytes=2, and the registered data=node B) which are preset or registered in the control part and the registration part of the filtering means 2309. Since the content of the identifier of a message-sending node in the message 1 is "node B", and the agreement is established in the comparison, the taken-in message 1 is stored in the received-message storing part 2311.

Next, when the controller receives the message 2, the transmission processor A compares the registered data "sensor data" with the content of the data-kind identifier in the message 1 based on the data (the offset-position in bytes=0, the number of bytes=2, and the registered data=sensor data) which are preset or registered in the filtering means 2308. Since the content of the data-kind identifier in the message 2 is "sensor data", and the agreement is established in the comparison, the taken-in message 2 is stored in the received-message storing part 2301. In the transmission processor B, the registered data "node B" is compared with the content of the identifier of a message-sending node in the message 2 based on the data (the offset-position in bytes=4, the number of bytes=2, and the registered data=node B) which are preset or registered in the filtering means 2309. Since the content of the identifier of a message-receiving node in the message 2 is "no data-setting", and the agreement is not established in the comparison, the taken-in message 2 is not stored in the received-message storing part 2311, but is abandoned.

By the above-mentioned processing, only sensor data is stored in the received-message storing part 2310 of the transmission processor A, and only a message addressed to the node B is stored in the received-message storing part 2311 of the transmission processor B. The processor 1930 precedently reads out and processes the message stored in the received-message storing part 2310 of the transmission processor A, in which sensor data with a higher priority is stored.

If the received-message storing parts 2310 and 2311 are FIFO-type memories, these received-message storing parts can store a predetermined number of messages. Thus, the processor 1930 precedently processes messages of a higher priority stored in the received-message storing part 2310, and when any message does not remain in the received-message storing part 2310, the processor 1930 then processes messages of a lower priority stored in the received-message storing part 2311. Accordingly, messages which have been stored are not lost, and the stored message can be processed in the priority order of the messages.

According to this embodiment, when each controller takes in a message, each transmission processor in the controller compares the data registered in the registration part connected to the comparison part with the content of the corresponding condition-identifying portion in the message, the portion being allocated to the transmission processor, and if the item of the registered data agrees with the content of the condition-identifying portion, the taken-in message is stored in the received-message storing part provided in the transmission processor. The position of a condition-identifying portion to be compared and the registered data indicating the message-receiving conditions are preset to each transmission processor, and a message, for which each corresponding transmission processor has determined that the agreement between the content of the allocated condition-identifying portion and the registered data is established, is separately stored in the corresponding transmission processor. Moreover, since the comparison-processing for each condition-identifying portion in a message is independently performed in each transmission processor, even if the number of the condition-identifying portions in a message is increased, the necessary number of transmission processors have only to be added to each controller. Thus, according to this embodiment, the load applied on an engineer when he extends or change an existing distributed control system can be reduced, and this distributed control system can be also flexibly adapted to a change of the format of a message.

The Fifth Embodiment:

In the above first to fourth embodiments, a plurality of comparison parts in a filtering circuit or a plurality of transmission processors are provided in parallel in a processor. Thus, each comparison part or each transmission processor performs the comparison-processing for each of a plurality of the condition-identifying portions in a message, and selects and receives the taken-in message based on the comparison result. On the other hand, in the fifth embodiment, a plurality of base filtering circuits are arranged not only in parallel but also serially, that is, in a matrix manner.

The composition of the distributed control apparatus and the composition of each processor of this embodiment are the same as those (shown in FIG. 1 and FIG. 2) of the first embodiment. In this embodiment, a filtering circuit is composed by combining a plurality of base filtering circuits. FIG. 24A shows each base filtering circuit 2400 including an input-message storing part 2401 for storing a message received from an external circuit, a registration part 2402 for storing the registered data, a comparison part 2403 for comparing a condition-identifying portion with the registered data, a control part 2404 for controlling a flow of the received message, and an output-message storing part 2405 of an interface part for sending a stored message to an external circuit. FIG. 24B shows the data composition in the registration part 2402 capable of storing a plurality of the registered data. The registered data can be registered, for example, by a CPU (not shown in this figure) via an internal bus 2570 shown FIG. 25. Moreover, the control part 2404 includes a comparison effectiveness setting register 2410 shown in FIG. 24C and a condition-identifying-portion position setting register 2450 shown in FIG. 24D. Further, a flag indicating "effective"/"non-effective" for the comparison-processing in this base filtering circuit 2400 can be registered in the comparison effectiveness setting register 2410 by the same method executed for the registering of the registered data, for example, by the CPU (not shown in this figure) via the internal bus 2570. Furthermore, the position (offset-position in bytes 2451) of a condition-identifying portion of which the content should be compared with the registered data by the comparison part 2403, and the size (the number of bytes 2452) of the portion is registered in the condition-identifying-portion position setting register 2450.

Figure 25:
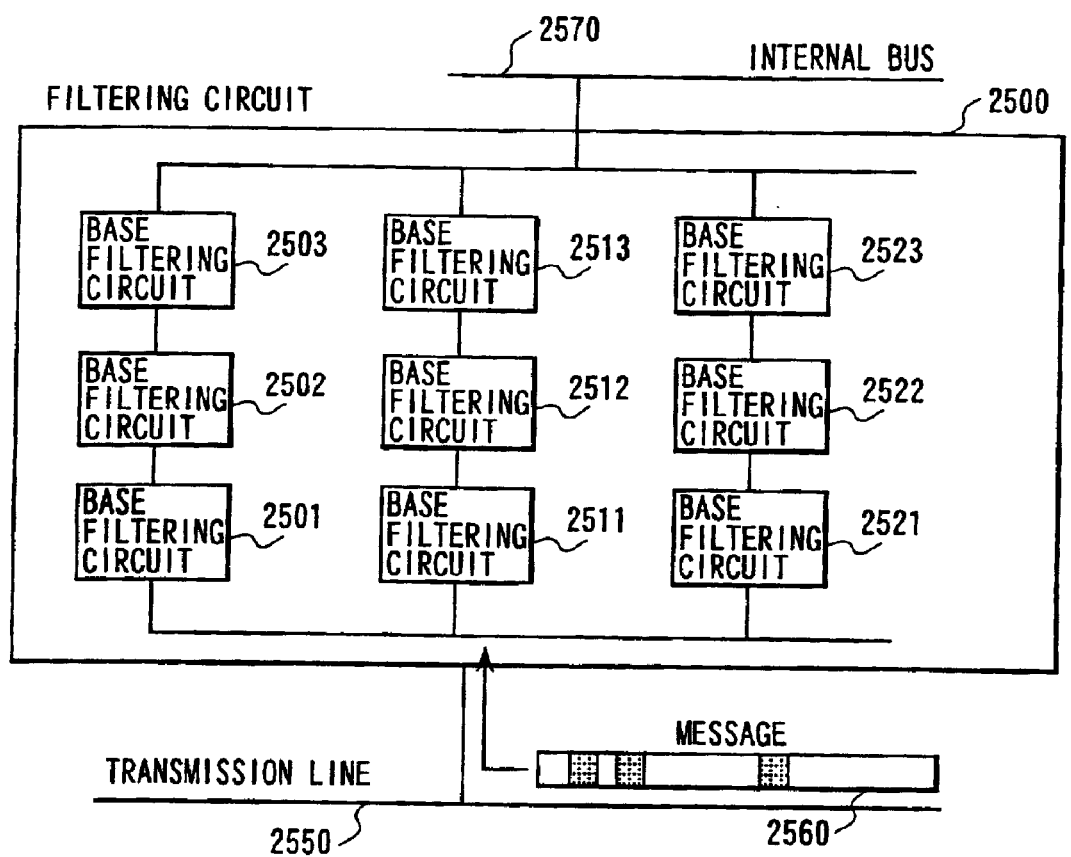
FIG. 25 is a schematic block diagram showing an example of the circuit composition in each filtering circuit of the fifth embodiment.

FIG. 25 shows a schematic block diagram of the circuit composition of each filtering circuit in this embodiment. The filtering circuit 2500 is composed of a plurality of filtering units arranged in parallel, each filtering unit being composed of a plurality of base filtering circuits (for example, 2501, 2502, and 2503) serially connected to each other. The number of base filtering circuits in each filtering unit is equal to or more than that of the condition-identifying portions in a message, and each base filtering circuit performs the comparison-processing for a corresponding condition-identifying portion. For example, the base filtering circuits 2501, 2502, and 2503 compare the first, second, and third portions with the registered data in the respective registration parts, respectively. In this embodiment, The number of base filtering circuits in each filtering unit and the position of the portion for which each base filtering circuit performs the comparison-processing are preset. Further, the number of the filtering units arranged in parallel is optional, and the larger this number is, the larger the number of message kinds which the filtering circuit can classify becomes.

When the filtering circuit 2500 takes in a message 2560 from the transmission line 2550, the base filtering circuits 2501, 2511, and 2521 arranged nearest to the transmission line 2550 store the message 2560 in the respective message storing parts provided in these base filtering circuits. Each of the base filtering circuits stores the message 2560 in the output-message storing part provided in itself if a flag indicating "effective"/"non-effective" for the comparison-processing performed in this base filtering circuit indicates "effective", and the comparison result is "agreement", or if the flag indicating "effective"/"non-effective" indicates "non-effective". The second-row base filtering circuits 2502, 2512, and 2522 read out the messages stored in the respective output-message storing parts of the base filtering circuits 2501, 2511, and 2521, respectively, and perform the processing similar to the above-mentioned processing executed by the base filtering circuits 2501, 2511, and 2521. Also, the third-row base filtering circuits 2503, 2513, and 2523 read out the messages stored in the respective output-message storing parts of the base filtering circuits 2502, 2512, and 2522, respectively, and perform the processing similar to the above-mentioned processing executed by the base filtering circuits 2502, 2512, and 2522. The CPU (not shown in this figure) reads out and processes the messages in the output-message storing parts of the third-row base filtering circuits 2503, 2513, and 2523.

Figure 26:
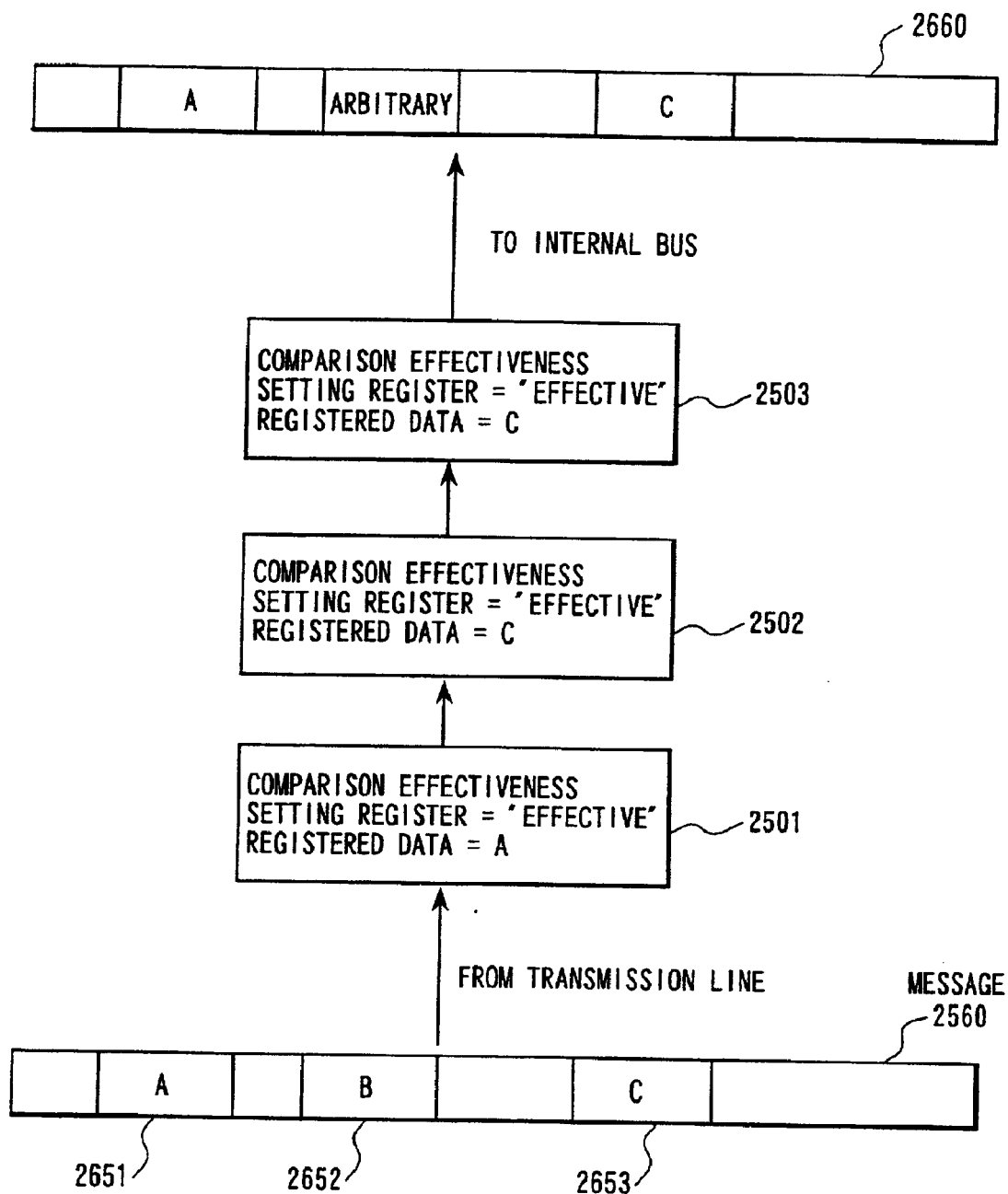
FIG. 26 is an illustration showing a result-setting example in each filtering circuit of the fifth embodiment.

FIG. 26 shows an example of comparison-results in the filtering circuit 2500 of this embodiment. In this figure, results of the comparison-processing performed in one filtering unit is illustrated. The message 2560 taken-in from the transmission line 2550 includes three condition-identifying portions 2651, 2652, and 2653, to which "A", none, and "C" are set, respectively. Further, the base filtering circuits 2501, 2502, and 2503 are serially connected to each other, and compare the contents of condition-identifying portions 2651, 2652, and 2653 with the registered data in the registration parts of these base filtering circuit, respectively. The comparison-processing performed by each base filtering circuit is the same as that performed by the filtering circuit in the first embodiment, and a corresponding condition-identifying portion in the input-message storing part is compared with each item of the registered data in turn to determine whether or not the agreement is established.

In the base filtering circuit 2501, "effective" is set to the comparison effectiveness " setting register of this filtering circuit, and the data "A" is registered in the registration part. The base filtering circuit 2501 stores the message 2560 in its input-message storing part, and since the flag set to the comparison effectiveness setting register indicates "effective", the registered data "A" is compared with the content of the condition-identifying portion 2651. Further, since the agreement in this comparison is established, the message stored in the input-message storing part is transferred to the output-message storing part. Conversely, if the agreement is not established in this comparison, the message stored in the input-message storing part is abandoned. Next, in the base filtering circuit 2502, "non-effective" is set to the comparison effectiveness setting register, and none is registered in the registration part. The base filtering circuit 2502 stores the taken-in message 2560 in its input-message storing part, and since the flag set to the comparison effectiveness setting register indicates "non-effective", the comparison-processing is not performed, and the message stored in the input-message storing part is transferred to the output-message storing part. In the base filtering circuit 2503, "effective" is set to the comparison effectiveness setting register, and the data "C" is registered in the registration part. The base filtering circuit 2503 stores the taken-in message 2560 in its input-message storing part, and since the flag set to the comparison effectiveness setting register indicates "effective", the registered data "C" is compared with the content of the condition-identifying portion 2653. Further, since the agreement is established in this comparison, the message stored in the input-message storing part is transferred to the output-message storing part.

Figure 27:
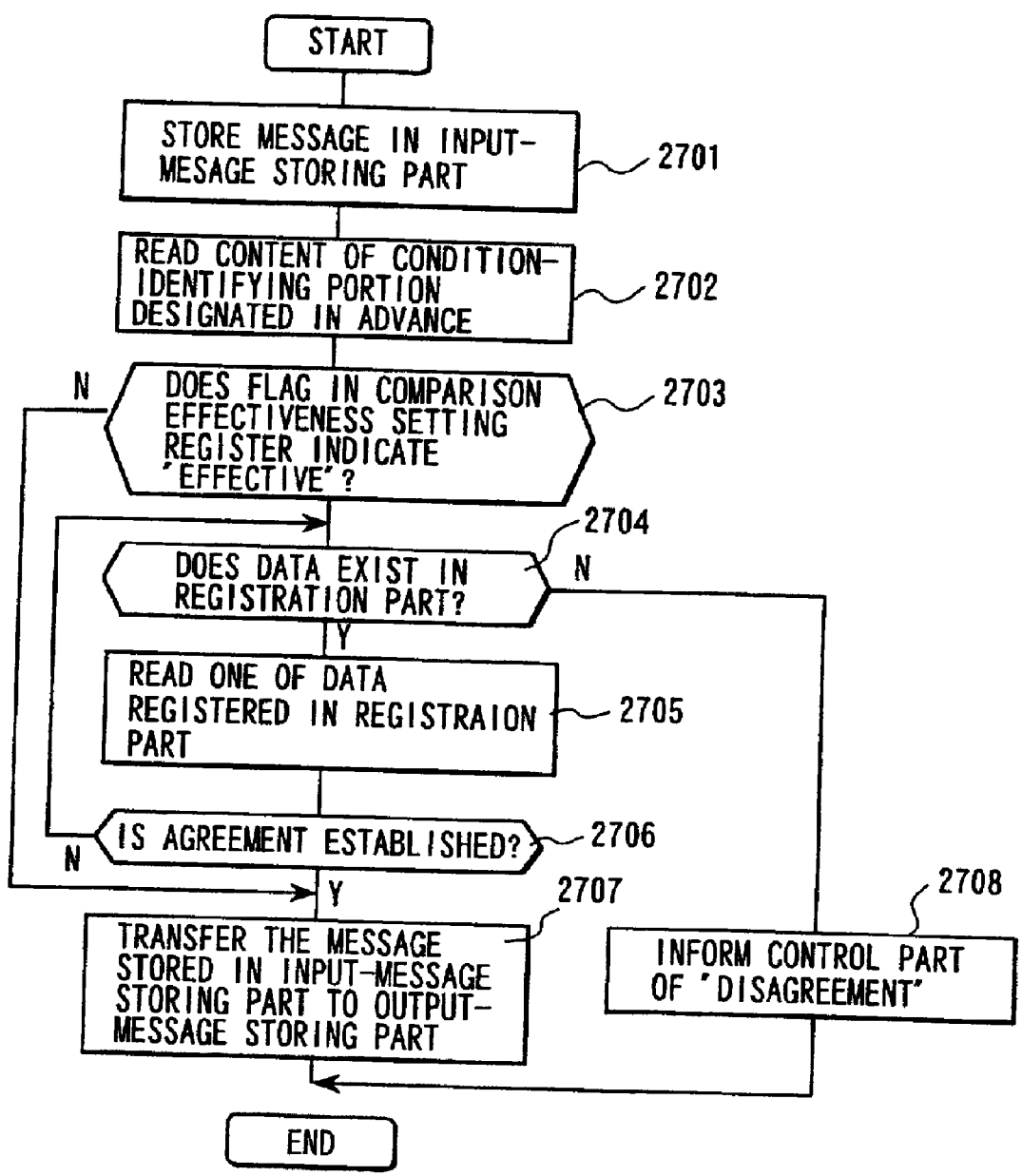
FIG. 27 is a flow chart showing operations of each base filtering circuit of the fifth embodiment.

FIG. 27 shows a flow chart of operations of each base filtering circuit in the fifth embodiment. When each base filtering circuit takes in the message into the input message storing circuit (step 2701), in step 2702, the base filtering circuit read out the content of the condition-identifying portion allocated to this base filtering circuit. If the flag set to the comparison effectiveness setting register of this filtering circuit indicates "non-effective" (step 2703), the comparison-processing is not performed, and this base filtering circuit informs its control part of that the agreement is established. Further, in step 2707, the message stored in the input-message storing part of this filtering circuit is transferred to the output-message storing part. If at least one item of the registered data exists in the registration part of this base filtering circuit (step 2704), one item of the registered data is read out in step 2705. If the corresponding condition-identifying portion agrees with the read-out item (step 2706), in step 2707, the message stored in the input-message storing part of this base filtering circuit is transferred to the output-message storing part. Conversely, if any item of data does not remains in the registration part of this base filtering circuit (step 2704), in step 2708, the message stored in input-message storing part of this base filtering circuit is abandoned.

By the processing of step 2701 to step 2708, in the example shown in FIG. 26, only a message satisfying the two conditions, that is, the content of the condition-identifying portion 2651=A and the content of the condition-identifying portion 2653=C, is selected and received. Further, by arranging a plurality of filtering units in parallel and setting a different combination of conditions to the registration parts in each of the filtering unit, each filtering unit being composed of the base filtering circuits serially connected to each other, the filtering circuit can classify various kinds of messages. For example, "A" and "F" are registered in the registration part of the base filtering circuit 2511 shown in FIG. 25, and "effective" is set to the comparison effectiveness setting register of this base filtering circuit. Next, "B" is registered in the registration part of the base filtering circuit 2512, and "effective" is set to the comparison effectiveness setting register this base filtering circuit . Last, "D" and "E" are registered in the registration part of the base filtering circuit 2513, and "effective" is set to the comparison effectiveness setting register this base filtering circuit. By the above data-setting in the registration part in each base filtering circuits in the filtering unit, it is possible to set the complicated conditions of a message to be selected and received. That is, a message satisfying the conditions that the content of the first condition-identifying portion=A or F, the content of the second condition-identifying portion=B, and the content of the third condition-identifying portion=D or E is selected and stored in the output-message storing part of the base filtering circuit 2513.

According to this embodiment, when each processor takes in a message from a transmission line, each of the condition-identifying portions in the message is compared with the registered data in each base filtering circuit in each filtering unit, a different combination of conditions for a message to be selected being registered as a set of the registered data in the registration parts of the base filtering circuits composing the filtering unit. A message satisfying each different combination of conditions is selected and classified by each filtering unit. For example, by setting a combination of conditions such as {data-kind=sensor data, and a message-sending node=node A}, {data-kind=data set to a node, and a message-sending node=node B or node C}, {a message-sending node=node A, and a message-receiving node=node C}, and so on to each filtering units, each message satisfying each of the above combination of conditions is separately stored in the output-message storing part of the corresponding base filtering circuit of the filtering unit. Since the above message selection processing and classification processing are performed by each filtering circuit, these message selection processing and classification processing do not increase the computing load of the CPU, and do not also affect processing of an application program executed by the CPU.

Moreover, it is not necessary for a user to develop a program for classifying messages to be received, and the classification of messages to be received can be realized only by registering data prescribing the required message-receiving conditions in the registration parts of each filtering unit. Furthermore, by increasing the number of the filtering units, the number of kinds in the classification of received messages can be easily increased.

The Sixth Embodiment:

This embodiment differs from the above embodiments on the point in that receiving of a message sent via a transmission line is controlled based on the transmission priority of the message.

Figure 32:
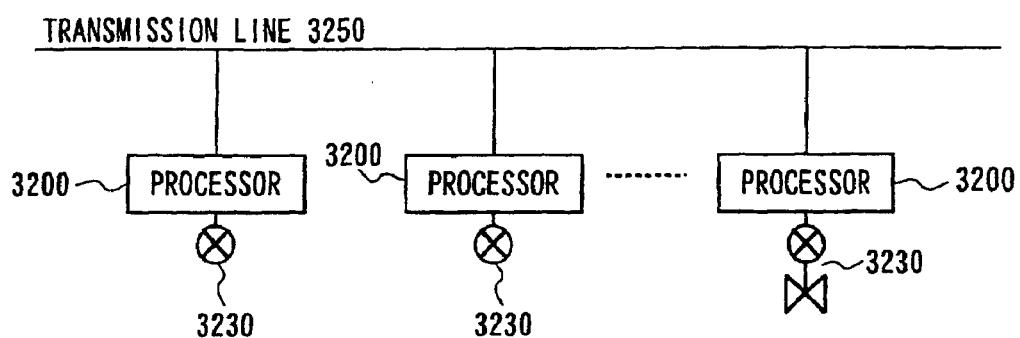
FIG. 32 is a schematic block diagram showing the composition of a distributed control system of the sixth embodiment according to the present invention.

FIG. 32 shows the composition of a distributed control system of this embodiment according to the present invention. As shown in this figure, the distributed control system of this embodiment is composed of a plurality of processors connected to a plurality of components such as a measurement device, a controlled object, etc., and a transmission line 3250 to which the plurality of the processors 3200 are commonly connected.

Figure 33:
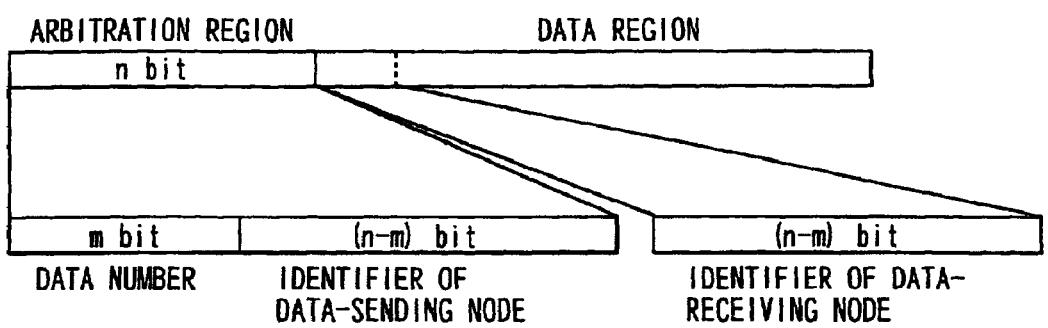
FIG. 33 is an illustration showing an example of the data composition in a message frame.

FIG. 33 shows an example of a frame format of a message transmitted on the transmission line 3250. The format of a message in this embodiment includes an arbitration region and a data region. The arbitration region is composed of the data number and a identifier of a message-sending node. Also, the size of the arbitration region is n bits. The data number is a identifier for identifying a transmitted message, and the size of the data number is m bits. The identifier of a message-sending node is an address of a node which has sent a message, and the size of this identifier is (n−m) bits. Further, in the data region, data to be transmitted is stored. Furthermore, in this embodiment, an identifier of a message-receiving node is also stored in the data region. The size of the identifier of a message-receiving node is (n−m) bits as well as that of the identifier of a message-sending node. The data set to these arbitration part and the identifier of a message-receiving node in the data region correspond to the contents of the above-mentioned condition-identifying portions in a message.

Figure 34:
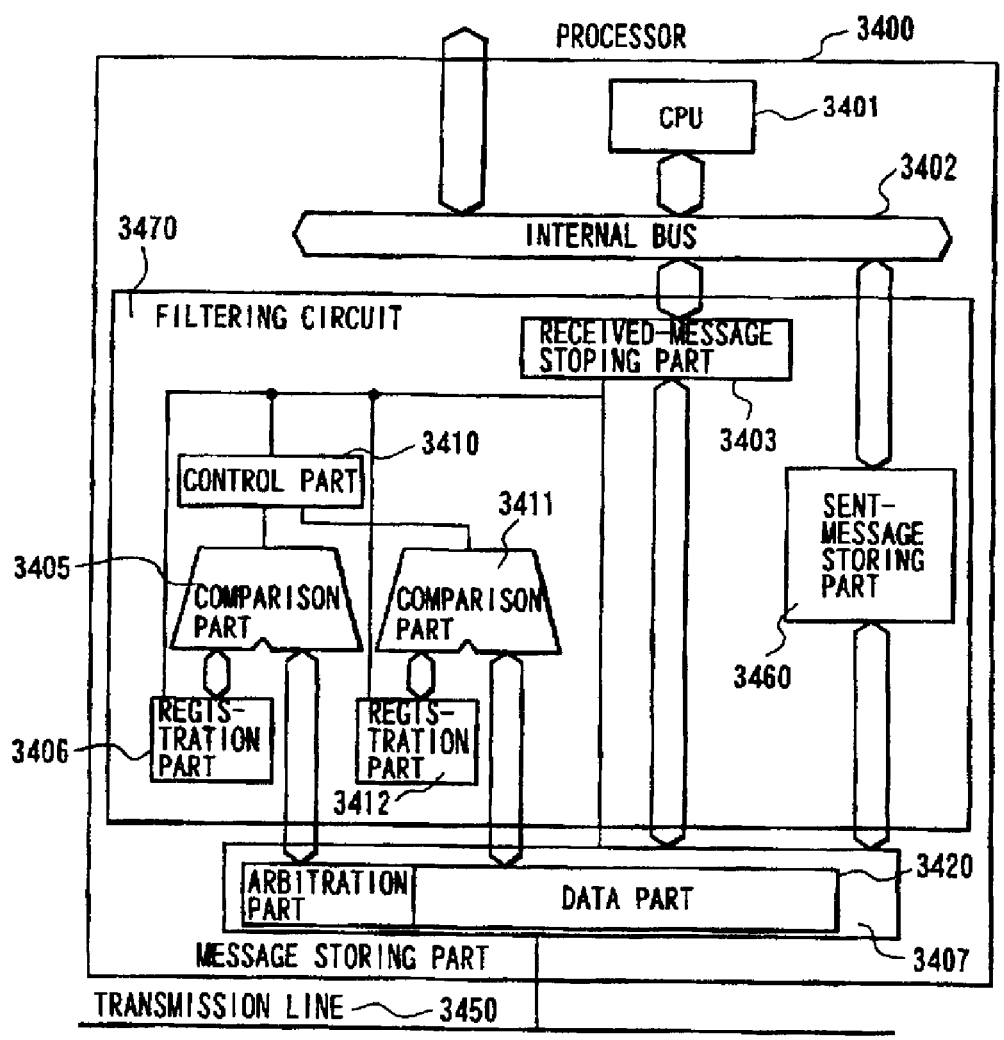
FIG. 34 is a schematic block diagram showing the composition of each processor of the sixth embodiment.

FIG. 34 shows the composition of each processor of the sixth embodiment. The processor 3400 includes a message storing part 3407 for storing a message taken-in from a transmission line 3450, a registration part 3406 for storing data compared with data set to the arbitration region of the message taken-in from the transmission line 3450, a comparison part 3405 for comparing data set to the arbitration region with the data registered in the registration part 3406, another registration part 3412 for storing data compared with data set to the identifier of a message-receiving node in the data region of the message taken-in from the transmission line 3450, another comparison part 3411 for comparing data set to the identifier of a message-receiving node with the data registered in the registration part 3412, a control part for controlling operations of the above parts, a received-message storing part 3403 for storing the received message stored in the message storing part 3407 when both the comparison results in the comparison parts 3405 and 341 indicate "agreement", a CPU 3401 for processing the transmission and an application program, an internal bus 3402 provided in the processor, and a sent-message storing part 3460 provided between the message storing part 3407 and the internal bus 3402, for storing a message sent to an external circuit by the processor 3400. The above composition-element are integrated into an one-chip device as a processor. Moreover, the message storing part 3407 takes in each of all the messages transmitted on the transmission line 3450, and controls transmission of messages based on the message priority.

In the following, operations of the message storing 3407 will be explained.

Figure 35A:
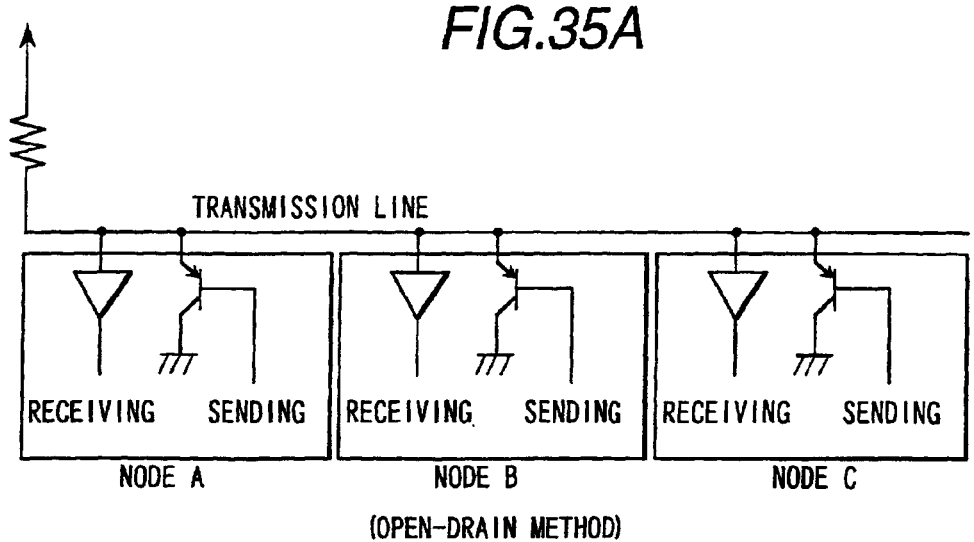
FIGS. 35A and 35B are illustrations showing an open-drain method and a priority-control method, respectively.

In a transmission line on which control data are transmitted, the time required for dispatch to arrival of control data must be secured. That is, the transmission of a message with a high priority must not be greatly delayed, for example, due to collision among messages. Therefore, in this embodiment, the message transmission controlled by the message storing part 3407 based on the message priority (referred to as message-priority controlled transmission) is realized by using the open-drain transmission method shown in FIG. 35A. The open-drain transmission method can keep a plurality of messages transmitted together on one transmission line. Thus, nodes connected to the transmission line can simultaneously transmit messages on the transmission line. The data-sending and receiving means shown in FIG. 34A is provided in the message storing part 3407 of each processor.

Figure 35B:
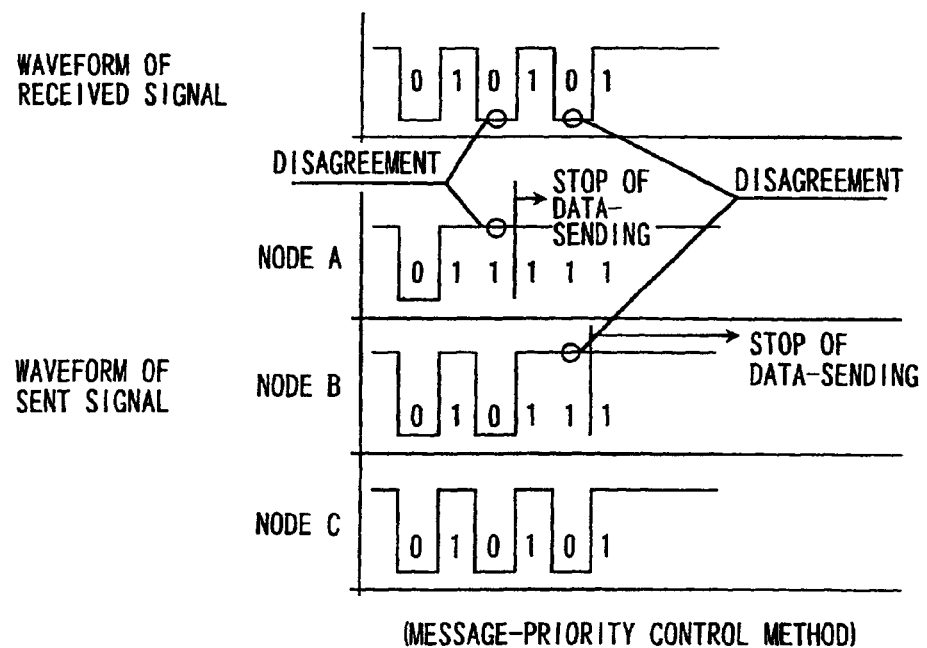

The concept of the message-priority controlled transmission method is illustrated in FIG. 35B. When a message is transmitted on the transmission line by the message storing part 3407, the message is sent as a series of bit-on/off signals.

First, the processors (referred to as nodes) start to transmit messages at the same timing. For example, when the end of message-transmission performed by other nodes is recognized by appearance of end flags in the transmitted messages, nodes which need transmit messages start to transmit the messages at the same time. Each node compares a series of bit on ("0")/off ("1") signals of the received message with that of the message to be sent by itself. In the message-priority controlled transmission method, when different nodes transmit bit-on/off signals on the transmission line 3450 at the same time, since the bit-on "0" signal precedes the bit-off "1" signal, only the bit-on signals remain on the transmission line 3450 until a bit-off signal is simultaneously transmitted by all the nodes on the transmission line 3450.

If some node receives a bit-on signal although this node has transmit a bit-off signal, that is, if some node recognizes that other nodes have transmit bit-on signals, this node stops to transmit the message. In the example shown in FIG. 35B, although nodes A, B, and C transmit the same bit signals until the second bit, at the third bit, node A transmits a bit-off signal, and nodes B and C transmit a bit-on signal. The received waveform shown in FIG. 35B is a waveform of a message which is presently transmitted on the transmission line 3450 and is received by all the nodes. At the third-bit timing, nodes A, B, and C compare the third bit signal in the received waveform with the third bit signal in messages to be sent from these nodes. Since the result of the bit-signal comparison indicates "disagreement" in the message to be sent from node A, node A interrupts the message transmission. On the other hand, Since the result of the bit-signal comparison indicates "agreement" in the messages to be sent from nodes B and C, nodes B and C continues the message transmission. However, node B recognizes the disagreement between the bit-signal in the received waveform and that sent by itself at the fifth bit timing, and interrupts the message transmission. By continuing the above bit-signal comparing operation, only the node which has transmitted a message with a series including the first longest continuos bit-on signals can transmit the message on the transmission line, and other nodes interrupt transmission of messages to be sent by these node. Thus, the nodes which have interrupted the transmission of the messages restart to transmit the messages at the next message-transmission timing.

The above bit-signal comparing operation is continued for the first n bits of a message shown in FIG. 33, that is, for the bit signals in the arbitration region. That only the node transmitting a message with a series including the first longest continues on-bit signals can transmit the message on the transmission line at one message-transmission timing means that the node transmitting a message with the least data number can occupy the transmission line at one message-transmission timing. Further, since the arbitration region includes an identifier of a message-sending node, the arbitration region in a message transmitted by each node has a different value, except that messages with the same identifier of a message-sending node are simultaneously transmitted. Accordingly, according to the bit-signal comparing operation for each arbitration region, only one node can continue to transmit a message to the end of this message, that is, occupies the transmission line. By the above-mentioned method, if a node sets the small number to the data number in a message, the node can transmit the message precedently to other node, that is, the message-priority controlled transmission can be realized. For example, if "0" is set to the data number of a message indicating "plant emergency shut-down", this message is most precedently transmitted. Furthermore, by setting a small number to the address of a message-sending node which need precedently transmit a message, even if different nodes have messages with the same data number are simultaneously transmitted, the message in which the small number is set to the node-address of a message-sending node can be precedently transmitted on the transmission line.

The above-described message-priority controlled transmission using the open-drain transmission method is generally called a bit-arbitration method, and is usually used in a distributed control system.

In this embodiment, although the bit-arbitration method is also used, a condition-identifying portion is newly provided in the data region of a message, and a means for performing the comparison-processing for the condition-identifying portions in a message is also provided.

The comparison-processing for the condition-identifying portions in a message, which is executed in the filtering circuit, is explained below. In the registration parts 3406 and 3412 shown in FIG. 34, data of message-receiving conditions are registered in advance. The comparison parts 3405 and 3411 compare the contents the identifier of a message-sending node set in the arbitration region and the identifier of a message-receiving node set in the data region in a message stored by the message storing part 3407 with the data registered in the registration parts 3406 and 3412, respectively. One or more data are registered in each registration part, and each item of the data is compared with the identifier of a message-sending node in the arbitration region or the identifier of a node-receiving node in the data region. If no data is registered in some registration part, it is prescribed in this embodiment that a corresponding comparison part informs the control part 3410 of that the agreement is established. The comparison results in the comparison parts 3405 and 3411 are sent to the control part 3411, and when both the comparison results of the comparison parts 3405 and 3411 indicate "agreement", the message stored by the message storing part 3407 is transferred to the received-message storing part 3403. The message transferred to the received-message storing part is further read out by the CPU 3401 via the internal bus 3402, and is processed by the application program in the CPU 3401.

As mentioned above, in this embodiment, each node connected to the transmission line sends a message according to the priority of the message, and when each node takes in a message from the transmission line, the node compares the contents of the identifier of a message-sending node in the arbitration region and the identifier of a message-receiving node in the data region with the registered data in the registration part of the node. Further, only when both the comparison results in the comparison parts indicate "agreement", the taken-in message is stored and further processed by the node. According to this embodiment, even if a distributed control system deals with different kinds of messages, together, such as control data which must be sent to each node in a short time, and information data permitted to be sent to an object node in a comparatively long time such that sending of this data in a long time does not affect a plant control, and so on, control data can be precedently transmitted.

Moreover, in a conventional system using the bit-arbitration method, the comparison-processing is performed only for the arbitration region by a CPU. Therefore, many messages other than messages needed by each node are stored in the node, and increase of the computing load due to the comparison-processing has been inevitable. On the other hand, in this embodiment, since the comparison-processing is also performed for the identifier provided in the data region, message-filtering is carried out in more detailed, and only messages needed by each node can be stored in the node. In addition, since the comparison-processing is performed by the filtering circuit, messages unnecessary to each node are abandoned, this abandoning of the messages not being performed by a CPU, which can prevent increase of the computing load of the CPU.

Accordingly, by setting a high priority to a message, the required time for arrival at the designated node in transmitting of the message can be secured. Further, since the computing load of a CPU to perform transmission processing of messages can be greatly reduced, an application program executed by the CPU are scarcely affected by the transmission processing of messages. Thus, it has become possible to perform a control of which a required control period is always secured. That is, it has become possible to send and receive information data such as parameter-setting data, diagnosis data, and so on, while safely performing a plant control.

The Seventh Embodiment:

In the above first to sixth embodiments, each node possesses a filtering circuit for taken-in messages, and the message filtering executed by the filtering circuit does not affects the computing load of the CPU in the node. Further, in each embodiment, the message-transmission and filtering can be processed at a high speed by the filtering means implemented by the filtering circuit or a transmission processor, which is independently provided in a processor of each node. However, each filtering means is designed to exclusively realize the feature of each embodiment, and cannot be used for the other embodiments other than the embodiment using this filtering means. In the seventh embodiment, a filtering circuit applicable to any one of the above first to sixth embodiments is explained below.

Figure 28:
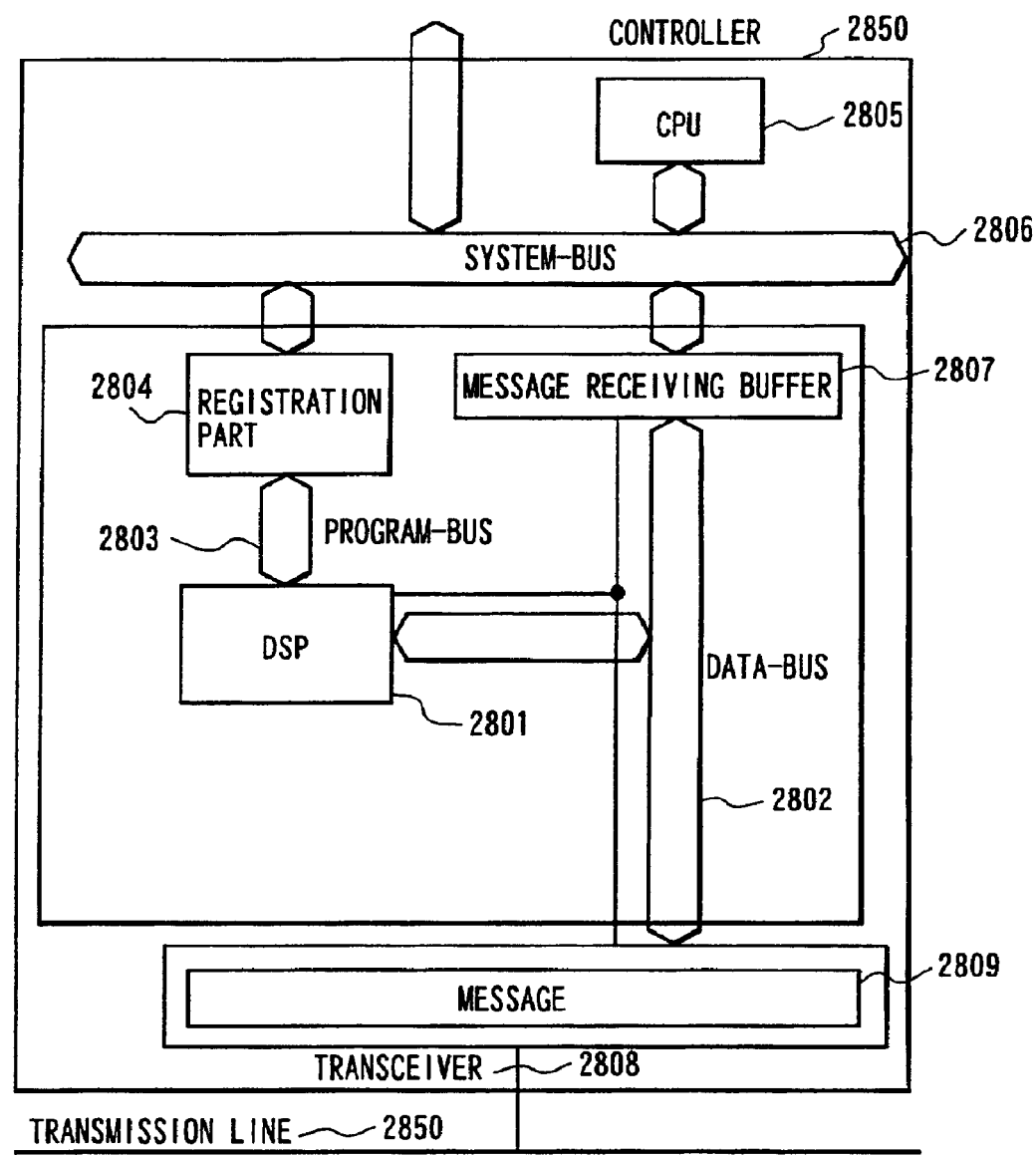
FIG. 28 is a schematic block diagram showing the composition of each controller in a distributed control system of the seventh embodiment according to the present invention.

FIG. 28 shows the composition of each controller in a distributed control system of the seventh embodiment according to the present invention. The distributed control system includes a plurality of controllers 2800, each controller being provided for a measurement device or a device for controlling a component in a plant, and a transmission line 2850 to which the controllers 2800 are commonly connected. That is, similar to the fourth embodiment, each controller is incorporated in a sensor with a transmission function, an intelligent motor, a programmable controller, a computer, etc. Although this embodiment will be explained assuming that parts composing the controller 2800 are the respective independent circuits in the following, those circuits can be integrated in a one-chip microprocessor.

The composition of the controller 2800 is explained below.

The controller 2800 of each node includes, as shown in FIG. 28, a transceiver 2808 connected to the transmission line 2805, a DSP (Digital Signal Processor) 2801 for performing the comparison-processing for a plurality of condition-identifying portions in a message 2809 taken-in by the transceiver 2808 and for transferring the received message, a message-receiving buffer 2807 for storing a message of which the contents of the condition-identifying portions agree with the message-receiving conditions of the controller 2800, a data bus 2802, which connects the transceiver 2808, the DSP 2801, and the message-receiving buffer 2807, for transferring the message 2809, a registration part 2804 for storing a program prescribing operations to be executed by the DSP 2801, a program bus used for performing data-transmission between the DSP 2801 and the registration part 2804, a CPU 2805 for controlling message-transmission and for executing an application program, and a CPU bus 2806 used for performing data-transmission among the CPU 2805, the message-receiving buffer 2807, and the registration part 2804.

The above DSP 2801 is a von Neumann-type processor. That is, the DSP 2801 possesses the bus 2802 for inputting/outputting data and the bus 2803 for inputting/outputting instruction data of the program stored in the registration part 2804, and executes processing of data input via the bus 2802 according to instruction data input to the DSP 2801 via the bus 2803 at a high speed.

Operations of the controller 2800 is explained below.

When the controller 2800 takes in the message 2809 from the transmission line 2850, the taken-in message 2809 is first stored to the transceiver 2808. Further, the transceiver 2808 converts a frame of the message 2809 transmitted in a serial transmission manner to a frame of parallel-type data, and informs the DSP 2801 of that the transceiver 2808 has taken in the message 2809.

Further, when the DSP 2801 is informed of that the message 2809 has been taken in by the transceiver 2808, the DSP 2801 reads out the program stored in the registration part 2804 via the program bus 2803. Meanwhile, the reading-out of the program is performed in every taking-in of a new message by the DSP 2801. In the registration part 2804, the positions of the condition-identifying portions in the message 2809 and the message-receiving conditions compared with each of the contents of the condition-receiving conditions are registered, and information on logical operations implementing the filtering function (corresponding to a set of logical circuits composing the filtering circuit of each of the first to sixth embodiments) to be executed by the DSP 2801 is stored as a program. Meanwhile, the registration part 2804 is a rewritable memory, and the program stored in this memory can be rewritten by the CPU 2805.

Figure 29:
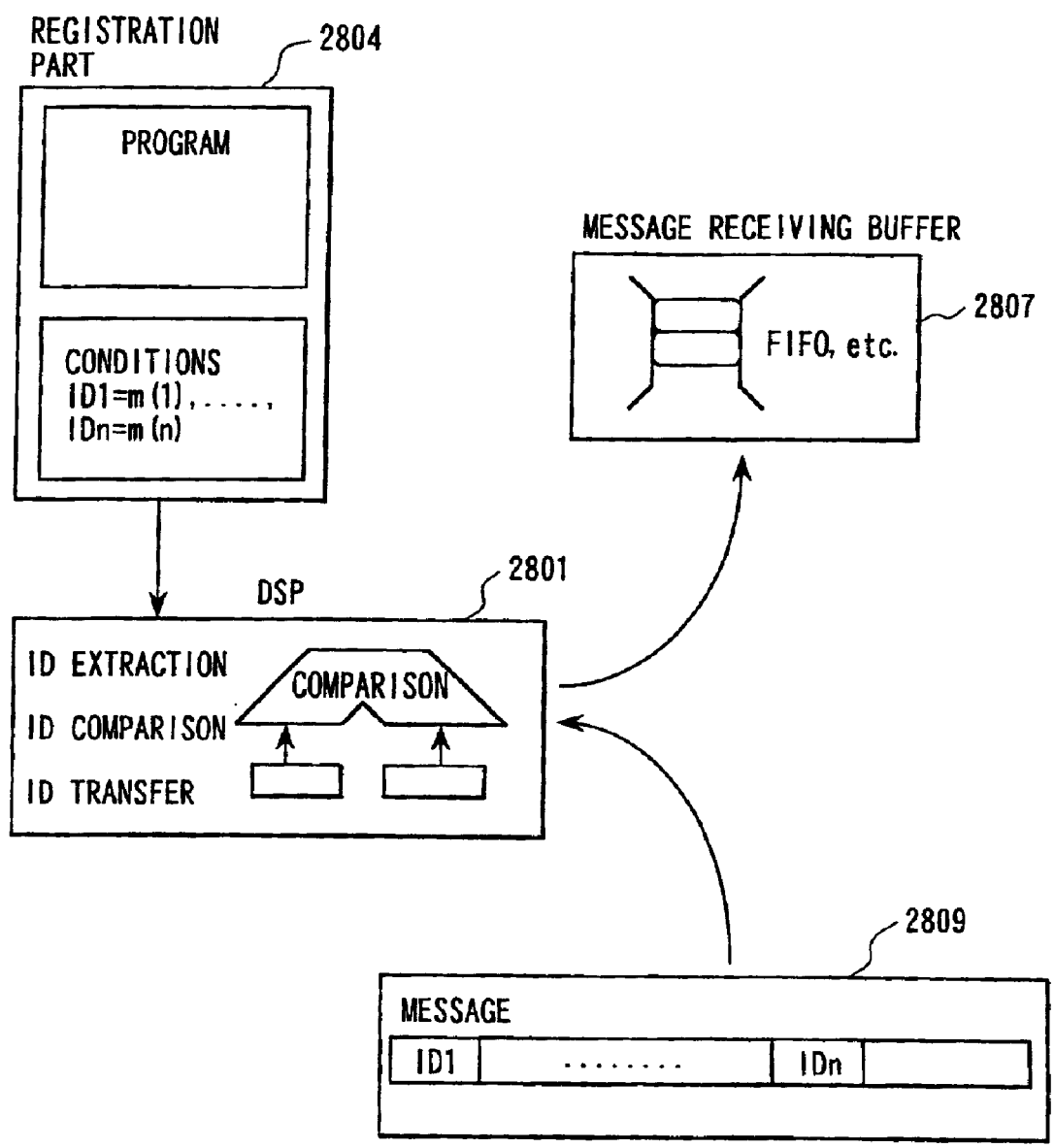
FIG. 29 is an illustration showing the function of the controller shown in FIG. 28.

After the reading-out of the program has been completed, the DSP 2801 reads the contents of the condition-identifying portions in the message 2809 stored in the transceiver 2808 according to the program as shown in FIG. 29. Further, the DSP 2801 compares the contents of the condition-identifying portions with the message-receiving conditions registered in the registration part 2804 in turn or at the same time, and performs further processing instructed by the programs. Furthermore, the DSP 2801 transfers the taken-in message 2809 to the message-receiving buffer 2807 if all the contents of the condition-identifying portions in the message 2809 satisfy the message-receiving conditions, and it is determined that the message 2809 is to be received by this controller. The message-receiving buffer 2807 is a FIFO-type memory capable of storing a plurality of messages. Also, an overwrite-type memory, in which the content of this memory is overwritten by a latest input message, and only the latest input message is held, can be used for the message-receiving buffer. Further, the DSP 2801 informs the CPU 2805 of that the received message 2809 is newly stored. Furthermore, the message 2809 stored in the message-receiving buffer 2807 is read out by the CPU 2805 via the system bus 2806, and processed by the CPU 2805.

The controller 2808 is designed to have the computing speed such that the comparison-processing for one message is executed within m/n sec. assuming that a message with a data length of not more than m bytes is sent and received at the transmission rate of n bps (bytes per second). Accordingly, since the transmission-processing in the controller 2800 is completed before the next message is received by the transceiver 2808, a failure in the message-receiving does not occur.

Similar to other embodiment, the transmission line 2850 can be replaced with any type transmission means such as a radio-transmission, an infrared ray transmission, etc. If another type transmission means other than the wire-type transmission is used, the transceiver 2808 corresponding to a physical layer of a seven-layer OSI (Open Systems Interconnection) structure is changed to a transceiver which is applicable to a transmission line of optical fiber, a radio-transmission, or an infrared ray transmission. Moreover, a baseband transmission method, a broad-band transmission method, a diffusion spectrum transmission method, and so on can be also used to transmit a message on the transmission line 2850.

Effects of this embodiment are as follows. Since a programs prescribing a function implemented by the DSP can be changed by the CPU in the controller, the same DSP can deal with various types of message-formats or filtering functions. Further, a type of the transceiver can be optionally selected according to an applied transmission means and a message transmission method used in the transmission means. Moreover, this embodiment can be also applied to protocol processing other than the filtering of a taken-in message, only if the protocol processing has been completed before the next message is taken in.

The Eighth Embodiment:

In the seventh embodiment, the filtering circuit of each of the first to sixth embodiments is implemented by a DSP. On the other hand, in the eighth embodiment, the filtering circuit is implemented by a programmable logic circuit.

Figure 30:
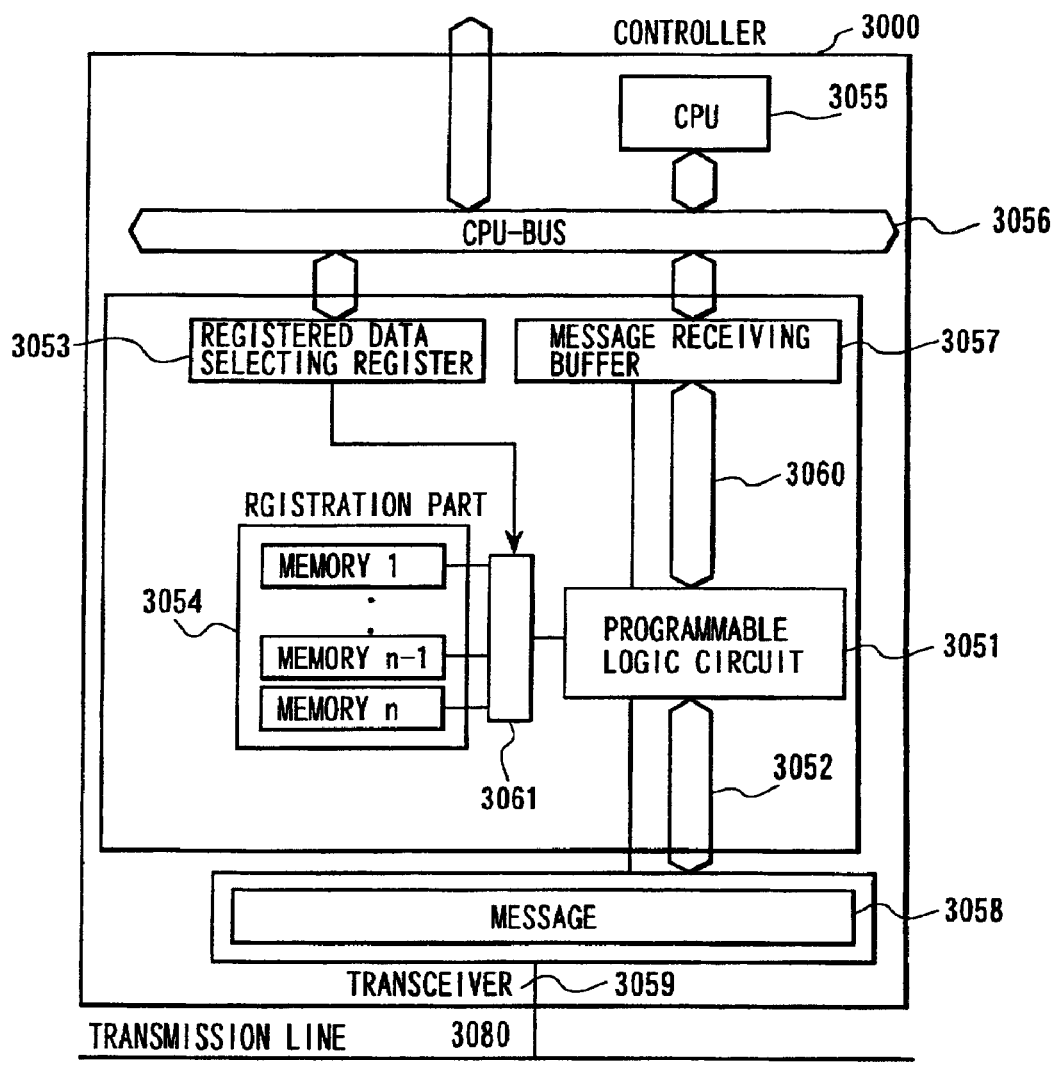
FIG. 30 is a schematic block diagram showing the composition of each controller in a distributed control system of the eighth embodiment according to the present invention.

FIG. 30 shows the composition of each controller for which a programmable logic circuit is used, in this embodiment.

In this embodiment also, similar to the fourth embodiment, nodes in the distributed control system are controllers such as an intelligent device, a sensor or a motor with a transmission function, a programmable controller (PC), a computer, and so on. Further, although this embodiment is explained assuming that each circuit in the controller is an independent circuit, all the circuit in the controller can be integrated into an one-chip processor.

The composition of the controller 3000 shown in FIG. 30 is explained below.

As shown in FIG. 30, the controller 3000 includes a transceiver 3059 connected to a transmission line 3080, a programmable circuit 3051 for performing the comparison-processing for a plurality of the condition-identifying portions in a received message 3058 and for transferring the message 3058, a bus 3052 provided between the programmable logic circuit 3051 and the transceiver 3059, for transferring the message 3058, a message-receiving buffer 3057 for storing the message 3058 of which the contents of the condition-identifying portions agree with the receiving-conditions of this controller, a bus 3060 and a bus 3052 provided between the programmable logic circuit 3051 and the message-receiving buffer 3057, for transferring a message 3058, a registration part 3054 for storing the receiving-conditions to be compared with the contents of the condition-identifying portions in the message 3058, and a program to prescribe operations of the programmable logic circuit 3051, a receiving-condition selecting register 3053 for selecting one of a plurality of memories storing the receiving-conditions, which are provided in the registration part 3054, a memory selector 3061 for transferring the receiving-condition stored in the selected memory of the registration part 3054 to the programmable logic circuit 3051, a CPU 3055 for controlling message-transmission and executing application programs, and a CPU bus 3056 for performing data-transmission among the CPU 3055, the message-receiving buffer 3057, and the receiving-condition selecting register 3053.

The above programmable logic circuit 3051 includes a plurality of combinational logic circuits and sequential circuits among which connections can be optionally changed according to connection information. The connection information is stored in an external non-volatile memory (the registration part 3054 in this embodiment) or in an internal non-volatile memory inside a programmable logic circuit, and when the connection information is required, it is input to the programmable logic circuit.

Next, operations of the controller 3000 are explained below.

The transceiver 3059 of the controller 3000 takes in each of all messages transmitted on the transmission line 3080, and stores each message in itself. Further, the transceiver 3059 converts a frame of the message 3058 transmitted in a serial transmission manner to a frame of parallel-type data. Also, the taken-in message 3058 includes a plurality of the condition-identifying portions.

Figure 31:
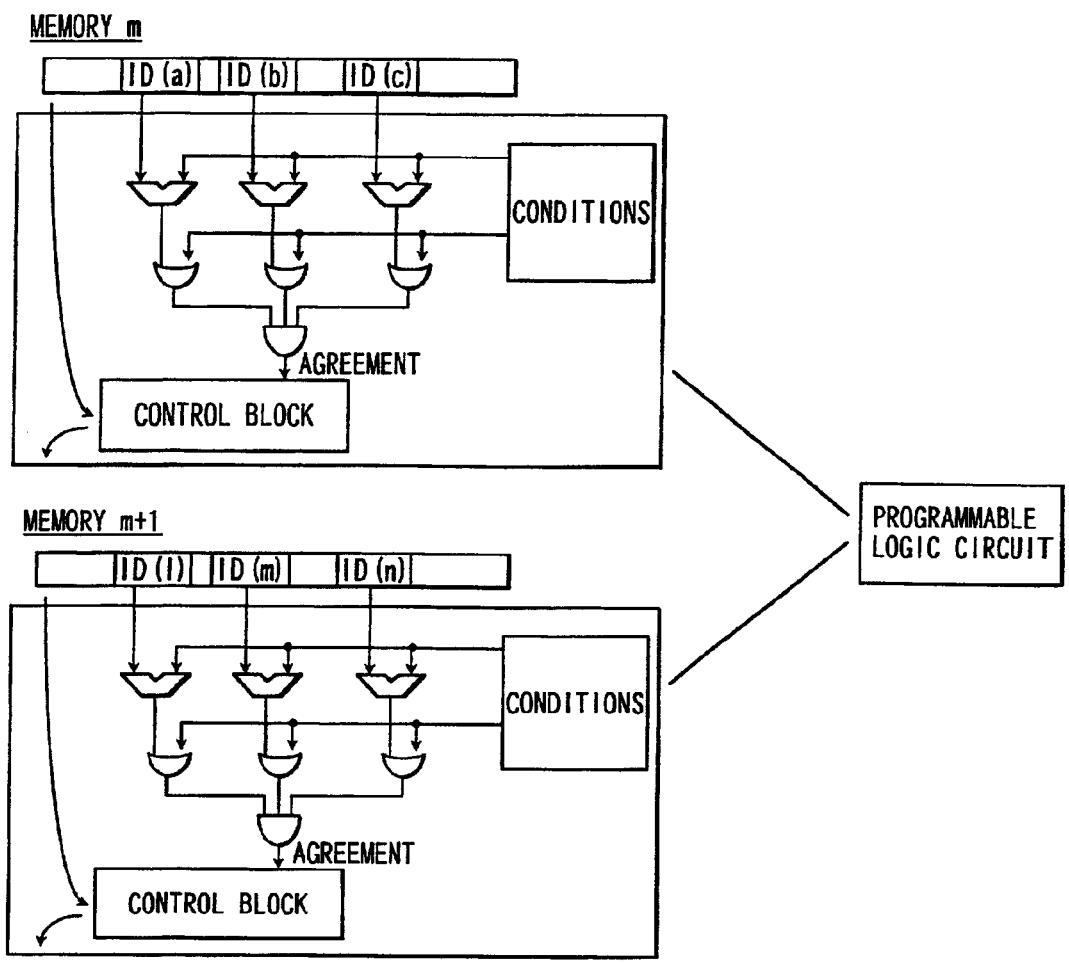
FIG. 31 is an illustration showing the function of the controller shown in FIG. 30.

To select a message necessary to the node including this controller 3000, the CPU 3050 selects the memory in which a pertinent receiving-condition is stored, out of the plurality of the memories provided in the registration part 3054, and writes the identifying number of the selected memory in the receiving-condition selecting register. Here, the registration part 3054 includes a plurality of memories, each memory storing the position of one of the condition-identifying portions in a message and a receiving-condition, or connection information (logic data) for one of logic circuits implementing the comparison-processing function (for example, the comparison processing function executed by each of the filtering circuits explained in the first to sixth embodiments). The programmable logic circuit 3051 reads out logic data stored in the selected memories, and composes the required logic circuit by itself as shown in FIG. 31.

When the programmable logic circuit 3051 is informed of that the message 3058 is taken-in by the transceiver 3059, the programmable logic circuit 3051 compares the contents of the condition-identifying portions in the message 3058 with the receiving-conditions stored in the memory selected via the receiving condition selecting register 3053 according to the logic circuits connected to each other in the logic circuit 3051, and if it is determined that the agreement is established, the logic circuit 3051 transfers the message 3058 to the message-receiving buffer 3057. After the transfer of the message 3058 is completed, the logic circuit 3051 informs the CPU 3055 that the message 3058 has been transferred to the message-receiving buffer 3057. Since the above processing until this step is completed before the next message is taken in, a failure in the message-receiving does not occur.

Although the processing speed in the filtering of the received message in this embodiment is lower than that in exclusive filtering circuit used in each of the first to sixth embodiments, that speed in this embodiment is higher than that in the filtering by the DSP in the seventh embodiment. Therefore, this embodiment is also applicable to the filtering of a message with a comparatively short data length.

Moreover, since data stored in the memories 1-n in the registration part 3054 can be changed by the CPU 3055 via the receiving-condition selecting register 3053, the controller of the same hardware composition can deal with various types of message-formats or filtering functions.

Similar to the seventy embodiment, the transmission line 3080 can be replaced with any type transmission means such as a radio-transmission, an infrared ray transmission, etc. If another type transmission means other than the wire-type transmission is used, the transceiver 3058 corresponding to a physical layer of a seven-layer OSI (Open Systems Interconnection) structure is changed to a transceiver applicable to a transmission line of optical fiber, a radio-transmission, or an infrared ray transmission. Moreover, a baseband transmission method, a broad-band transmission method, a diffusion spectrum transmission method, and so on can be also used to transmit a message on the transmission line 3080.

According to this embodiment, by using a programmable logic circuit, the flexibility of changing the filtering method, the changing being carried out in a plant, has been improved. That is, various comparison conditions can be easily selected and set in each controller in a plant at its site-point.

The Ninth Embodiment:

In the first to eighth embodiments, it is determined based on the comparison results performed in the comparison means whether or not the received data is stored in the received-message storing part. In the method performed in the first to eighth embodiments, since it is necessary to read out the contents of the data registered in each registration part in turn for the comparison-processing, the comparison-processing may takes a long time if many items of data are registered in the registration part. In the ninth embodiment, to determine whether or not the taken-in message is stored in each node always at a high speed even if many items of data are registered in a registration part, this determination is performed only by referring to data stored at an address preset to the registration part, the address being designated in each condition-identifying portion in the received message.

Figure 36:
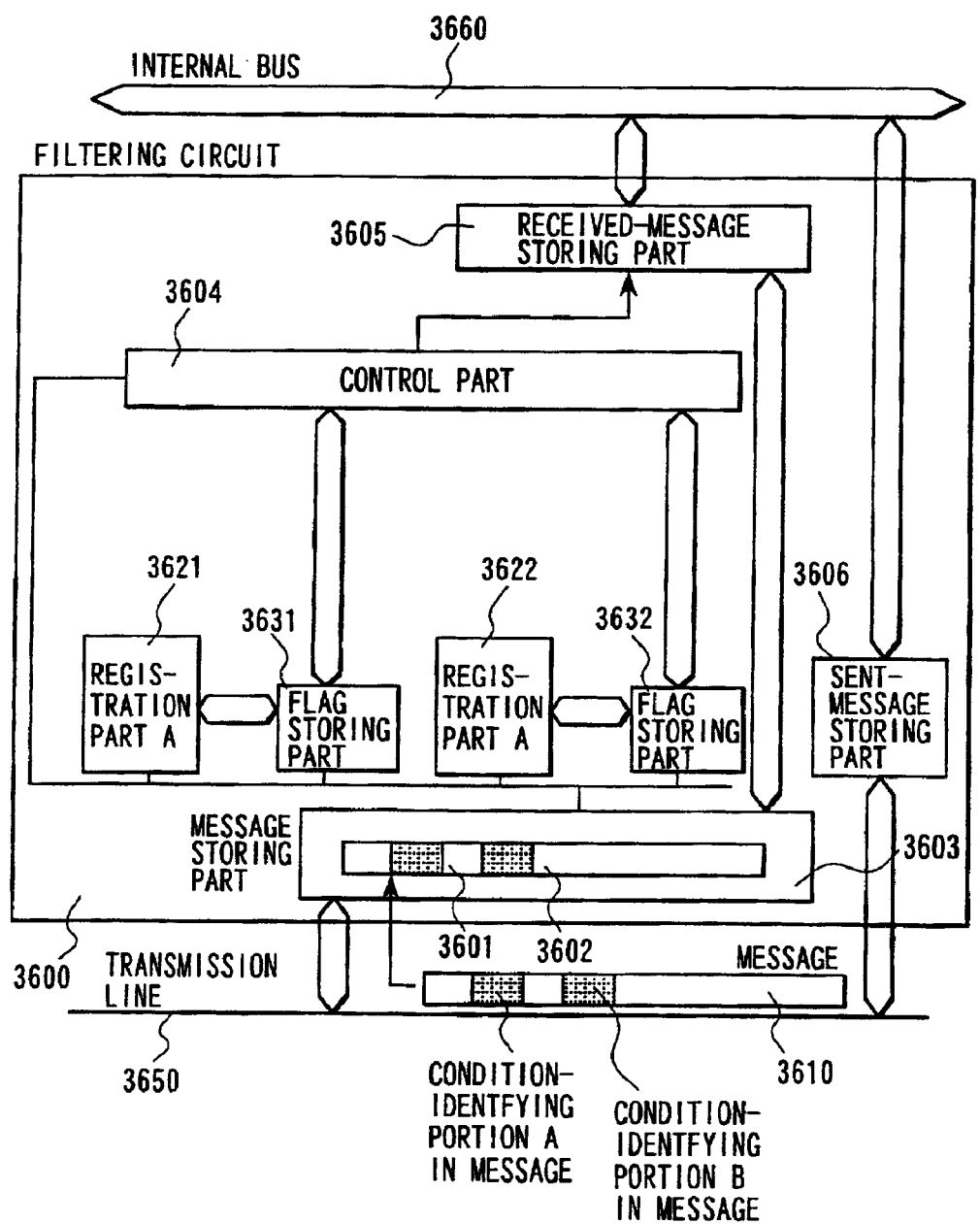
FIG. 36 is a schematic block diagram showing an example of the circuit composition of each filtering circuit in a distributed control system of the ninth embodiment according to the present invention.

FIG. 36 shows an example of the composition of each filtering circuit in a distributed control system of the ninth embodiment. The composition of the distributed control system and the composition of each processor are the same as those shown in FIGS. 1 and 2 for the first embodiment.

The filtering circuit 3600 includes a message storing part 3603 for temporarily storing each taken-in one of all messages transmitted on a transmission line 3650, a received-message storing part 3605 for storing a message which it is determined to be stored based on the result of filtering-processing, registration parts A 3621 and B 3622 for storing the receiving-conditions of messages which need to be stored in this processor, flag storing parts 3631 and 3632 for latching items of data read out of the registration parts A 3621 and B 3622, a sent-message storing part 3606 for temporarily storing a message to be sent by a CPU via an internal bus 3660 to the outside, and a control part 3604 for controlling the above circuits.

The control part 3604 converts a frame of the message 3058 taken-in from the transmission line 3650, which is transmitted in a serial transmission manner, to a frame of parallel-type data, and stores the converted message 3058 in the message storing part 3603. In this embodiment, each message transmitted on the transmission line 3650 includes at least two condition-identifying portions, and the position and the size of each condition-identifying portion are set to the condition-identifying-portion position setting register provided in the control part 3604 as shown in FIG. 5 for the first embodiment.

When the message 3610 is stored in the message storing part 3603, the control part 3604 reads out the data stored at the address designated by the content of the first condition-identifying portion A 3601, from the registration part A 3621. Also, the control part 3604 reads out the data stored at the address designated by the content of the second condition-identifying portion B 3602, from the registration part B 3622. Meanwhile, the storing parts for the condition-identifying portions A 3601 and B 3602, which are provide in the message storing part 3603, are connected to address lines of the registration parts A 3621 and B 3602, respectively.

The control part 3604 refers to the respective items of the data a latched from the registration parts A 3621 and B 3602 via the flag storing parts 3631 and 3632, and determines whether or not the taken-in message 3610 is to be stored in the received-message storing part 3605 based on the respective referred items of the data. If it is determined that the taken-in message 3610 is to be stored, the message 3610 is latched in the received-message storing part 3603.

Figure 37:
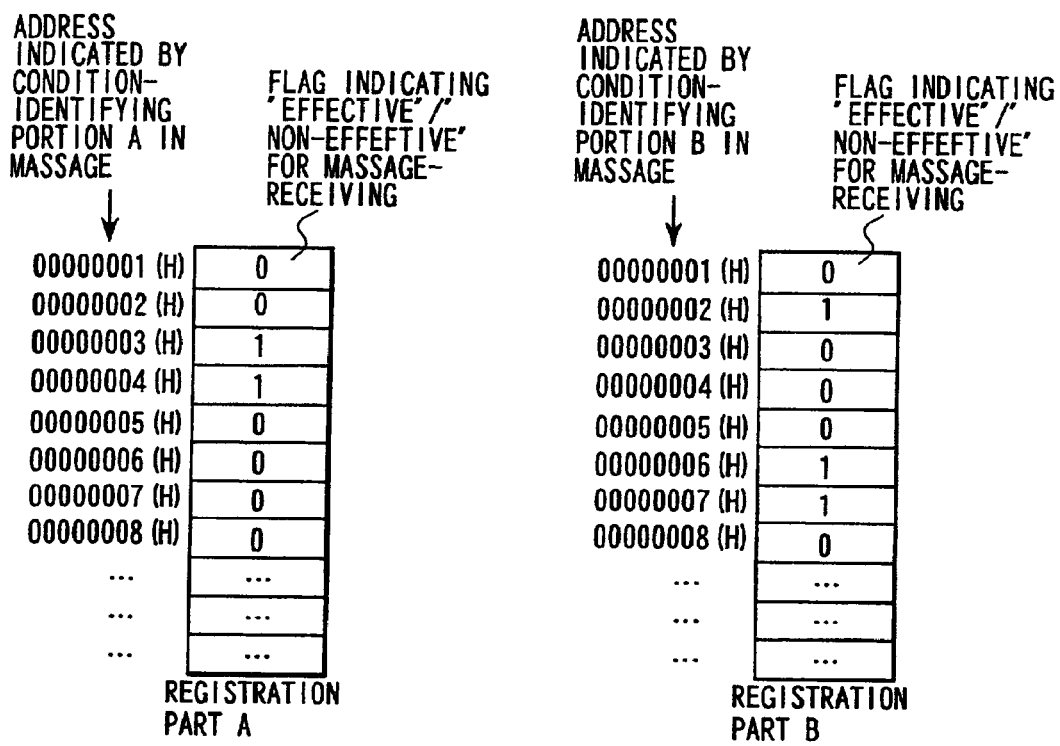
FIG. 37 shows the data compositions in the registration parts A and B shown in the FIG. 36.

FIG. 37 shows the data compositions in the registration parts A 3621 and B 3622 shown in the FIG. 36. In this embodiment, one of the addresses registered in each registration part is set to each condition-identifying portion in a message, That is, the contents of the condition-identifying portions A 3601 and B 3602 indicate the addresses in the registration parts A 3621 and B 3622, respectively. The memory capacity (the number of addresses) of each registration is larger than the number which can be expressed by the length of data set to the condition-identifying portion. A flag indicating "effective"/"non-effective" for message-receiving is stored at each address in each registration part. The flag indicating "effective"/"non-effective" for message-receiving is used for determining whether or not a message is to be stored in the received data storing part 3605, and if the flag indicates "1", the control part executes the determination-processing to the address designated by each condition-identifying portion, and vice versa. A flag can be freely registered in an address in each registration part by the CPU via the internal bus 3660.

The address set to each condition-identifying portion and registration part corresponds to the registered data stored in each registration part in the first embodiment.

By allocating information such as sensor data, a message-receiving node, and so on to each address of each registration part in advance, if a flag indicating "effective"/"non-effective" for message-receiving is set as "1" at the address of information to be received by a node, the node can filter the received message only by referring to the flag at the address indicated each condition-identifying portion in the taken-in message.

In the following, an example of the filtering operations performed in the filtering circuit 3600 will be explained for the case in that some node receives data set to this node which is sent from a node D of a host computer.

In this case, it is assumed that and are set to the condition-identifying portion A 3601 indicates data set to a node, and the condition-identifying portion B 3602 indicates a message-sending node, respectively, and that the kind of the data sent from the node D and the node D are allocated to the addresses "00000004(H)" in the registration part A and "00000007(H)" in the registration part B, respectively. Further, as for the flags indicating "effective"/"non-effective" for message-receiving, "1" is set at the addresses "00000004(H)" in the registration part A and "00000007(H) in the registration part B.

The filtering circuit 3600 takes in each of messages on the transmission line 3650 in turn, and reads an address set to each condition-identifying portion in the taken-in message. Further, the flag at the address set to the corresponding registration part is read out. Thus, the control part 3604 can recognizes that the taken-in message is sent from the node D of the host computer, determine that the received message is to be received in this node, and last transfers the received message to the received-message storing part 3605.

Accordingly, since the message-sending conditions of the taken-in message are recognized only by referring to flags set at the addresses indicated by the contents of the condition-identifying portions in the taken-in message, the filtering circuit 3600 can perform the message-filtering at a high speed. That is, according to this embodiment, the number of referring to data stored in each registration part is only one, which makes it possible to perform the message-filtering at a high speed even if many items of data are stored in each registration part. In addition, since the operating time of each filtering circuit in the distributed control system is greatly reduced, the power consumption can be also greatly reduced.

In this example, although the number of the condition-identifying portions in a message is two, this number is not restricted, but optional. Also, the registration parts of the same number as that of the condition-identifying portions are provided in this example. However, since the registered data used in the first to eighth embodiments are allocated to addresses in each registration part in this embodiment, by connecting the condition-identifying portions A 3601 and B 3602 to the upper-address region and the lower-address region in one registration part, it is also possible to determine whether a received message is to be stored in the received-message storing part 3605 by referring to a flag set at an address in the one registration. Therefore, the number of the registration parts need not be accorded to the number of the condition-identifying portions, and the filtering circuit 3605 of this embodiment can be composed of one registration part.

Moreover, although the above-mentioned address-referring method is implemented for all the condition-identifying portions in a message, it is also possible to combine the address-referring method and the condition-comparing method performed in the first to eighth embodiments. An example of this combinational method is explained below.

Figure 38:
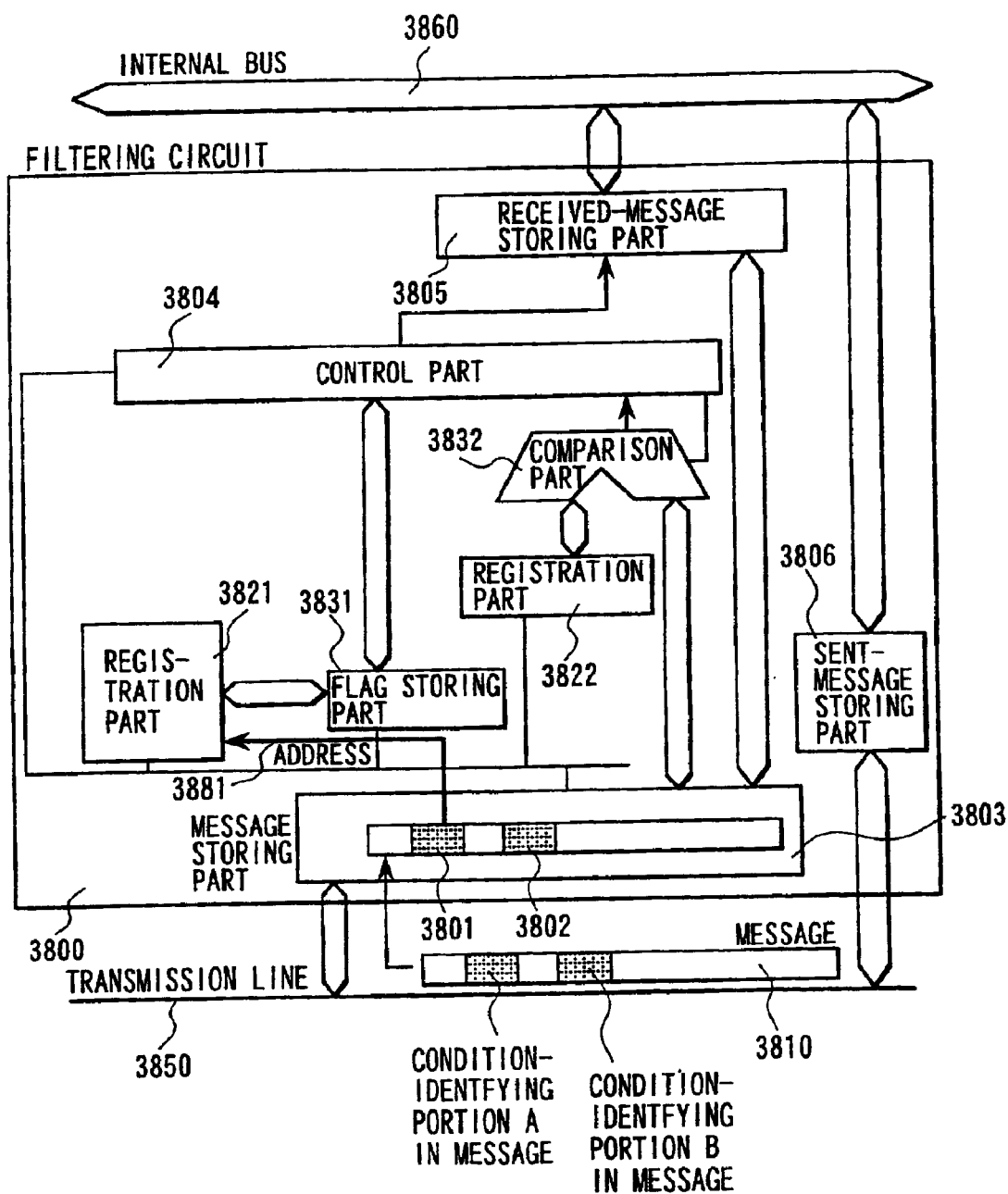
FIG. 38 is a schematic block diagram showing the composition of another filtering circuit using a combination of an address-referring method and the condition-comparing method.

FIG. 38 showing an example of the composition of a filtering circuit using a combination of an address-referring method and the condition-comparing method.

The filtering circuit 3800 includes a registration part B 3822 for storing message-receiving conditions of messages to be stored in a received-message storing part 3805 and a comparison part 3832 for comparing a condition-identifying portion 3802 in a received message 3810 with the message-receiving conditions registered in the registration part 3882. The composition of the filtering circuit in this example is the same as that shown in FIG. 36 except for the circuits for the condition-comparing method. The data composition in the registration part B 3822 is the same as that in the registration part shown FIG. 4 in the first embodiment.

The control part 3804 converts a frame of the message 3810 received from the transmission line 3850, which is transmitted in a serial transmission manner, to a frame of parallel-type data, and stores the converted message 3810 in the message storing part 3603. In this example also, each message transmitted on the transmission line 3850 includes at least two condition-identifying portions, and the position of each condition-identifying portion is predetermined. Further, the data indicating an address in the registration part A 3821 is set to the condition-identifying portion A 3801, and information on a message-receiving condition such as the data-kind, the identifier of a message-receiving node, and so on is set to the condition-identifying portion B 3802 as set in the first to eighth embodiments.

When the message 3810 is stored in a message storing part 3803, a control part 3804 latches data stored at the address indicated by the content of the condition-identifying portion A 3801 from the registration part A 3821 into a flag storing 3831. the register storing the content of the condition-identifying portion A 3801, which is provided in the message storing part 3803, is connected to the address line of the registration part A 3821. Further, the control part 3804 sends the comparison part 3832 an instruction such that the comparison part 3832 compares the content of the condition-identifying portion B 3802 with the registered data in the registration part B 3822, and the comparison part 3832 searches the registered data in the registration part B 3822. Furthermore, if the comparison part 3832 finds an item of the registered data, which agrees with the content of the condition-identifying portion B 3802, the comparison part 3832 sends "1" to the control part 3804, otherwise, sends "0" to the control part 3804.

Figures 39, 40:
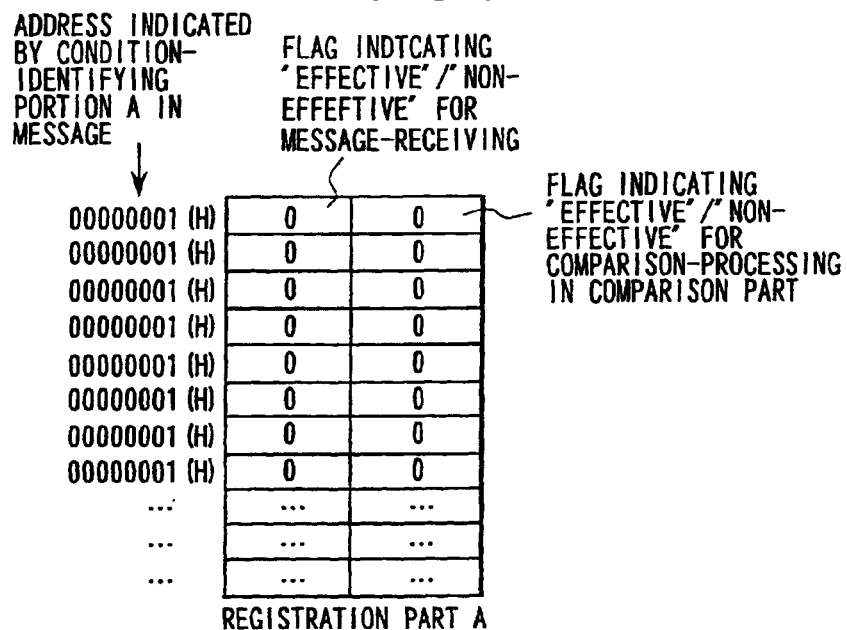
FIG. 39 is an illustration showing the data composition in the registration part A shown in FIG. 38.
FIG. 40 is an example of a truth-table used to determine receiving of a message.

FIG. 39 shows the data composition of the registration part A shown in FIG. 38. In this example, the addresses in the registration part A 3821 includes the address set to the condition-identifying portion A 3801, and the memory capacity (the number of addresses) of the registration part A 3821 is larger than the number which can be expressed by the length of data set to the condition-identifying portion A 3801. A flag indicating "effective"/"non-effective" for message-receiving is stored along with a flag indicating "effective"/"non-effective" for comparison-processing performed in the comparison part 3832 at each address in the registration part A 3821. The flags and the message-receiving conditions can be freely registered in the registration parts A 3821 and 3822, respectively, by the CPU via the internal but 3660.

The control part 3804 refers to the data stored at the address indicated by the content of the condition-identifying portion A 3801 via the flag storing part 3831, the data stored at the address being latched from the registration part A 3821, and determines whether or not the message 3810 is to be stored in the received-message storing part 3605 based on the contents of the flags and the comparison result in the comparison part 3822. If the result of the determination is positive, the message 3810 stored in the message storing part 3803 is transferred to the received-message storing part 3605.

The flags indicating "effective"/"non-effective" for comparison-processing performed in the comparison part 3832 are used for the determination of whether or not the comparison result in the comparison part 3822 is taken into account when determining the transferring of the message 3810 to the received-message storing part 3605. If the flag indicating "effective"/"non-effective" for comparison-processing indicates "1", the message 3810 is not stored in the received-message storing part 3605 when the comparison result in the comparison part 3822 indicates "disagreement" even if the flag indicating "effective"/"non-effective" for message-receiving indicates "1".

Furthermore, it is determined based on the truth-table shown in FIG. 40 whether or not the message 3810 is to be stored in the received-message storing part 3805. That is, if the flag indicating "effective"/"non-effective" for message-receiving, this flag being latched in the flag storing part 3831, indicates "0", the message 3810 is abandoned. Further, if the flag indicating "effective"/"non-effective" for message-receiving indicates "1", and the flag indicating "effective"/"non-effective" for comparison-processing indicates "0", the message 3810 is stored in the received-message storing part 3805 regardless of the comparison result in the comparison part 3832. Furthermore, if the flag indicating "effective"/"non-effective" for message-receiving indicates "1", and the flag indicating "effective"/"non-effective" for comparison-processing indicates "1", the message 3810 is stored in the received-message storing part 3805 only when the comparison result in the comparison part 3832 is "1" (agreement). Although the number of the comparison part is one in this example, more than one comparison parts can be provided in the filtering circuit 3800, which can deal with more complicated filtering conditions.

As mentioned above, according to the message filtering method of this example, if many items of conditions is to be set to some condition-identifying portion (for example, the case in that the number of nodes connected to the transmission line is very large, and the identifier should indicate a large number of message-sending nodes), by applying the address-referring method to such a condition-identifying portion, and the condition-comparing method to a condition-identifying portion to which one of a few kinds of conditions are set, the speed of the message filtering can be increased.

In accordance with the present invention, by providing a filtering circuit for at least two message-sending conditions included in a taken-in message in each node, and registering message-receiving conditions for this node in the filtering circuit, one of the at least two message-sending conditions including the condition of designating or non-designating of a message-receiving node of the message, the transmission-processing of a message taken-in from a transmission line need not be processed by a CPU. Moreover, does not affect processing of an application program executed by the CPU, which can greatly reduce the computing load of the CPU. Thus, each controller in a distributed control system can be composed by using cheap CPUs.

In addition, different types of messages such as control data, information data, etc., can be safely transmitted together on the same transmission line, and different types of transmission methods such as the broad-cast transmission method, the one-to-one transmission method, and so on can be used together. Thus, the efficient and flexible transmission has been realized.

Accordingly, an engineer can design a distributed control system, and develop application programs for this control system, separate from programs for the message-transmission, which can greatly improve the efficiency of developing the application programs.

What is claimed is:

1. A distributed control system in which a plurality of nodes are connected to a transmission line, each node controlling components connected thereto and transmitting messages to each of the other nodes, wherein each message includes an arbitration region composed of a condition-identifying portion indicating a data-kind and a condition-identifying portion indicating a message-sending node, and a data region composed of a condition-identifying portion indicating a message-receiving node and data to be transmitted; and a processor provided in each node includes a first message storing part for storing each message taken-in from said transmission line for purposes of comparison, a first comparison part for performing comparison-processing for said arbitration region, a second comparison part for performing comparison-processing for said data region, and a control part for determining whether or not each of said messages is to be received in a node based on results of said comparison-processing performed in said first and second comparison parts, and for transferring a taken-in message to be received in a node to a received-message storing part wherein said arbitration region is arranged at a top position of a message sent by each node, and said processor controls sending of a message to another node based on bit-configuration in said arbitration region of each of said taken-in messages transmitted in a serial transmission manner.

2. A method of message-filtering performed by each node of a distributed control system in which a plurality of nodes are connected to a transmission line, each node controlling components connected thereto and transmitting messages to other nodes, said method comprising the steps of:

taking-in each message transmitted from one node on said transmission line at each other node, said message including an arbitration region composed of a condition-identifying portion indicating a data-kind and a condition-identifying portion indicating a message-sending node, and a data region composed of a condition-identifying portion indicating a message-receiving node or non-designation of a message-receiving node and data to be transmitted;

comparing at each other node, said identifiers of said condition-identifying portions with data of message-receiving conditions registered in said node at which said comparing is done; and determining whether or not each of said taken-in messages is to be received in said node at which said comparing is done node based on a result of said comparing, wherein sending of a message to be sent from a node is controlled by comparing each of a plurality of bits composing data of an identifier arranged at a top position of said sent message with a corresponding one of a plurality of bits composing data of an identifier in said taken-in message in the order of a bit-configuration in each of said identifiers, said sent message and said taken-in message being transmitted in a serial transmission manner.

* * * * *